United States Patent
Aggarwal

(10) Patent No.: US 9,487,356 B1
(45) Date of Patent: Nov. 8, 2016

(54) MANAGING LOW-FREQUENCY INVENTORY ITEMS IN A FULFILLMENT CENTER

(71) Applicant: Amazon Technologies, Inc., Seattle, WA (US)

(72) Inventor: Aayush Aggarwal, Malden, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/635,964

(22) Filed: Mar. 2, 2015

(51) Int. Cl.
*G06Q 10/08* (2012.01)
*G05B 15/02* (2006.01)
*B65G 1/137* (2006.01)
*B64C 39/02* (2006.01)
*B65G 1/04* (2006.01)

(52) U.S. Cl.
CPC ........... *B65G 1/1373* (2013.01); *B65G 1/1371* (2013.01); *G05B 15/02* (2013.01); *G06Q 10/087* (2013.01); *B64C 39/024* (2013.01); *B65G 1/0464* (2013.01); *G05D 2201/0216* (2013.01)

(58) Field of Classification Search
CPC ... B65G 1/1373; B65G 1/1378; G05B 15/02
See application file for complete search history.

(56) References Cited

U.S. PATENT DOCUMENTS

| | | | | |
|---|---|---|---|---|
| 4,568,233 A * | 2/1986 | Baker | ................. | B65G 1/0464 414/267 |
| 6,654,662 B1 * | 11/2003 | Hognaland | .......... | B65G 1/0464 700/214 |
| 7,881,820 B2 * | 2/2011 | Antony | ................ | G06Q 10/087 700/214 |
| 7,920,962 B2 * | 4/2011 | D'Andrea | ........ | G05B 19/41895 700/245 |
| 8,280,547 B2 | 10/2012 | D'Andrea et al. | | |
| 8,594,835 B2 * | 11/2013 | Lert | ....................... | B65G 1/045 414/267 |
| 8,825,197 B1 * | 9/2014 | Guan | ................... | G06Q 10/087 700/213 |
| 8,892,240 B1 * | 11/2014 | Vliet | .................... | B65G 1/1378 700/213 |
| 9,008,829 B2 * | 4/2015 | Worsley | .............. | G05D 1/0287 700/213 |
| 9,087,314 B2 * | 7/2015 | Hoffman | .............. | G06Q 10/087 |
| 9,152,149 B1 * | 10/2015 | Palamarchuk | ....... | G05D 1/0234 |
| 2012/0143427 A1 | 6/2012 | Hoffman et al. | | |
| 2014/0277692 A1 * | 9/2014 | Buzan | .................. | B65G 1/0492 700/216 |
| 2014/0354809 A1 * | 12/2014 | Shondel | ............... | G06Q 10/087 348/144 |
| 2015/0046227 A1 * | 2/2015 | Asadi | ................... | G06Q 10/087 705/7.36 |
| 2015/0120094 A1 * | 4/2015 | Kimchi | ................. | B64C 39/024 701/3 |
| 2015/0127143 A1 * | 5/2015 | Lindbo | ................ | B65G 1/0464 700/218 |
| 2015/0354949 A1 * | 12/2015 | Lecky | ..................... | G06F 3/017 702/150 |
| 2015/0368078 A1 * | 12/2015 | Hess | ........................ | B65G 1/00 700/217 |
| 2016/0026969 A1 * | 1/2016 | Wang | .................. | G06Q 10/087 705/28 |

* cited by examiner

*Primary Examiner* — Thomas Randazzo
(74) *Attorney, Agent, or Firm* — Kilpatrick Townsend & Stockton LLP

(57) ABSTRACT

The disclosed inventory system and methods can be used to improve access time to less frequently accessed inventory items. Specifically, a mobile drive unit may be selected from a plurality of mobile drive units to retrieve or store an inventory item based on a density of the storage location of the inventory item and/or an estimated cost (e.g., estimated time) associated with the retrieval or storage of the inventory item. For instance, an overhead drive unit may be selected over a ground drive unit to retrieve inventory items from or store inventory items to densely-packed storage areas. As another example, an overhead drive unit may be selected over a ground drive unit when the cost of using the ground drive unit exceeds a threshold value.

20 Claims, 25 Drawing Sheets

MANAGING LOW-FREQUENCY INVENTORY ITEMS IN A FULFILLMENT CENTER

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become non-trivial. In inventory systems tasked with responding to large numbers of diverse inventory requests often need to balance competing needs and requirements. For instance, less frequently access inventory items are sometimes stored in a densely-packed storage area to save space. However, moving inventory items out of or into such densely-packed storage areas can be inefficient using existing ground-based drive units.

BRIEF DESCRIPTION OF THE DRAWINGS

Various embodiments in accordance with the present disclosure will be described with reference to the drawings, in which.

DETAILED DESCRIPTION

Figure 1:
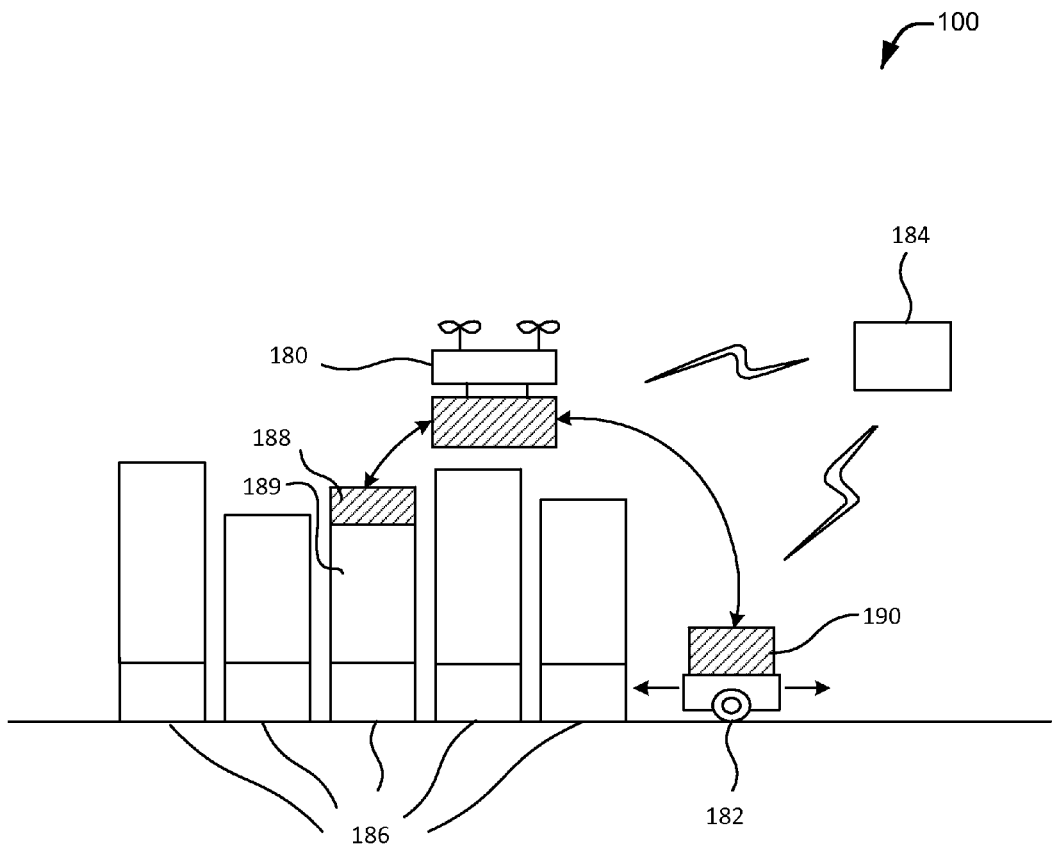
FIG. 1 illustrates an example inventory system in a side view, in accordance with embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to an inventory system having multiple inventory holders and drive units for moving the inventory holders. Specifically, features herein are directed to providing faster access to less-frequently accessed inventory stored in a tightly-packed or otherwise hard-to-reach storage area. To this end, the inventory system may include overhead drive units that are configured to move the inventory items overhead instead of or in addition to moving the inventory items via ground drive units.

A storage area may be segmented according to the frequency at which inventory items are accessed. An inventory item is accessed when it is stored into or retrieved from a storage area. More frequently accessed items may be stored in a high-frequency storage area. The high-frequency storage area may be configured to provide fast access to the inventory items. For instance, the inventory holders within the high-frequency storage area may be loosely arranged so as to provide direct access paths to the inventory holders. The access paths may be wide enough to accommodate the entire inventory holder such that it can be moved around, for example, by ground drive units. Additionally, the high-frequency storage area may be conveniently located to facilitate quicker access, such as near an inventory station (e.g., packing or shipping station) where the inventory items are needed. Overall, the location and configuration of a high-frequency storage area may provide quick access to the storage area as a whole as well as to individual items within the storage area.

Less frequently accessed items may be stored in a low-frequency storage area. The low-frequency storage area may be configured to provide efficient space usage. To that end, the inventory holders within the low-frequency storage area may be arranged in a space-efficient manner. For instance, the inventory holders may be arranged in close proximity to each other. As such, movement into and/or out of certain storage locations may be difficult for such densely-packed storage areas especially near the center. Additionally, the low-frequency storage area may be located farther away from the inventory stations to make room for the storage of more frequently used items. As such, the location and configuration of a low-frequency storage area may provide efficient storage usage at the cost of slower access time.

While the low-frequency storage area provides efficient use of space, access time can be unacceptably long for inventory items stored within such low-frequency storage area using only ground-based transport units. Ground-based mobile drive units or ground drive units are typically configured to move inventory holders in a lateral direction along the floor. Such lateral movements make such ground drive units ill-suited for moving inventory holders into and/or out of a compactly-arranged cluster of inventory holders. To move out an inventory holder located at or near the center of the cluster using a ground drive unit, one or more inventory holders near the periphery of the cluster would need to be moved out of the way first in order to make way for the centrally located inventory holder. The same is true in reverse when an inventory holder needs to be put back near the center of a densely-packed storage area. Such "reshuffling" of inventory holders can cause substantial delays that may lead to missed order fulfillment or shipping deadlines. Additional costs may include increased complexity in resource planning and scheduling, increased workload for system resources, higher risk of errors or accidents, and the like.

The disclosed inventory system and methods provide faster access to such low-frequency items located in a tightly-packed storage area or an otherwise hard-to-reach area. Specifically, overhead drive units can be used to lift a transportable object (e.g., an inventory holder, a detachable portion of an inventory holder, or the inventory item itself) from the storage area and deliver the transportable object to a designated location. In reverse, the overhead drive units can be used to lift the transportable object off of a designated location and offload it to a storage location within a tightly-packed storage area. In some embodiments, the designated location may be at or a periphery of a storage area. For instance, the designated area can include a relay station (e.g., at or near the periphery of the storage area) where another mobile drive unit such as a ground drive unit or another overhead drive unit picks up the transportable object for further delivery. As another example, the designated area can include a packing or shipping station where an inventory item is retrieved from the transportable object or otherwise processed (e.g., to fulfill an order).

In various embodiments, an overhead drive unit may include a mobile drive unit that is configured to cause a transportable object to move in a space over the top portions of one or more inventory holders. Examples of an overhead drive unit can include an unmanned aerial vehicle (UAV), an overhead crane assembly, a wall-mounted crane assembly, a mobile crane, a fixed crane, and the like. In general, a transportable object can include an inventory holder, a detachable component of an inventory holder that is configured to store one or more inventory items, or an inventory item itself. A detachable component of the inventory holder can include a tray, a tote, a box, a segment, a compartment, or any suitable storage unit that is configured to accommodate one or more inventory items and detachable from an inventory holder. A detachable component that is configured to be transportable by an overhead drive unit can be located at or near the top of an inventory holder or at any other suitable portion of the inventory holder.

According to an aspect of the present invention, systems and methods are provided for selecting mobile drive units to retrieve or store inventory items based a storage density for a storage location of the inventory item. For instance, an overhead drive unit may be used to retrieve inventory items from or store inventory items to high-density storage locations while a ground drive unit may be used for low-density storage locations.

According to another aspect of the present invention, systems and methods are provided for selecting mobile drive units to move an inventory object based on estimated cost associated with moving the inventory object. The cost may be estimated using a first type of mobile drive unit (e.g., a ground mobile unit) selected from a plurality of types of mobile drive units. Based on the estimated cost indicator, a suitable mobile drive unit (e.g., an overhead drive unit) may be selected to minimize the cost.

According to another aspect of the present invention, an improved inventory holder is provided that is configured to be detectable and transportable by an overhead drive unit. The inventory holder can include an overhead holder identifier configured to be detectable by an overhead drive unit from above the overhead drive unit and usable for positioning the overhead drive unit relative to inventory holder to enable coupling between the overhead drive unit and the inventory holder; include a coupling member configured to be releasably coupled to a corresponding second coupling member of an overhead drive unit so as to allow the overhead drive unit to lift the inventory holder from above the overhead drive unit. In some embodiments, the inventory holder may also include a ground holder identifier configured to be detectable by a ground drive unit from beneath the inventory holder and usable for positioning the ground drive unit relative to inventory holder to enable coupling between the ground drive unit and the inventory holder.

FIG. 1 illustrates an example inventory system 100 in a side view, in accordance with embodiments. The inventory system 100 comprises one or more mobile drive units (including overhead drive units 180 and ground drive units 182), and a management control module 184. The mobile drive units 180, 182 can be controlled by the management control module 184 to move one or more transportable objects stored in a storage space such as an inventory holder 186 or a detachable component thereof 188. In particular, an overhead drive unit can be controlled to retrieve an object (e.g., a detachable component 188 or an entire inventory holder 186) and bring it to a designated location 190. Likewise, the overhead drive unit can be controlled to pick up the object from a designated location 190, carry the transportable object over the top of one or more inventory holders, and drop off the object at a particular storage location. The designated location can be any suitable location with the inventory system. For instance, the designated location be on a top of a ground drive unit (as illustrated), on a top of an inventory holder, at or near an inventory station, at or near a human or automated operator, and the like.

In an illustrative example, an inventory holder 186 may comprise a top portion 188 and a bottom portion 189. The top portion 188 may be configured to be detachably coupled to the bottom portion. The top portion may be configured to be releasably coupled to an overhead drive unit 180 for movement of the top portion by the overhead drive unit. In some embodiments, the top portion may also be configured to be releasably coupled to a ground drive unit 190 for movement of the top portion by the ground drive unit. In other embodiments, the top portion may not be configured to be releasably coupled to a ground drive unit for movement of the top portion by the ground drive unit. The bottom portion 189 may be configured to be releasably coupled to a ground drive unit 190 for movement of the inventory holder by the ground drive unit. In some embodiments, the bottom portion may also be configured to be releasably coupled to an overhead drive unit for movement of the bottom portion (without the top portion) by the overhead drive unit. In other embodiments, the bottom portion may not be configured to be releasably coupled to an overhead drive unit for movement of the bottom portion (without the top portion) by the overhead drive unit.

In another example, the top portion and the bottom portion may not be detachable and the inventory holder need to be moved as a whole. In such a case, the inventory holder as a whole can be configured to be detachably couplable to and transported by an overhead drive unit and/or a ground drive unit.

While the overhead drive unit is depicted as an unmanned aerial vehicle (UAV), it is understood that an overhead drive unit as discussed herein can be implemented by any other suitable mobile drive unit capable of moving a transportable object over the top of one or more inventory holders.

Figure 2:
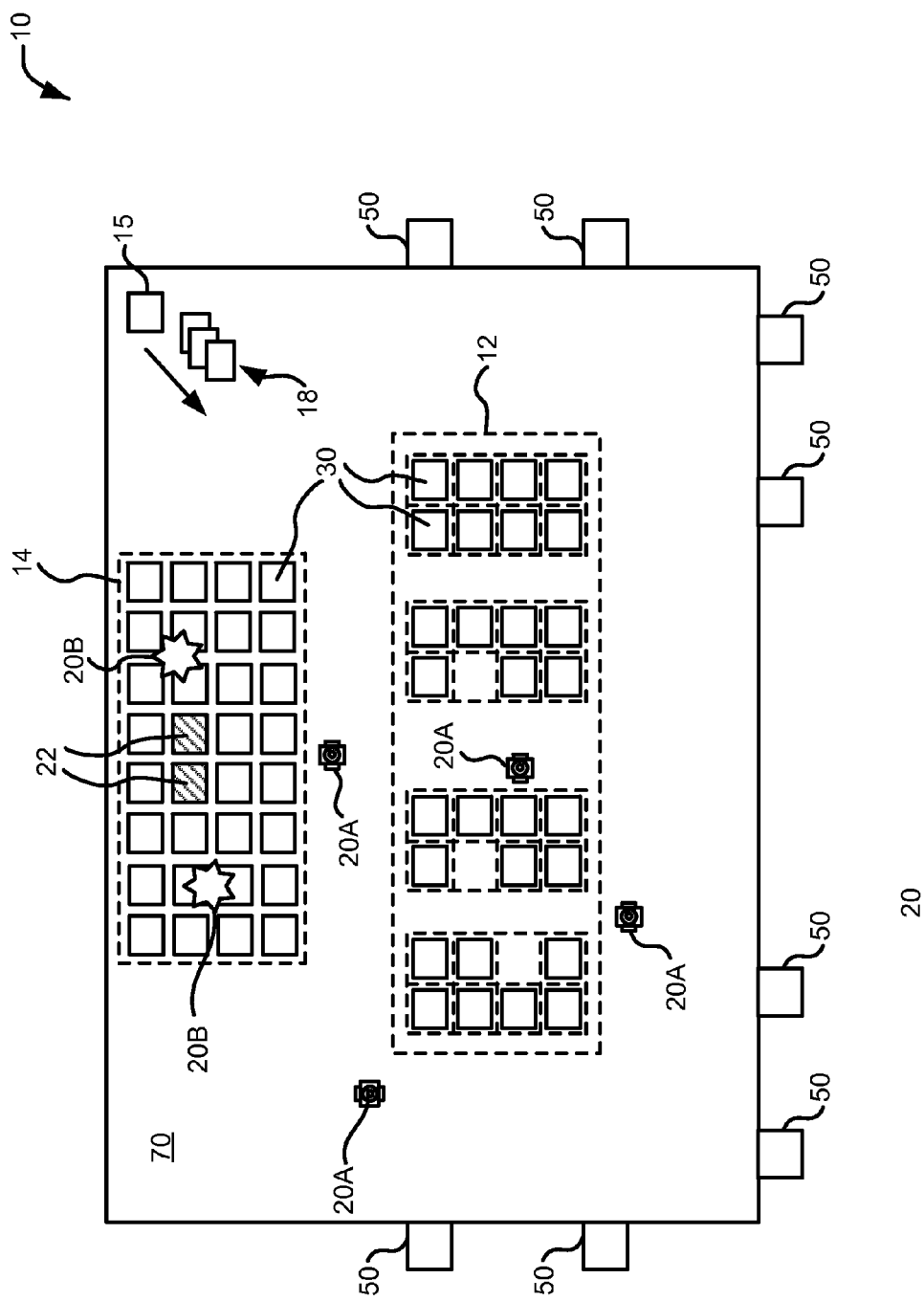
FIG. 2 illustrates an example of an inventory system in a top-down view, in accordance with embodiments.

FIG. 2 illustrates an example of an inventory system 10 in a top-down view, in accordance with embodiments. Inventory system 10 includes a management module 15, one or more mobile drive units 20 including ground drive units 20A and overhead drive units 20B, one or more inventory holders 30, and one or more inventory stations 50. Mobile drive units 20 transport inventory holders 30 between points within a workspace 70 in response to commands communicated by management module 15. Each inventory holder 30 stores one or more types of inventory items. As a result, inventory system 10 is capable of moving inventory items between locations within workspace 70 to facilitate the entry, processing, and/or removal of inventory items from inventory system 10 and the completion of other tasks involving inventory items.

Management module 15 assigns tasks to appropriate components of inventory system 10 and coordinates operation of the various components in completing the tasks. These tasks may relate not only to the movement and processing of inventory items, but also to the management and maintenance of the components of inventory system 10. For example, management module 15 may assign portions of workspace 70 as parking spaces for mobile drive units 20, the scheduled recharge or replacement of mobile drive unit batteries, the storage of empty inventory holders 30, or any other operations associated with the functionality supported by inventory system 10 and its various components. Management module 15 may select components of inventory system 10 to perform these tasks and communicate appropriate commands and/or data to the selected components to facilitate completion of these operations. Although shown in FIG. 2 as a single, discrete component, management module 15 may represent multiple components and may represent or include portions of mobile drive units 20 or other elements of inventory system 10. As a result, any or all of the interaction between a particular mobile drive unit 20 and management module 15 that is described below may, in particular embodiments, represent peer-to-peer communication between that mobile drive unit 20 and one or more other mobile drive units 20. The contents and operation of an example embodiment of management module 15 are discussed further below with respect to FIG. 3.

Mobile drive units 20 may be configured to move transportable objects between locations within workspace 70. Transportable objects can include an inventory holder, a detachable component of an inventory holder that is configured to store one or more inventory items, or an inventory item itself. A detachable component of the inventory holder can include a tray, a tote, a box, a segment, a compartment, or any suitable structure that is configured to accommodate one or more inventory items and detachable from an inventory holder. A detachable component that is transportable by an overhead drive unit is typically located at or near the top of an inventory holder.

Mobile drive units 20 may represent any devices or components appropriate for use in inventory system 10 based on the characteristics and configuration of inventory holders 30 and/or other elements of inventory system 10. In a particular embodiment of inventory system 10, mobile drive units 20 represent independent, self-powered devices configured to freely move about workspace 70. Examples of such inventory systems are disclosed in U.S. Patent Publication No. 2012/0143427, published on Jun. 7, 2012, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, mobile drive units 20 represent elements of a tracked inventory system configured to move inventory holder 30 along tracks, rails, cables, crane system, or other guidance or support elements traversing workspace 70. In such an embodiment, mobile drive units 20 may receive power and/or support through a connection to the guidance elements, such as a powered rail. Additionally, in particular embodiments of inventory system 10 mobile drive units 20 may be configured to utilize alternative conveyance equipment to move within workspace 70 and/or between separate portions of workspace 70. The contents and operation of an example embodiment of a mobile drive unit 20 are discussed further below with respect to FIGS. 7-9.

In some embodiments, mobile drive units 20 can include ground drive units 20A, overhead drive units 20B, and/or other types of drive units. Ground drive units 20A can be configured to move objects primarily along a floor of the workspace. Examples of ground drive units are provided in FIGS. 4 and 5. Overhead drive units can be configured to move objects in a space above the top portions of one or more inventory holders 30. Examples of an overhead drive unit can include an unmanned aerial vehicle (UAV), an overhead crane assembly, a wall-mounted crane assembly, a mobile crane, a fixed crane, and the like, such as discussed in FIG. 7.

An overhead drive unit can be distinguished from a ground drive unit in several aspects. An overhead drive unit is configured to cause a transportable object to move in the air over a top of at least one more inventory holders. In contrast, a ground drive unit typically causes an inventory holder to move along a floor of a storage space. As such, the ground drive unit may cause the inventory holder to pass by other inventory holders laterally but not over the top. Additionally, in some embodiments, an overhead drive unit may engage with a top portion or a side portion of a transportable object in order to lift up and/or lower the object. In contrast, in some embodiments, a ground drive unit may interface primarily with a bottom portion of an inventory holder so as to cause primarily horizontal movement of an inventory holder. Finally, in some embodiments, an overhead drive unit can be configured to identify a transportable object from above the object or near a top portion of the object. In contrast, a ground drive unit may be configured to identify an inventory holder near a bottom portion of the inventory holder according to some embodiments.

Mobile drive units 20 may be capable of communicating with management module 15 to receive information identifying selected inventory holders 30, transmit the locations of mobile drive units 20, or exchange any other suitable information to be used by management module 15 or mobile drive units 20 during operation. Mobile drive units 20 may communicate with management module 15 wirelessly, using wired connections between mobile drive units 20 and management module 15, and/or in any other appropriate manner. As one example, particular embodiments of mobile drive unit 20 may communicate with management module 15 and/or with one another using 802.11, Bluetooth, or Infrared Data Association (IrDA) standards, or any other appropriate wireless communication protocol. As another example, in a tracked inventory system 10, tracks or other guidance elements upon which mobile drive units 20 move may be wired to facilitate communication between mobile drive units 20 and other components of inventory system 10. Furthermore, as noted above, management module 15 may include components of individual mobile drive units 20. Thus, for the purposes of this description and the claims that follow, communication between management module 15 and a particular mobile drive unit 20 may represent communication between components of a particular mobile drive unit 20. In general, mobile drive units 20 may be powered, propelled, and controlled in any manner appropriate based on the configuration and characteristics of inventory system 10.

Inventory holders 30 store inventory items. In a particular embodiment, inventory holders 30 include multiple storage bins with each storage bin capable of holding one or more types of inventory items. Inventory holders 30 are capable of being carried, rolled, and/or otherwise moved by mobile drive units 20. In particular embodiments, inventory holder 30 may provide additional propulsion to supplement that provided by mobile drive unit 20 when moving inventory holder 30.

Additionally, in particular embodiments, inventory items 40 may also hang from hooks or bars (not shown) within or on inventory holder 30. In general, inventory holder 30 may store inventory items 40 in any appropriate manner within inventory holder 30 and/or on the external surface of inventory holder 30.

Additionally, each inventory holder 30 may include a plurality of faces, and each bin may be accessible through one or more faces of the inventory holder 30. For example, in a particular embodiment, inventory holder 30 includes four faces. In such an embodiment, bins located at a corner of two faces may be accessible through either of those two faces, while each of the other bins is accessible through an opening in one of the four faces. Mobile drive unit 20 may be configured to rotate inventory holder 30 at appropriate times to present a particular face and the bins associated with that face to an operator or other components of inventory system 10.

Inventory items represent any objects suitable for storage, retrieval, and/or processing in an automated inventory system 10. For the purposes of this description, "inventory items" may represent any one or more objects of a particular type that are stored in inventory system 10. Thus, a particular inventory holder 30 is currently "storing" a particular inventory item if the inventory holder 30 currently holds one or more units of that type. As one example, inventory system 10 may represent a mail order warehouse facility, and inventory items may represent merchandise stored in the warehouse facility. During operation, mobile drive units 20 may retrieve inventory holders 30 containing one or more inventory items requested in an order to be packed for delivery to a customer or inventory holders 30 carrying pallets containing aggregated collections of inventory items for shipment. Moreover, in particular embodiments of inventory system 10, boxes containing completed orders may themselves represent inventory items.

In particular embodiments, inventory system 10 may also include one or more inventory stations 50. Inventory stations 50 represent locations designated for the completion of particular tasks involving inventory items. Such tasks may include the removal of inventory items from inventory holders 30, the introduction of inventory items into inventory holders 30, the counting of inventory items in inventory holders 30, the decomposition of inventory items (e.g. from pallet- or case-sized groups to individual inventory items), the consolidation of inventory items between inventory holders 30, and/or the processing or handling of inventory items in any other suitable manner. In particular embodiments, inventory stations 50 may just represent the physical locations where a particular task involving inventory items can be completed within workspace 70. In alternative embodiments, inventory stations 50 may represent both the physical location and also any appropriate equipment for processing or handling inventory items, such as scanners for monitoring the flow of inventory items in and out of inventory system 10, communication interfaces for communicating with management module 15, and/or any other suitable components. Inventory stations 50 may be controlled, entirely or in part, by human operators or may be fully automated. Moreover, the human or automated operators of inventory stations 50 may be capable of performing certain tasks to inventory items, such as packing, counting, or transferring inventory items, as part of the operation of inventory system 10.

Workspace 70 represents an area associated with inventory system 10 in which mobile drive units 20 can move and/or inventory holders 30 can be stored. For example, workspace 70 may represent all or part of the floor of a mail-order warehouse in which inventory system 10 operates. Although FIG. 2 shows, for the purposes of illustration, an embodiment of inventory system 10 in which workspace 70 includes a fixed, predetermined, and finite physical space, particular embodiments of inventory system 10 may include mobile drive units 20 and inventory holders 30 that are configured to operate within a workspace 70 that is of variable dimensions and/or an arbitrary geometry. While FIG. 2 illustrates a particular embodiment of inventory system 10 in which workspace 70 is entirely enclosed in a building, alternative embodiments may utilize workspaces 70 in which some or all of the workspace 70 is located outdoors, within a vehicle (such as a cargo ship), or otherwise unconstrained by any fixed structure.

In some embodiments, the workspace 70 may be divided according to the frequency at which inventory items are accessed such as discussed above. More frequently accessed items may be stored in a high-frequency storage area 12 whereas less frequently accessed items may be stored in a low-frequency storage area 14. The high-frequency storage area 12 may be configured to provide fast access inventory items stored therein. For instance, the inventory holders 30 in the high-frequency storage area 12 may be arranged loosely so as to leave pathways to accommodate lateral movement of inventory holders by ground drive units. Furthermore, the high-frequency storage area may be located near places where the inventory items are needed such as the inventory stations 50.

The less frequently access items may be stored in a low-frequency storage area 14. The low-frequency storage area may be configured to provide efficient space usage. As such, the inventory holders within the low-frequency storage area may be arranged more closely to each other than the inventory holders within the high-frequency storage. In some cases, some of the inventory holders in the low-frequency storage area 14 may not be connected to a pathway that is wide enough to allow movement of the inventory holders to move out of the high-frequency storage area. Such hard-to-reach inventory holders 22 may be located at or near a center of the low-frequency storage area and/or blocked by other inventory holders. Additionally, the low-frequency storage area may be located farther away from the inventory stations to make room for the storage of more frequently used items (e.g., in the high-frequency storage area 12).

In various embodiments, the workspace may be segmented to two, three, four, or more different storage areas according to different levels of access frequency. For instance, the storage area may be divided into a low-frequency storage area, a medium-frequency storage area, and a high-frequency storage area. The items in the low-frequency storage are may be more tightly packed than the items in the medium-frequency storage area; and the items in the medium-frequency storage are may be more tightly packed than the items in the high-frequency storage area. Additionally, the storage area may be segmented according to factors other than the frequency at which the stored inventory items are accessed. Such factors may include the types (e.g., household items, office supplies, and toys), weights, expiration dates, expected shipping destinations, and the like.

In operation, management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of mobile drive units 20, inventory holders 30, inventory stations 50 and other components of inventory system 10. Depending on the component and the task to be completed, a particular task assignment 18 may identify locations, components, and/or actions associated with the corresponding task and/or any other appropriate information to be used by the relevant component in completing the assigned task.

In particular embodiments, management module 15 generates task assignments 18 based, in part, on inventory requests that management module 15 receives from other components of inventory system 10 and/or from external components in communication with management module 15. These inventory requests identify particular operations to be completed involving inventory items stored or to be stored within inventory system 10 and may represent communication of any suitable form. For example, in particular embodiments, an inventory request may represent a shipping order specifying particular inventory items that have been purchased by a customer and that are to be retrieved from inventory system 10 for shipment to the customer. Management module 15 may also generate task assignments 18 independently of such inventory requests, as part of the overall management and maintenance of inventory system 10. For example, management module 15 may generate task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of inventory system 10. After generating one or more task assignments 18, management module 15 transmits the generated task assignments 18 to appropriate components for completion of the corresponding task. The relevant components then execute their assigned tasks.

With respect to mobile drive units 20 specifically, management module 15 may, in particular embodiments, communicate task assignments 18 to selected mobile drive units 20 that identify one or more destinations for the selected mobile drive units 20. Management module 15 may select a mobile drive unit 20 to assign the relevant task based on a location of the inventory item associated with a task assignment. The location of an inventory item may include a global position within the workspace and/or a relative position within an inventory holder (e.g., top, middle, or low). The selection of the mobile drive units may be based on a storage density of the storage location for the inventory item and/or a cost related to the retrieval and/or storage of the inventory item. For example, an overhead drive unit 20B may be selected, instead of a ground drive unit 20A, to transport an object out of and/or into a high-density area such as low-frequency storage area 14 discussed above. On the other hand, a ground drive unit 20A may be selected to transport an object out of and/or into a low-density area such as a high-frequency storage area 12. In some embodiments, a combination of ground drive units 20A and overhead drive units 20B can be used to complete a specific task assignment. The selection of the mobile drive units may also be based on a relative position of the inventory item within an inventory holder. For example, when an inventory item is located in a top detachable component (e.g., tray, compartment, or tote) of an inventory holder, a lightweight, low-capacity overhead drive unit may be used to transport only the top component of the inventory holder. When the inventory item is located in a middle detachable component of an inventory holder, a higher-capacity overhead drive unit may be used to transport the middle component and all the other components on top of the middle component. In an extreme case, when the inventory item is located in a bottom component of an inventory holder, an even higher-capacity overhead drive unit may be used to transport the entire inventory holder.

Additionally or alternatively, the selection of a mobile drive unit 20 to assign the relevant task can be based on a state of the selected mobile drive unit 20, an indication that the selected mobile drive unit 20 has completed a previously-assigned task, a predetermined schedule, and/or any other suitable consideration.

The task assignments 18 can identify one or more destinations for the selected mobile drive units 20. These destinations may be associated with an inventory request the management module 15 is executing or a management objective the management module 15 is attempting to fulfill. For example, the task assignment may define the location of a transportable object (e.g., an inventory holder 30, a detachable component of an inventory holder, or an inventory item) to be retrieved, an inventory station 50 to be visited, a storage location where the mobile drive unit 20 should park until receiving another task, or a location associated with any other task appropriate based on the configuration, characteristics, and/or state of inventory system 10, as a whole, or individual components of inventory system 10. For example, in particular embodiments, such decisions may be based on the popularity of particular inventory items, the staffing of a particular inventory station 50, the tasks currently assigned to a particular mobile drive unit 20, timing and/or cost constraints associated with the tasks (e.g., packing or shipping deadlines), resource constrains (e.g., battery charge status of a mobile drive unit 20, weight or size of an object to be moved) and/or any other appropriate considerations.

As part of completing these tasks mobile drive units 20 may dock with and transport inventory holders 30 within workspace 70. Mobile drive units 20 may dock with inventory holders 30 by connecting to, lifting, and/or otherwise interacting with inventory holders 30 in any other suitable manner so that, when docked, mobile drive units 20 are coupled to and/or support inventory holders 30 and can move inventory holders 30 within workspace 70. While the description below focuses on particular embodiments of mobile drive unit 20 and inventory holder 30 that are configured to dock in a particular manner, alternative embodiments of mobile drive unit 20 and inventory holder 30 may be configured to dock in any manner suitable to allow mobile drive unit 20 to move inventory holder 30 within workspace 70. Additionally, as noted below, in particular embodiments, mobile drive units 20 represent all or portions of inventory holders 30. In such embodiments, mobile drive units 20 may not dock with inventory holders 30 before transporting inventory holders 30 and/or mobile drive units 20 may each remain continually docked with a particular inventory holder 30.

While the appropriate components of inventory system 10 complete assigned tasks, management module 15 may interact with the relevant components to ensure the efficient use of space, equipment, manpower, and other resources available to inventory system 10. As one specific example of such interaction, management module 15 is responsible, in particular embodiments, for planning the paths mobile drive units 20 take when moving within workspace 70 and for allocating use of a particular portion of workspace 70 to a particular mobile drive unit 20 for purposes of completing an assigned task. In such embodiments, mobile drive units 20 may, in response to being assigned a task, request a path to a particular destination associated with the task. Moreover, while the description below focuses on one or more embodiments in which mobile drive unit 20 requests paths from management module 15, mobile drive unit 20 may, in alternative embodiments, generate its own paths.

Components of inventory system 10 may provide information to management module 15 regarding their current state, other components of inventory system 10 with which they are interacting, and/or other conditions relevant to the operation of inventory system 10. This may allow management module 15 to utilize feedback from the relevant components to update algorithm parameters, adjust policies, or otherwise modify its decision-making to respond to changes in operating conditions or the occurrence of particular events.

In addition, while management module 15 may be configured to manage various aspects of the operation of the components of inventory system 10, in particular embodiments, the components themselves may also be responsible for decision-making relating to certain aspects of their operation, thereby reducing the processing load on management module 15. For instance, a mobile drive units 20 (e.g., an overhead drive unit or a ground drive unit) may be configured to navigate autonomously to a designated location while avoiding collision with obstacles.

Thus, based on its knowledge of the location, current state, and/or other characteristics of the various components of inventory system 10 and an awareness of all the tasks currently being completed, management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 10 may be able to support a number of techniques for efficiently executing various aspects of the operation of inventory system 10. As a result, particular embodiments of management module 15 may, by implementing one or more management techniques described below, enhance the efficiency of inventory system 10 and/or provide other operational benefits.

Figure 3:
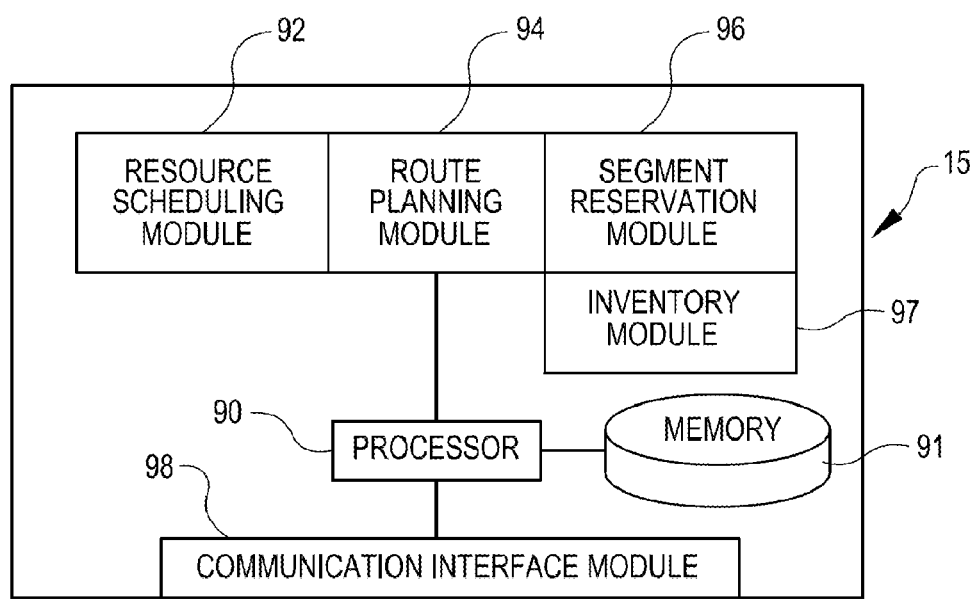
FIG. 3 illustrates in greater detail the components of an example management module that may be utilized in particular embodiments of the inventory system shown in FIG. 2.

FIG. 3 illustrates in greater detail the components of a particular embodiment of management module 15. As shown, the example embodiment includes a resource scheduling module 92, a route planning module 94, a segment reservation module 96, an inventory module 97, a communication interface module 98, a processor 90, and a memory 91. Management module 15 may represent a single component, multiple components located at a central location within inventory system 10, or multiple components distributed throughout inventory system 10. For example, management module 15 may represent components of one or more mobile drive units 20 that are capable of communicating information between the mobile drive units 20 and coordinating the movement of mobile drive units 20 within workspace 70. In general, management module 15 may include any appropriate combination of hardware and/or software suitable to provide the described functionality.

Processor 90 is operable to execute instructions associated with the functionality provided by management module 15. Processor 90 may comprise one or more general purpose computers, dedicated microprocessors, or other processing devices capable of communicating electronic information. Examples of processor 90 include one or more application-specific integrated circuits (ASICs), field programmable gate arrays (FPGAs), digital signal processors (DSPs) and any other suitable specific or general purpose processors.

Memory 91 stores processor instructions, inventory requests, reservation information, state information for the various components of inventory system 10 and/or any other appropriate values, parameters, or information utilized by management module 15 during operation. Memory 91 may represent any collection and arrangement of volatile or nonvolatile, local or remote devices suitable for storing data. Examples of memory 91 include, but are not limited to, random access memory (RAM) devices, read only memory (ROM) devices, magnetic storage devices, optical storage devices or any other suitable data storage devices.

Resource scheduling module 92 processes received inventory requests and generates one or more assigned tasks to be completed by the components of inventory system 10. Resource scheduling module 92 may also select one or more appropriate components for completing the assigned tasks and, using communication interface module 98, communicate the assigned tasks to the relevant components. Additionally, resource scheduling module 92 may also be responsible for generating assigned tasks associated with various management operations, such as prompting mobile drive units 20 to recharge batteries or have batteries replaced, instructing inactive mobile drive units 20 to park in a location outside the anticipated traffic flow or a location near the anticipated site of future tasks, and/or directing mobile drive units 20 selected for repair or maintenance to move towards a designated maintenance station.

Route planning module 94 receives route requests from mobile drive units 20. These route requests identify one or more destinations associated with a task the requesting mobile drive unit 20 is executing. In response to receiving a route request, route planning module 94 generates a path to one or more destinations identified in the route request. Route planning module 94 may implement any appropriate algorithms utilizing any appropriate parameters, factors, and/or considerations to determine the appropriate path. After generating an appropriate path, route planning module 94 transmits a route response identifying the generated path to the requesting mobile drive unit 20 using communication interface module 98.

Segment reservation module 96 receives reservation requests from mobile drive units 20 attempting to move along paths generated by route planning module 94. These reservation requests request the use of a particular portion of workspace 70 (referred to herein as a "segment") to allow the requesting mobile drive unit 20 to avoid collisions with other mobile drive units 20 while moving across the reserved segment. In response to received reservation requests, segment reservation module 96 transmits a reservation response granting or denying the reservation request to the requesting mobile drive unit 20 using the communication interface module 98.

The inventory module 97 maintains information about the location and number of inventory items 40 in the inventory system 10. Information can be maintained about the number of inventory items 40 in a particular inventory holder 30, and the maintained information can include the location of those inventory items 40 in the inventory holder 30. The inventory module 97 can also communicate with the mobile drive units 20, utilizing task assignments 18 to maintain, replenish, or move inventory items 40 within the inventory system 10.

Communication interface module 98 facilitates communication between management module 15 and other components of inventory system 10, including reservation responses, reservation requests, route requests, route responses, and task assignments. These reservation responses, reservation requests, route requests, route responses, and task assignments may represent communication of any form appropriate based on the capabilities of management module 15 and may include any suitable information. Depending on the configuration of management module 15, communication interface module 98 may be responsible for facilitating either or both of wired and wireless communication between management module 15 and the various components of inventory system 10. In particular embodiments, management module 15 may communicate using communication protocols such as 802.11, Bluetooth, or Infrared Data Association (IrDA) standards. Furthermore, management module 15 may, in particular embodiments, represent a portion of mobile drive unit 20 or other components of inventory system 10. In such embodiments, communication interface module 98 may facilitate communication between management module 15 and other parts of the same system component.

In general, resource scheduling module 92, route planning module 94, segment reservation module 96, inventory module 97, and communication interface module 98 may each represent any appropriate hardware and/or software suitable to provide the described functionality. In addition, as noted above, management module 15 may, in particular embodiments, represent multiple different discrete components and any or all of resource scheduling module 92, route planning module 94, segment reservation module 96, inventory module 97, and communication interface module 98 may represent components physically separate from the remaining elements of management module 15. Moreover, any two or more of resource scheduling module 92, route planning module 94, segment reservation module 96, inventory module 97, and communication interface module 98 may share common components. For example, in particular embodiments, resource scheduling module 92, route planning module 94, segment reservation module 96, and inventory module 97 represent computer processes executing on processor 90 and communication interface module 98 comprises a wireless transmitter, a wireless receiver, and a related computer process executing on processor 90. The systems and methods described herein can be implemented by and/or applied to a wide variety of mobile drive units. A mobile drive unit can be configured to move within any suitable environment, such as in air (e.g., a fixed-wing aircraft, a rotary-wing aircraft, or an aircraft having neither fixed wings nor rotary wings), on ground (e.g., a motorized vehicle or robot), or any combination of these environments. In some embodiments, the mobile drive unit can be mounted on a fixed object (e.g., a wall, a floor, a ceiling) or a mobile object (e.g., a movable platform).

The mobile drive unit may be capable of moving freely within the environment with respect to six degrees of freedom (e.g., three degrees of freedom in translation and three degrees of freedom in rotation). Alternatively, the movement of the mobile drive unit can be constrained with respect to one or more degrees of freedom, such as by a predetermined boundary, path, track, or orientation. The movement can be actuated by any suitable actuation mechanism, such as an engine or a motor. The actuation mechanism of the mobile drive unit can be powered by any suitable energy source, such as electrical energy, magnetic energy, solar energy, wind energy, gravitational energy, chemical energy, nuclear energy, or any suitable combination thereof. The mobile drive unit may be propelled using a propulsion system. The propulsion system can include one or more engines, motors, wheels, axles, magnets, rotors, propellers, blades, nozzles, or any suitable combination thereof. In some instances, the propulsion system can be used to enable the mobile drive unit (e.g., an UAV) to take off from a surface, land on a surface, maintain its current position and/or orientation (e.g., hover), change orientation, and/or change position.

The mobile drive unit can be controlled remotely and/or locally by a human, an autonomous control system, or any suitable combination thereof. The mobile drive unit can include or be included in an autonomous or semi-autonomous robotic component configured with an artificial intelligence.

Figure 4:
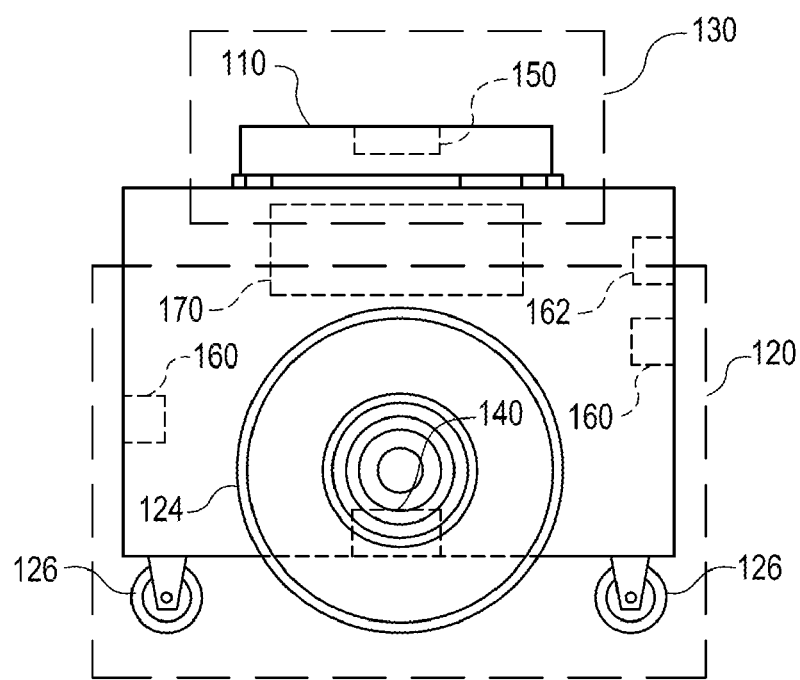
FIGS. 4 and 5 illustrate in greater detail an example mobile drive unit that may be utilized in particular embodiments of the inventory system shown in FIG. 2.
Figure 5:
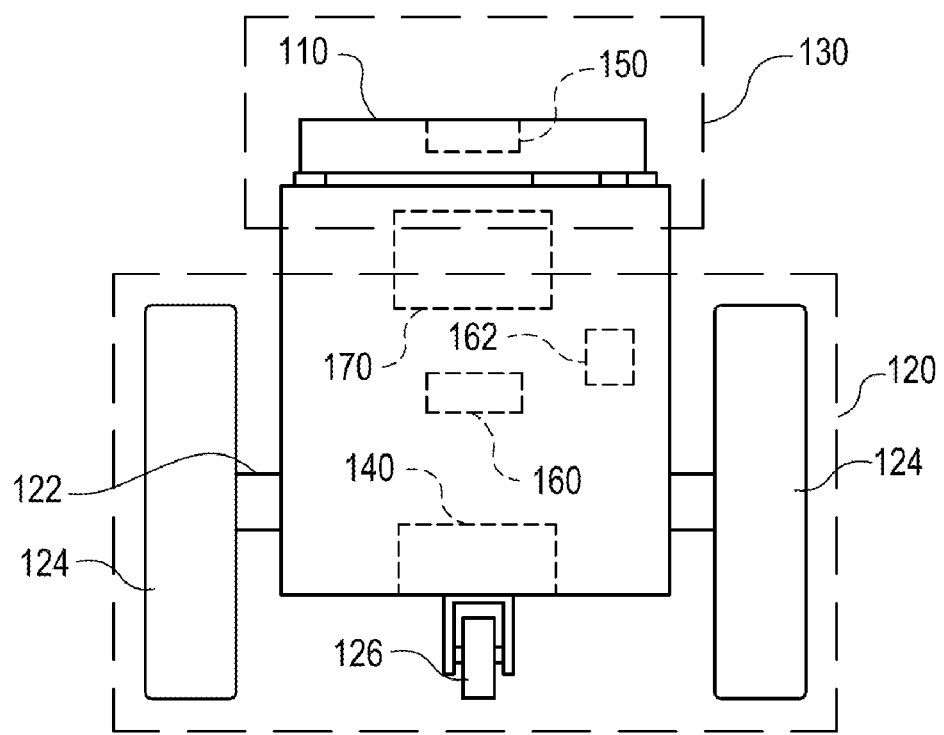

FIGS. 4 and 5 illustrate in greater detail the components of a particular embodiment of mobile drive unit 20. In particular, FIGS. 4 and 5 include a front and side view of an example mobile drive unit 20. The illustrated mobile drive unit 20 can be an example of a ground drive unit discussed herein. Mobile drive unit 20 includes a docking head 110, a drive module 120, a docking actuator 130, and a control module 170. Additionally, mobile drive unit 20 may include one or more sensors configured to detect or determine the location of mobile drive unit 20, inventory holder 30, and/or other appropriate elements of inventory system 10. In the illustrated embodiment, mobile drive unit 20 includes a position sensor 140, a holder sensor 150, an obstacle sensor 160, and an identification signal transmitter 162.

Docking head 110, in particular embodiments of mobile drive unit 20, couples mobile drive unit 20 to inventory holder 30 and/or supports inventory holder 30 when mobile drive unit 20 is docked to inventory holder 30. Docking head 110 may additionally allow mobile drive unit 20 to maneuver inventory holder 30, such as by lifting inventory holder 30, propelling inventory holder 30, rotating inventory holder 30, and/or moving inventory holder 30 in any other appropriate manner. Docking head 110 may also include any appropriate combination of components, such as ribs, spikes, and/or corrugations, to facilitate such manipulation of inventory holder 30. For example, in particular embodiments, docking head 110 may include a high-friction portion that abuts a portion of inventory holder 30 while mobile drive unit 20 is docked to inventory holder 30. In such embodiments, frictional forces created between the high-friction portion of docking head 110 and a surface of inventory holder 30 may induce translational and rotational movement in inventory holder 30 when docking head 110 moves and rotates, respectively. As a result, mobile drive unit 20 may be able to manipulate inventory holder 30 by moving or rotating docking head 110, either independently or as a part of the movement of mobile drive unit 20 as a whole.

Drive module 120 propels mobile drive unit 20 and, when mobile drive unit 20 and inventory holder 30 are docked, inventory holder 30. Drive module 120 may represent any appropriate collection of components operable to propel mobile drive unit 20. For example, in the illustrated embodiment, drive module 120 includes motorized axle 122, a pair of motorized wheels 124, and a pair of stabilizing wheels 126. One motorized wheel 124 is located at each end of motorized axle 122, and one stabilizing wheel 126 is positioned at each end of mobile drive unit 20.

Docking actuator 130 moves docking head 110 towards inventory holder 30 to facilitate docking of mobile drive unit 20 and inventory holder 30. Docking actuator 130 may also be capable of adjusting the position or orientation of docking head 110 in other suitable manners to facilitate docking. Docking actuator 130 may include any appropriate components, based on the configuration of mobile drive unit 20 and inventory holder 30, for moving docking head 110 or otherwise adjusting the position or orientation of docking head 110. For example, in the illustrated embodiment, docking actuator 130 includes a motorized shaft (not shown) attached to the center of docking head 110. The motorized shaft is operable to lift docking head 110 as appropriate for docking with inventory holder 30.

Drive module 120 may be configured to propel mobile drive unit 20 in any appropriate manner. For example, in the illustrated embodiment, motorized wheels 124 are operable to rotate in a first direction to propel mobile drive unit 20 in a forward direction. Motorized wheels 124 are also operable to rotate in a second direction to propel mobile drive unit 20 in a backward direction. In the illustrated embodiment, drive module 120 is also configured to rotate mobile drive unit 20 by rotating motorized wheels 124 in different directions from one another or by rotating motorized wheels 124 at different speeds from one another.

Position sensor 140 represents one or more sensors, detectors, or other components suitable for determining the location of mobile drive unit 20 in any appropriate manner. For example, in particular embodiments, the workspace 70 associated with inventory system 10 includes a number of fiducial marks that mark points on a two-dimensional grid that covers all or a portion of workspace 70. In such embodiments, position sensor 140 may include a camera and suitable image- and/or video-processing components, such as an appropriately-programmed digital signal processor, to allow position sensor 140 to detect fiducial marks within the camera's field of view. Control module 170 may store location information that position sensor 140 updates as position sensor 140 detects fiducial marks. As a result, position sensor 140 may utilize fiducial marks to maintain an accurate indication of the location mobile drive unit 20 and to aid in navigation when moving within workspace 70.

Holder sensor 150 represents one or more sensors, detectors, or other components suitable for detecting inventory holder 30 and/or determining, in any appropriate manner, the location of inventory holder 30, as an absolute location or as a position relative to mobile drive unit 20. Holder sensor 150 may be capable of detecting the location of a particular portion of inventory holder 30 or inventory holder 30 as a whole. Mobile drive unit 20 may then use the detected information for docking with or otherwise interacting with inventory holder 30.

Obstacle sensor 160 represents one or more sensors capable of detecting objects located in one or more different directions in which mobile drive unit 20 is capable of moving. Obstacle sensor 160 may utilize any appropriate components and techniques, including optical, radar, sonar, pressure-sensing and/or other types of detection devices appropriate to detect objects located in the direction of travel of mobile drive unit 20. In particular embodiments, obstacle sensor 160 may transmit information describing objects it detects to control module 170 to be used by control module 170 to identify obstacles and to take appropriate remedial actions to prevent mobile drive unit 20 from colliding with obstacles and/or other objects.

Obstacle sensor 160 may also detect signals transmitted by other mobile drive units 20 operating in the vicinity of the illustrated mobile drive unit 20. For example, in particular embodiments of inventory system 10, one or more mobile drive units 20 may include an identification signal transmitter 162 that transmits a drive identification signal. The drive identification signal indicates to other mobile drive units 20 that the object transmitting the drive identification signal is in fact a mobile drive unit. Identification signal transmitter 162 may be capable of transmitting infrared, ultraviolet, audio, visible light, radio, and/or other suitable signals that indicate to recipients that the transmitting device is a mobile drive unit 20.

Additionally, in particular embodiments, obstacle sensor 160 may also be capable of detecting state information transmitted by other mobile drive units 20. For example, in particular embodiments, identification signal transmitter 162 may be capable of including state information relating to mobile drive unit 20 in the transmitted identification signal. This state information may include, but is not limited to, the position, velocity, direction, and the braking capabilities of the transmitting mobile drive unit 20. In particular embodiments, mobile drive unit 20 may use the state information transmitted by other mobile drive units to avoid collisions when operating in close proximity with those other mobile drive units.

Control module 170 monitors and/or controls operation of drive module 120 and docking actuator 130. Control module 170 may also receive information from sensors such as position sensor 140 and holder sensor 150 and adjust the operation of drive module 120, docking actuator 130, and/or other components of mobile drive unit 20 based on this information. Additionally, in particular embodiments, mobile drive unit 20 may be configured to communicate with a management device of inventory system 10 and control module 170 may receive commands transmitted to mobile drive unit 20 and communicate information back to the management device utilizing appropriate communication components of mobile drive unit 20. Control module 170 may include any appropriate hardware and/or software suitable to provide the described functionality. In particular embodiments, control module 170 includes a general-purpose microprocessor programmed to provide the described functionality. Additionally, control module 170 may include all or portions of docking actuator 130, drive module 120, position sensor 140, and/or holder sensor 150, and/or share components with any of these elements of mobile drive unit 20.

Moreover, in particular embodiments, control module 170 may include hardware and software located in components that are physically distinct from the device that houses drive module 120, docking actuator 130, and/or the other components of mobile drive unit 20 described above. For example, in particular embodiments, each mobile drive unit 20 operating in inventory system 10 may be associated with a software process (referred to here as a "drive agent") operating on a server that is in communication with the device that houses drive module 120, docking actuator 130, and other appropriate components of mobile drive unit 20. This drive agent may be responsible for requesting and receiving tasks, requesting and receiving routes, transmitting state information associated with mobile drive unit 20, and/or otherwise interacting with management module 15 and other components of inventory system 10 on behalf of the device that physically houses drive module 120, docking actuator 130, and the other appropriate components of mobile drive unit 20. As a result, for the purposes of this description and the claims that follow, the term "mobile drive unit" includes software and/or hardware, such as agent processes, that provides the described functionality on behalf of mobile drive unit 20 but that may be located in physically distinct devices from the drive module 120, docking actuator 130, and/or the other components of mobile drive unit 20 described above.

While FIGS. 4 and 5 illustrate a particular embodiment of mobile drive unit 20 containing certain components and configured to operate in a particular manner, mobile drive unit 20 may represent any appropriate component and/or collection of components configured to transport and/or to facilitate the transport of inventory holders 30. As another example, mobile drive unit 20 may represent part of an overhead crane system in which one or more crane assemblies are capable of moving within a network of wires or rails to a position suitable to dock with a particular inventory holder 30. After docking with inventory holder 30, the crane assembly may then lift inventory holder 30 and move inventory to another location for purposes of completing an assigned task.

Furthermore, in particular embodiments, mobile drive unit 20 may represent all or a portion of inventory holder 30. Inventory holder 30 may include motorized wheels or any other components suitable to allow inventory holder 30 to propel itself. As one specific example, a portion of inventory holder 30 may be responsive to magnetic fields. Inventory system 10 may be able to generate one or more controlled magnetic fields capable of propelling, maneuvering and/or otherwise controlling the position of inventory holder 30 as a result of the responsive portion of inventory holder 30. In such embodiments, mobile drive unit 20 may represent the responsive portion of inventory holder 30 and/or the components of inventory system 10 responsible for generating and controlling these magnetic fields. While this description provides several specific examples, mobile drive unit 20 may, in general, represent any appropriate component and/or collection of components configured to transport and/or to facilitate the transport of inventory holders 30 or a component thereof.

Figure 6:
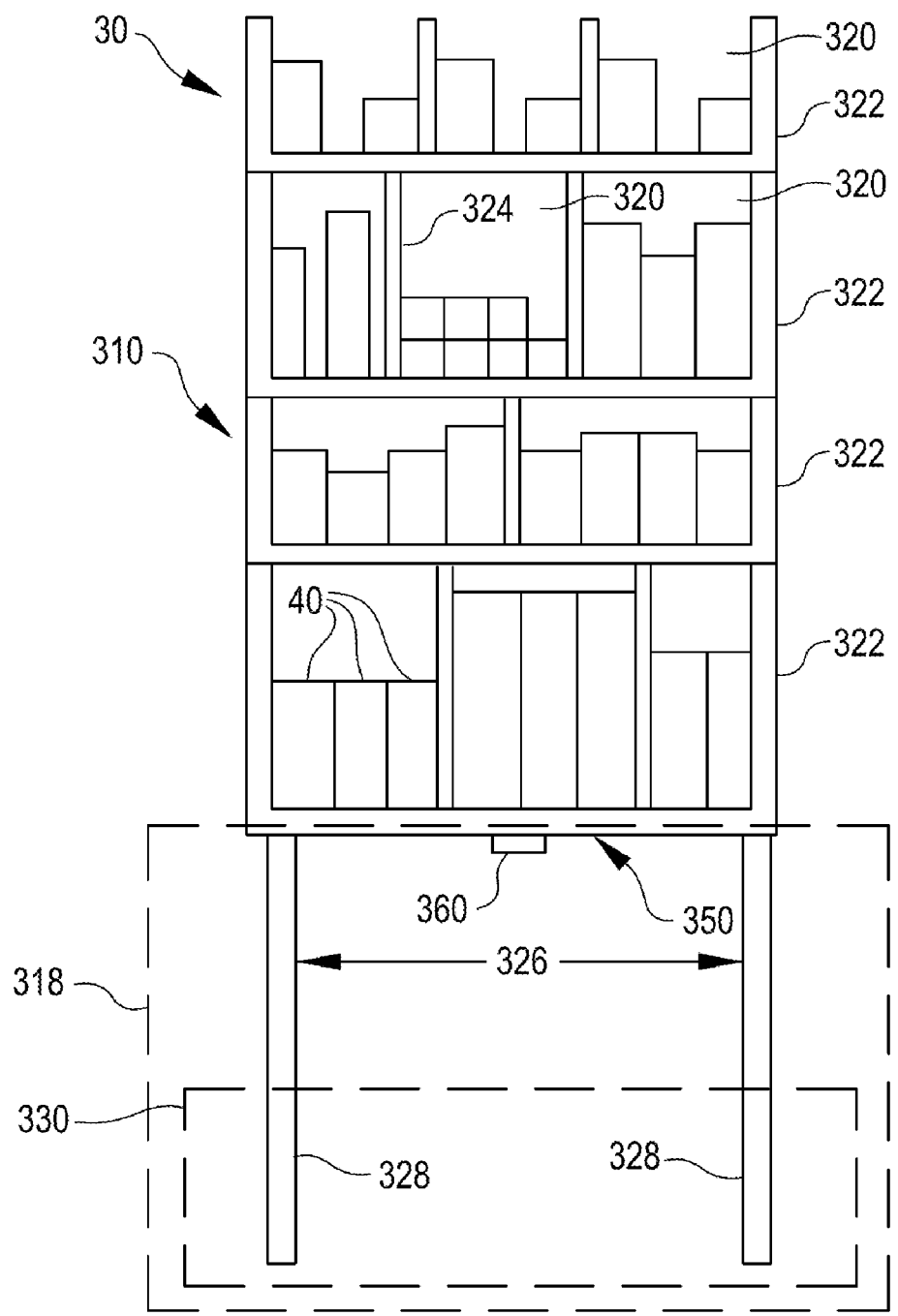
FIG. 6 illustrates in greater detail an example inventory holder that may be utilized in particular embodiments of the inventory system shown in FIG. 2.

FIG. 6 illustrates in greater detail the components of a particular embodiment of inventory holder 30. In particular, FIG. 6 illustrates the structure and contents of one side of an example inventory holder 30. In a particular embodiment, inventory holder 30 may comprise any number of faces with similar or different structure. As illustrated, inventory holder 30 includes a frame 310, a plurality of legs 328, and a docking surface 350.

Frame 310 holds inventory items 40. Frame 310 provides storage space for storing inventory items 40 external or internal to frame 310. The storage space provided by frame 310 may be divided into a plurality of inventory bins 320, each capable of holding inventory items 40. Inventory bins 320 may include any appropriate storage elements, such as bins, compartments, or hooks.

In a particular embodiment, frame 310 is composed of a plurality of trays 322 stacked upon one another and attached to or stacked on a base 318. In such an embodiment, inventory bins 320 may be formed by a plurality of adjustable dividers 324 that may be moved to resize one or more inventory bins 320. In alternative embodiments, frame 310 may represent a single inventory bin 320 that includes a single tray 322 and no adjustable dividers 324. Additionally, in particular embodiments, frame 310 may represent a load-bearing surface mounted on mobility element 330. Inventory items 40 may be stored on such an inventory holder 30 by being placed on frame 310. In general, frame 310 may include internal and/or external storage space divided into any appropriate number of inventory bins 320 in any appropriate manner.

Additionally, in a particular embodiment, frame 310 may include a plurality of device openings 326 that allow mobile drive unit 20 to position docking head 110 adjacent docking surface 350. The size, shape, and placement of device openings 326 may be determined based on the size, the shape, and other characteristics of the particular embodiment of mobile drive unit 20 and/or inventory holder 30 utilized by inventory system 10. For example, in the illustrated embodiment, frame 310 includes four legs 328 that form device openings 326 and allow mobile drive unit 20 to position mobile drive unit 20 under frame 310 and adjacent to docking surface 350. The length of legs 328 may be determined based on a height of mobile drive unit 20.

Docking surface 350 comprises a portion of inventory holder 30 that couples to, abuts, and/or rests upon a portion of docking head 110, when mobile drive unit 20 is docked to inventory holder 30. Additionally, docking surface 350 supports a portion or all of the weight of inventory holder 30 while inventory holder 30 is docked with mobile drive unit 20. The composition, shape, and/or texture of docking surface 350 may be designed to facilitate maneuvering of inventory holder 30 by mobile drive unit 20. For example, as noted above, in particular embodiments, docking surface 350 may comprise a high-friction portion. When mobile drive unit 20 and inventory holder 30 are docked, frictional forces induced between docking head 110 and this high-friction portion may allow mobile drive unit 20 to maneuver inventory holder 30. Additionally, in particular embodiments, docking surface 350 may include appropriate components suitable to receive a portion of docking head 110, couple inventory holder 30 to mobile drive unit 20, and/or facilitate control of inventory holder 30 by mobile drive unit 20.

Holder identifier 360 marks a predetermined portion of inventory holder 30 and mobile drive unit 20 may use holder identifier 360 to align with inventory holder 30 during docking and/or to determine the location of inventory holder 30. More specifically, in particular embodiments, mobile drive unit 20 may be equipped with components, such as holder sensor 150, that can detect holder identifier 360 and determine its location relative to mobile drive unit 20. As a result, mobile drive unit 20 may be able to determine the location of inventory holder 30 as a whole. For example, in particular embodiments, holder identifier 360 may represent a reflective marker that is positioned at a predetermined location on inventory holder 30 and that holder sensor 150 can optically detect using an appropriately-configured camera.

Depending on the configuration and characteristics of mobile drive unit 20 and inventory system 10, mobile drive unit 20 may move inventory holder 30 using a variety of appropriate methods. In a particular embodiment, mobile drive unit 20 is capable of moving inventory holder 30 along a two-dimensional grid, combining movement along straight-line segments with ninety-degree rotations and arcing paths to transport inventory holder 30 from the first location to the second location. Additionally, while moving, mobile drive unit 20 may use fixed objects located in the workspace as reference points to assist in navigation. For example, in particular embodiments, inventory system 10 includes multiple fiducial marks. Mobile drive unit 20 may be configured to detect fiducial marks and to determine the location of mobile drive unit 20 and/or measure its movement based on the detection of fiducial marks.

After mobile drive unit 20 arrives at the second location, mobile drive unit 20 may perform appropriate operations to facilitate access to inventory items 40 stored in inventory holder 30. For example, mobile drive unit 20 may rotate inventory holder 30 to present a particular face of inventory holder 30 to an operator of inventory system 10 or other suitable party, such as a packer selecting inventory items 40 from inventory holder 30. Mobile drive unit 20 may also undock from inventory holder 30. Alternatively, instead of undocking at the second location, mobile drive unit 20 may transport inventory holder 30 back to the first location or to a third location after any appropriate actions have been taken involving inventory items 40. For example, after a packer has removed particular inventory items 40 from inventory holder 30, mobile drive unit 20 may return inventory holder 30 to its original storage location, a new storage location, or another inventory station. Mobile drive unit 20 may then undock from inventory holder 30 at this new location.

Figure 7:
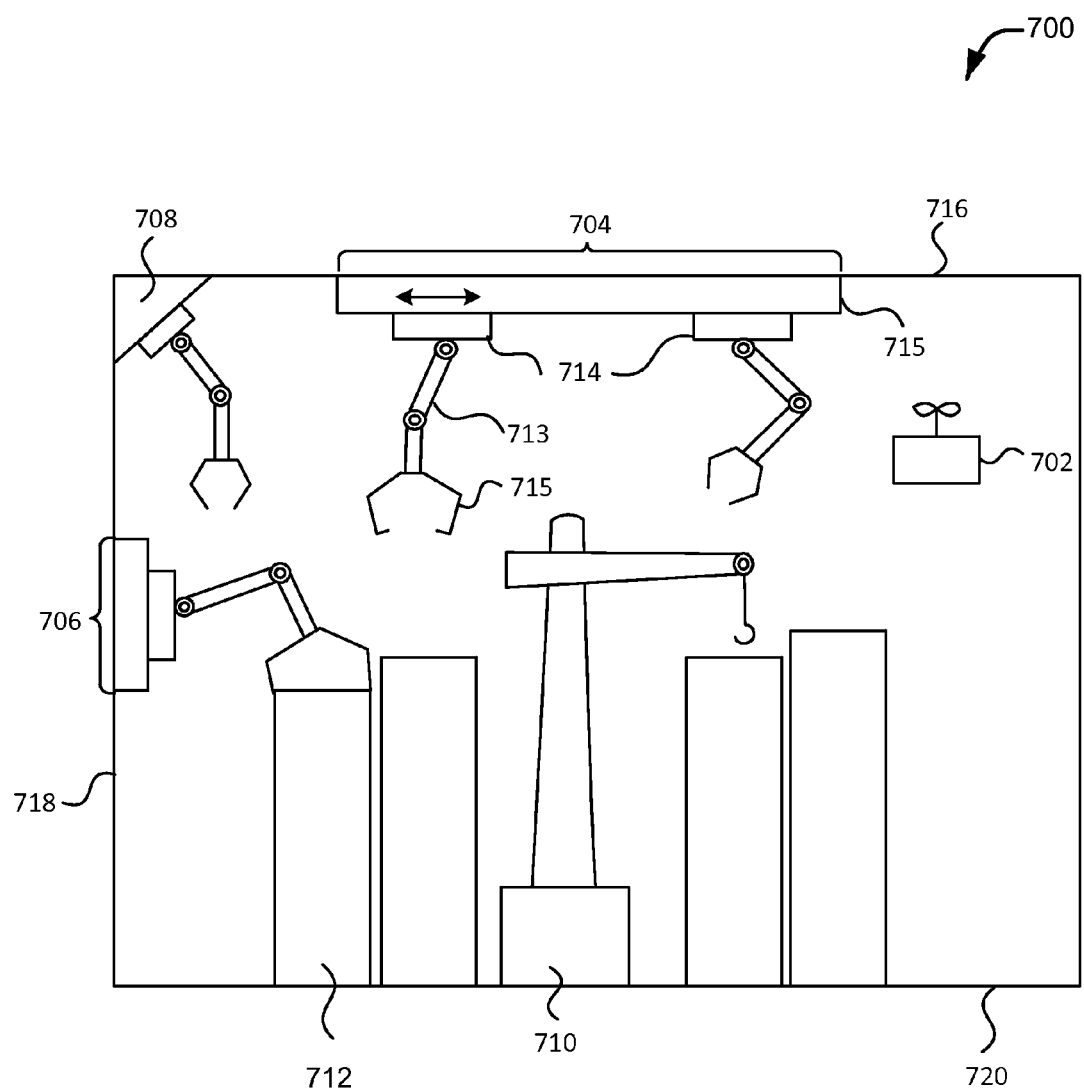
FIG. 7 illustrates some example overhead drive units, in accordance with embodiments.

According to an aspect of the present invention, overhead drive units are provided to transport inventory items in an inventory system. As discussed above, overhead drive units are configured to transport objects such as inventory holders, detachable components of inventory holders, or inventory items in the overhead space above inventory holders. FIG. 7 illustrates some example overhead drive units, in accordance with embodiments. An overhead drive unit can be capable of moving freely in the air such as an unmanned aerial vehicle (UAV) 702. The UAV can be configured to take off from a surface, land on a surface, maintain its current position and/or orientation (e.g., hover), change orientation, and/or change position. For instance, the UAV may be configured to move with respect to up to the six degrees of freedom (e.g., three degrees of freedom in translation and three degrees of freedom in rotation). In various embodiments, the UAV can be configured to locate, retrieve, and/or carry a transportable object such as an inventory holder, a detachable component of the inventory holder, or an inventory item. More detailed discussion with respect to the UAV is provided in FIGS. 8-9.

An overhead drive unit may be mounted or otherwise attached to any suitable surface in a workspace such as a wall, a ceiling, or a floor. For instance, an overhead drive unit can include or be included in a ceiling-mounted overhead drive system 704 attached to a ceiling 716 via a base 715. The ceiling-mounted drive system 704 may be similar to overhead crane system. The ceiling-mounted overhead drive system 704 may include one or more crane assemblies 714 that are fixedly or movably coupled to the base 715. For instance, the base 715 may include a network of wires or rails that allows the crane assemblies 714 to move along the ceiling to a position suitable to interface with a portion of an inventory holder 712. The crane assembly 714 may include an extension member 713 and a coupling member 715. The extension member may be connected to the base 715 at a proximal end and the coupling member 715 at a distal end. The extension member 713 may be configured to permit a change in a spatial disposition (e.g., position and/or orientation) of the coupling member 715. In various embodiments, the extension member 713 may or may not be extensible or retractable along one or more dimensions and may be made of a flexible or rigid material. For instance, the extension member 713 can include a winch, a robotic arm, a rope, a cable, a bar, a rail, a tube, or any combination thereof. The coupling member 715 may be configured to attract, draw, hook, clasp, scoop, grasp, enclose, capture, or otherwise engage with a portion of a transportable object (e.g., an inventory holder, a detachable component of the inventory holder, or an inventory item) such that the transportable object can be lifted up and/or lowered down. The coupling member may be configured to retain the object using friction, vacuum suction, opposing arms, magnets, and any other suitable retaining methods. The coupling member 715 can also be configured to unhook, separate from, ungrasp, un-grapple, uncouple with, or otherwise release the transportable object. More discussion about the coupling members are provided in connection with FIGS. 18 and 19.

An overhead drive unit also include or be included in a wall-mounted overhead drive system 706 that is attached to a wall 718, a corner-mounted overhead drive system 708 that is attached to a corner between a ceiling and a wall, a floor-mounted overhead drive system 710 that is attached to a floor 720, or mobile crane system (not shown) that is movable along the floor 720. These overhead drive systems (including the UAV 702) may include each include an extension member 713 and/or coupling members 715 for coupling with transportable objects similar to those discussed above for the overhead crane system 704.

In some embodiments, an inventory system may utilize one, two, three, or more different types of overhead drive units to move inventory items depending on the location, capacity, range of reach, operating cost, speed, and/or other characteristics of the overhead drive units as well as the location, weight, size, and/or other characteristics of the transportable objects to be reached. For instance, a UAV may be used to retrieve lightweight transportable objects or time-sensitive inventory items because a UAV typically has a relatively low lifting capacity but is relatively fast. On the other hand, a crane system may be used to fetch heavyweight objects or less time-sensitive inventory items. Additionally, a UAV may be used to cover a large storage area due to its a relatively wide reach where a crane system may be used to retrieve objects located close by due to the limited reach of the crane system.

Figure 8:
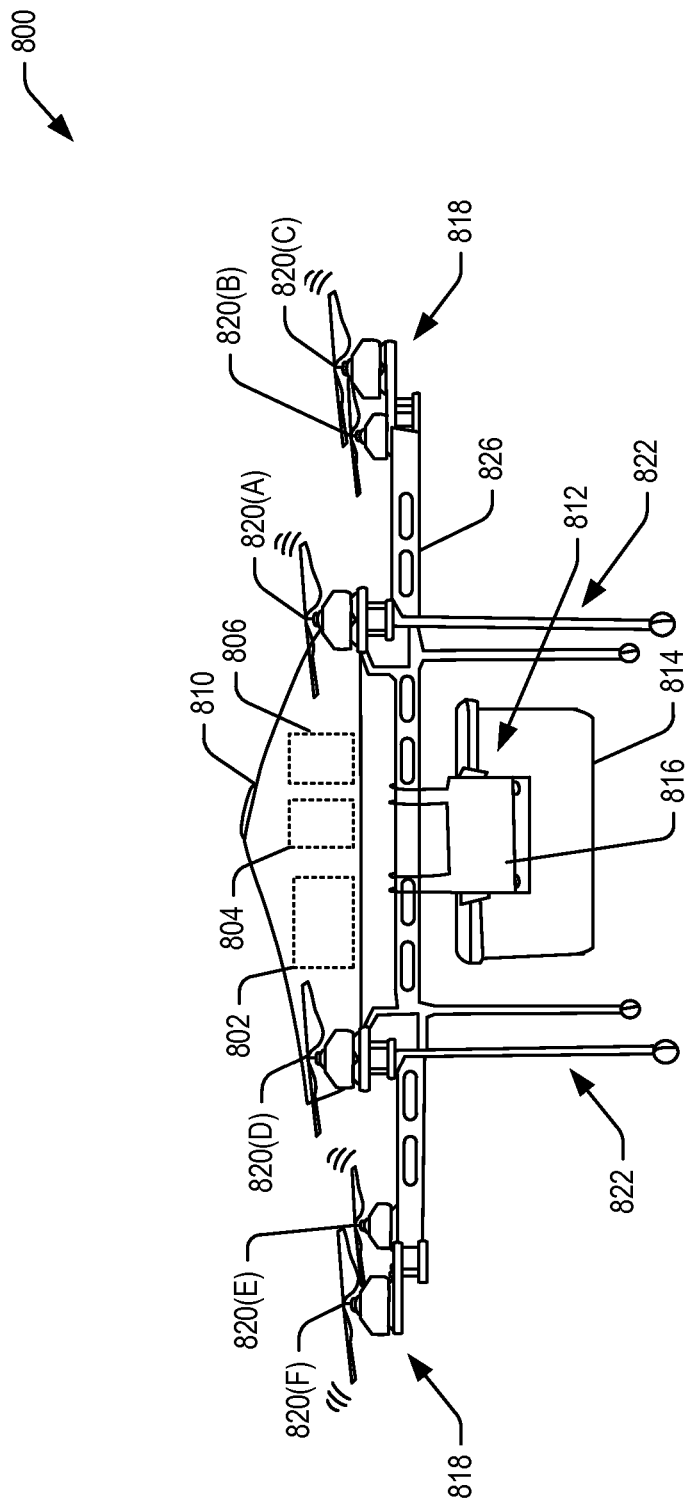
FIG. 8 illustrates an example unmanned aerial vehicle (UAV) for implementing an overhead drive unit, in accordance with embodiments.

FIG. 8 illustrates an example UAV 800 for implementing an overhead drive unit, in accordance with embodiments. The UAV 800 may be designed in accordance with commercial aviation standards and may include multiple redundancies to ensure reliability. For purposes of this specification, the UAV 800 may include a plurality of systems or subsystems operating under the control of, or at least partly under the control of, a UAV management module 802. The UAV management module 802 may be included in an onboard computer for autonomously or semi-autonomously controlling and managing the UAV 800 and, in some examples, for enabling remote control by a pilot. In some examples, aspects of the UAV management module 802 may be implemented by the UAV 800, the management module 15, and other systems for managing inventory flow within the inventory system 10. Portions of the UAV management module 802, including the onboard computer, may be housed under top cover 810. As used herein, the UAV management module 802 may be part of system that includes a power supply and assemblies (e.g., rechargeable battery, liquid fuel, and other power supplies) (not shown), one or more communications links and antennas (e.g., modem, radio, network, cellular, satellite, and other links for receiving and/or transmitting information) (not shown), one or more navigation devices and antennas (e.g., global positioning system (GPS), inertial navigation system (INS), range finder, Radio Detection And Ranging (RADAR), and other systems to aid in navigating the UAV 800 and detecting objects) (not shown), radio-frequency identification (RFID) capability (not shown), and interfaces capable of speech interpretation and recognition (not shown).

The UAV 800 may also include a sensing system 804. The sensing system may comprise one or more sensors for detecting a state of the UAV and/or information about the surrounding environment. The state of the UAV may include a spatial disposition (e.g., position, orientation, or attitude), a velocity (e.g., linear or angular velocity), an acceleration (e.g., linear or angular acceleration), and/or other information about the UAV. The state may be absolute (e.g., latitude and/or longitude) or relative (e.g., relative to an inertial system). Information about the surrounding environment may include weather conditions (e.g., temperature, humidity), proximity to and/or location of objects (e.g., geographical features, manmade structures, humans, or animals), and the like. Objects detectable by the sensing system can include any object related to an inventory system such as an inventory holder or inventory item, a mobile drive unit, a human or automated operator, a ceiling, wall, or floor of a storage space, and the like. Examples of such sensors may include position sensors (e.g., GPS sensor and magnetometer), motion sensors (e.g., accelerometers), rotation sensors (e.g., gyroscope), inertial sensors, proximity sensors (e.g., ultrasound sensors, Lidar sensors, or infrared sensors), light sensors (e.g., imaging device, depth sensor, visible light camera, infrared camera, RGB camera, depth aware camera, infrared laser projector, ultraviolet sensitive cameras, scanning sensor, light filters and any combination of the foregoing), auditory sensors (e.g., microphone, noise filters, and other sensors for capturing sound), and the like.

The sensors of the sensing system 804 may be coupled to any suitable portion or portions of the UAV and may or may not movable relative to the UAV. For instance, an image sensor configured to detect a position of the UAV may be coupled to an exterior of a top portion of the UAV so as to detect markers or identifiers attached to a ceiling or a wall of a warehouse. As another example, a scanner, RF reader, or image sensor may be coupled to a bottom portion of the UAV pointing substantially downward so as to detect an optical barcode (e.g., a Quick Response (QR) code, a Universal Product Code (UPC)), radio frequency identifier (RFID), or the like associated with a transportable object.

The UAV 802 may also include a communication system 804. The communication system may be configured provide communication between the UAV and one or more remote systems such as that a system that implements a management module 15 discussed in FIG. 3, another mobile drive unit (e.g., an overhead drive unit or a ground drive unit), a cloud-based system, and the like.

As shown in FIG. 8, the UAV 800 may also include a retaining system 812. The retaining system 812 may be configured to retrieve, retain, and/or release a payload 814. In some examples, the retaining system 812 may retain the payload 814 using friction, vacuum suction, opposing arms, opposing scoops or clasps, wires or cables, magnets, and other retaining methods. As illustrated in FIG. 8, the retaining system 812 may include a two opposing arms 816 (only one is illustrated) configured to retain the payload 814. The UAV management module 802 may be configured to control at least a portion of the retaining system 812. In some examples, the retaining system 812 may be controlled by the UAV management module 802 to retrieve the payload 814 using a robotic arm assembly, a winch and spool system, a hook-and-line assembly, or any suitable mechanisms such as those discussed in FIG. 7 and FIGS. 17-20. Likewise, the retaining system 812 may be controlled by the UAV management module 802 to release the payload 814 in any suitable fashion. For example, the retaining system 812 (or other system of the UAV 800) may be configured to release the payload 814 with a winch and spool system or a robotic arm assembly. In some cases, the retaining system 812 may be configured to release the payload 814 by causing the payload 814 to free fall from the retaining system 814. In some examples, the retaining system 812 may operate semi-autonomously or autonomously.

Further, the UAV 800 may include a propulsion system 818. In some examples, the propulsion system 818 may include rotary blades or otherwise be a propeller-based system. As illustrated in FIG. 8, the propulsion system 818 may include a plurality of propulsion devices, a few of which, 830(A)-830(F), are shown in this view. The number of propulsion devices can be one, two, four, six, eight, ten, or more. Each propeller device may include one propeller, a motor, wiring, a balance system, a control mechanism, and other features to enable flight. In some examples, the propulsion system 818 may operate at least partially under the control of the management system 802. In some examples, the propulsion system 818 may be configured to adjust itself without receiving instructions from the management system 802. Thus, the propulsion system 818 may operate semi-autonomously or autonomously.

The UAV 800 may optionally include landing structure 822. The landing structure 822 may be adequately rigid to support the UAV 800 and the payload 814. The landing structure 822 may include a plurality of elongated legs which may enable the UAV 800 to land on and take off from a variety of different surfaces such as on top of an inventory holder. The plurality of systems, subsystems, and structures of the UAV 800 may be connected via frame 826. The frame 826 may be constructed of a rigid material and be capable of receiving via different connections the variety of systems, sub-systems, and structures. For example, the landing structure 822 may be disposed below the frame 826 and, in some examples, may be formed from the same material and/or same piece of material as the frame 826. The propulsion system 818 may be disposed radially around a perimeter of the frame 826 or otherwise distributed around the frame 826. In some examples, the frame 826 may attach or be associated with one or more fixed wings.

Figure 9:
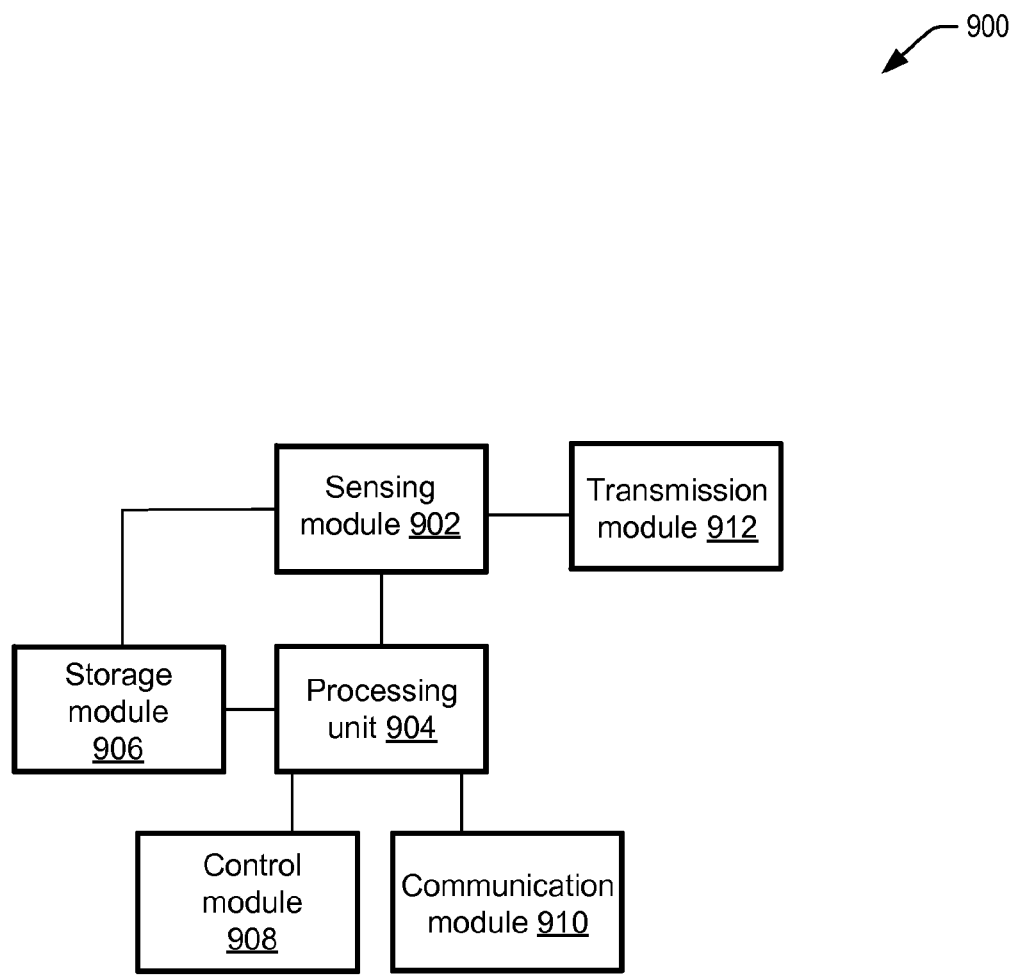
FIG. 9 illustrates an exemplary system for controlling a mobile drive unit, in accordance with embodiments.

FIG. 9 illustrates an exemplary system 900 for controlling a mobile drive unit, in accordance with embodiments. For instance, the system 900 may be used to control an overhead drive unit (e.g., a UAV) or a ground drive unit. The system 900 can be used in combination with any suitable embodiment of the systems, devices, and methods disclosed herein. For example, the system 900 may implement aspects of the UAV management module 802 discussed above in FIG. 8. The system 900 can include a sensing module 902, processing unit 904, non-transitory computer readable medium 906, control module 908, and communication module 910.

The sensing module 902 can utilize different types of sensors that collect information related to the mobile drive unit or a surrounding environment in different ways. Different types of sensors may sense different types of signals or signals from different sources. For example, the sensors can be used to collect information GPS signals, radio frequency signals, electromagnetic signals, and the like. The sensing module 902 may include passive sensors, active sensors, or a combination of both. Passive sensors can be configured to detect vibrations, light, radiation, heat, or other phenomena occurring in the environment. Examples of passive sensors can include charge coupled devices, infrared sensors, and the like. Active sensors can be configured to emit energy (e.g., a signal, a light wavelength, or electrons) and detect the reflected energy. Examples of active sensors can include laser sensors, LIDAR sensors, ultrasound sensors, and the like.

The information detected by the sensing module 902 may be used to determine a state of the mobile drive unit and/or an environment surrounding the mobile drive unit. For example, the sensors can include inertial sensors, GPS sensors, proximity sensors (e.g., LIDAR), or light sensors (e.g., a camera). In some embodiments, the sensing module 902 may provide similar functionalities as the sensing system 804 discussed in FIG. 8. The sensing module 902 can be operatively coupled to a processing unit 904 having a plurality of processors. In some embodiments, the sensing module can be operatively coupled to a transmission module 912 (e.g., a Wi-Fi image transmission module or a radio frequency transmission module) configured to directly transmit sensing data to a suitable external device or system. For example, the transmission module 912 can be used to transmit images captured by an image device of the sensing module 902 to a remote terminal. Such images may include may be related to a portion of an inventory holder, or any other objects in the environment of the mobile drive unit.

The processing unit 904 can have one or more processors, such as a programmable processor (e.g., a central processing unit (CPU)). For example, the processing unit 904 may include a field programmable gate array (FPGA) and/or one or more ARM processors. The processing unit 904 can be operatively coupled to a storage module 906 comprising one or more non-transitory computer readable media. The storage module 906 can store logic, code, and/or program instructions executable by the processing unit 904 for performing one or more steps. The storage module 906 can include one or more memory units (e.g., removable media or external storage such as an SD card or random access memory (RAM)). In some embodiments, data from the sensing module 902 can be directly conveyed to and stored within the memory units of the storage module 906. The memory units of the storage module 906 can store logic, code and/or program instructions executable by the processing unit 904 to perform any suitable embodiment of the methods described herein. For example, the processing unit 904 can be configured to execute instructions causing one or more processors of the processing unit 904 to retrieve a transportable object located at a first location and/or deliver the transportable object to a second location using the techniques discussed herein. The processing unit 904 can also be configured to execute instructions causing one or more processors of the processing unit 904 to implement positioning, navigation, and/or collision avoidance algorithms based on sensing data obtained by the sensing module. The processing unit 904 can also be configured to execute instructions causing one or more processors of the processing unit 904 to identify and/or verify a transportable object such as an inventory holder, a detachable component of an inventory holder, an inventory item based on a detection of an object identifier (e.g., QR code or RFID tag) associated with the transportable object. The detected object identifier may then be used to adjust a spatial disposition (e.g., position and/or orientation) of the mobile drive unit so as to couple with the transportable object. The memory units can store sensing data from the sensing module to be processed by the processing unit 904. In some embodiments, the memory units of the storage module 906 can be used to store the processing results produced by the processing unit 904.

In some embodiments, the processing unit 904 can be operatively coupled to a control module 908 configured to control a state of the mobile drive unit or a component thereof. For example, the control module 908 can be configured to control the propulsion mechanisms of the mobile drive unit to adjust the spatial disposition, velocity, and/or acceleration of the mobile drive unit with respect to six degrees of freedom. For example, the control module 908 can be configured to cause a UAV to take off from a surface, land on a surface, maintain a hover position, change its position and/or orientation, and the like. Alternatively or in combination, the control module 908 can control one or more of a state of a retaining or retrieval system, a sensing module, or the like. For example, the control module 908 can be used to control components of a retaining system so as to couple with a portion of a transportable object, lift the transportable object, secure the transportable object during a flight, and/or release the transportable object. As another example, the control module 908 can be used control a state of a sensor such as its spatial disposition and/or operating state. For instance, the control module 908 may cause one or more sensors to perform translational or rotational movement so as to capture a portion of an object such a portion of an inventory holder with a detectable identifier (e.g., barcode) and/or to detect signals indicating a position of the mobile drive unit.

The processing unit 904 can be operatively coupled to a communication module 910 configured to transmit and/or receive data from one or more external devices (e.g., a terminal, display device, or other remote controller). In particular, the communication module 910 may be configured to communicate with a management module such as discussed in FIG. 3, a mobile drive unit such as discussed in FIGS. 4-5, a transportable object such as discussed in FIGS. 6 and 12-17, or any other objects in an inventory system.

Any suitable means of communication can be used, such as wired communication or wireless communication. For example, the communication module 910 can utilize one or more of local area networks (LAN), wide area networks (WAN), infrared, radio, Wi-Fi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. In some embodiments, the communication module 910 can be configured to receive control data from and/or transmit feedback data to a management module, a mobile drive unit, a data server, a cloud-based service, and the like. Control data may include instructions or commands for controlling an operation or a state of the mobile drive unit. Feedback data may include information based on sensing data captured by the mobile drive unit, error or acknowledgement messages, or any other suitable information.

The components of the system 900 can be arranged in any suitable configuration. For example, one or more of the components of the system 900 can be located on various parts of the mobile drive unit and/or one or more external devices in communication with the mobile drive unit. Additionally, although FIG. 9 depicts a single processing unit 904, a single storage module 906, and a single control module 908, one of skill in the art would appreciate that this is not intended to be limiting, and that the system 900 can include a plurality of processing units, control modules, and/or non-transitory computer readable media. In some embodiments, one or more of the plurality of processing units, control modules, and/or non-transitory computer readable media can be situated at different locations various parts of the mobile drive unit and/or one or more external devices in communication with the mobile drive unit such that any suitable aspect of the processing and/or memory functions performed by the system 900 can occur at one or more of the aforementioned locations.

Figure 10:
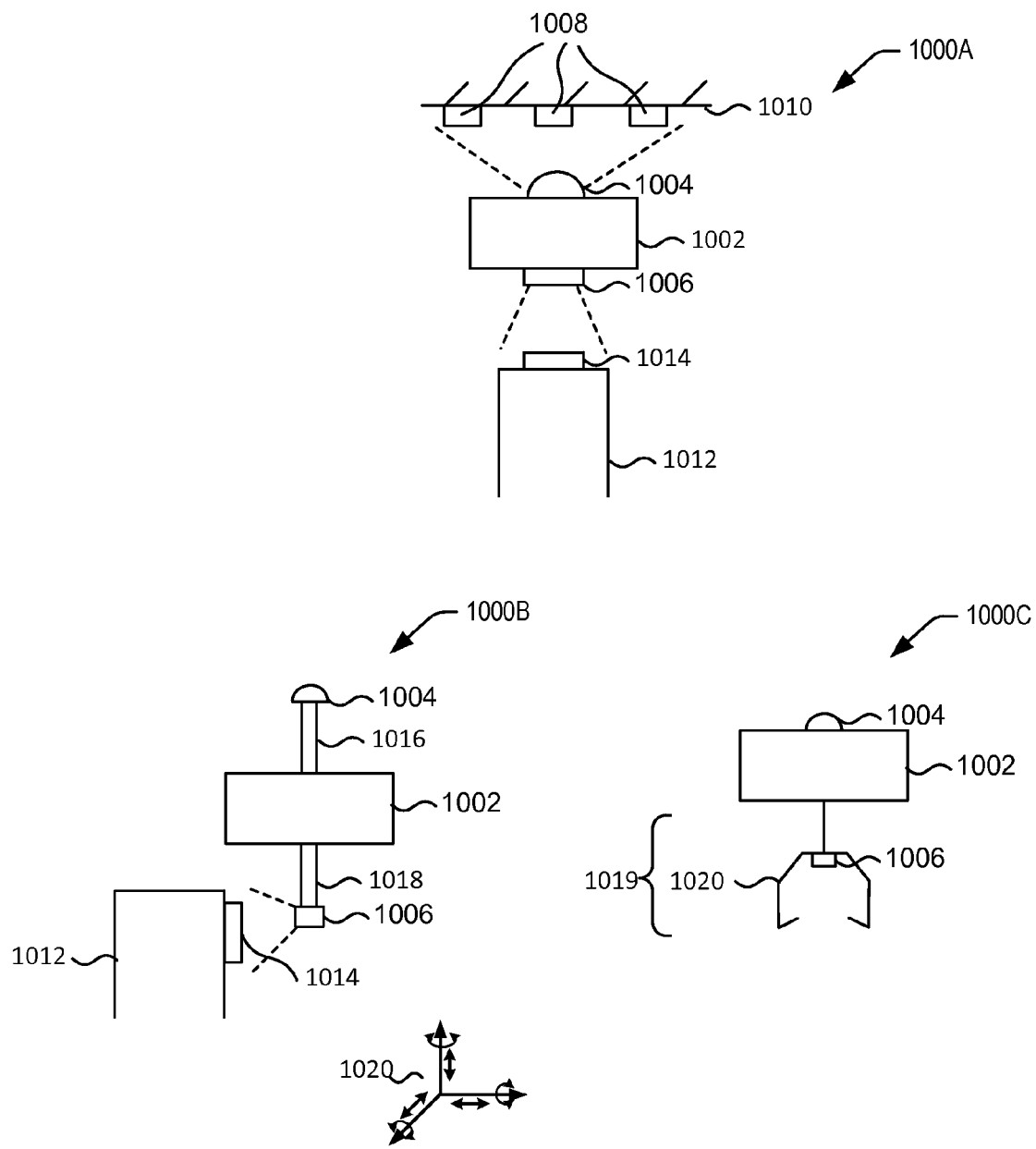
FIG. 10 illustrates example sensors for overhead drive units that may be used to locate and identify transportable objects, in accordance with embodiments.
Figure 11:
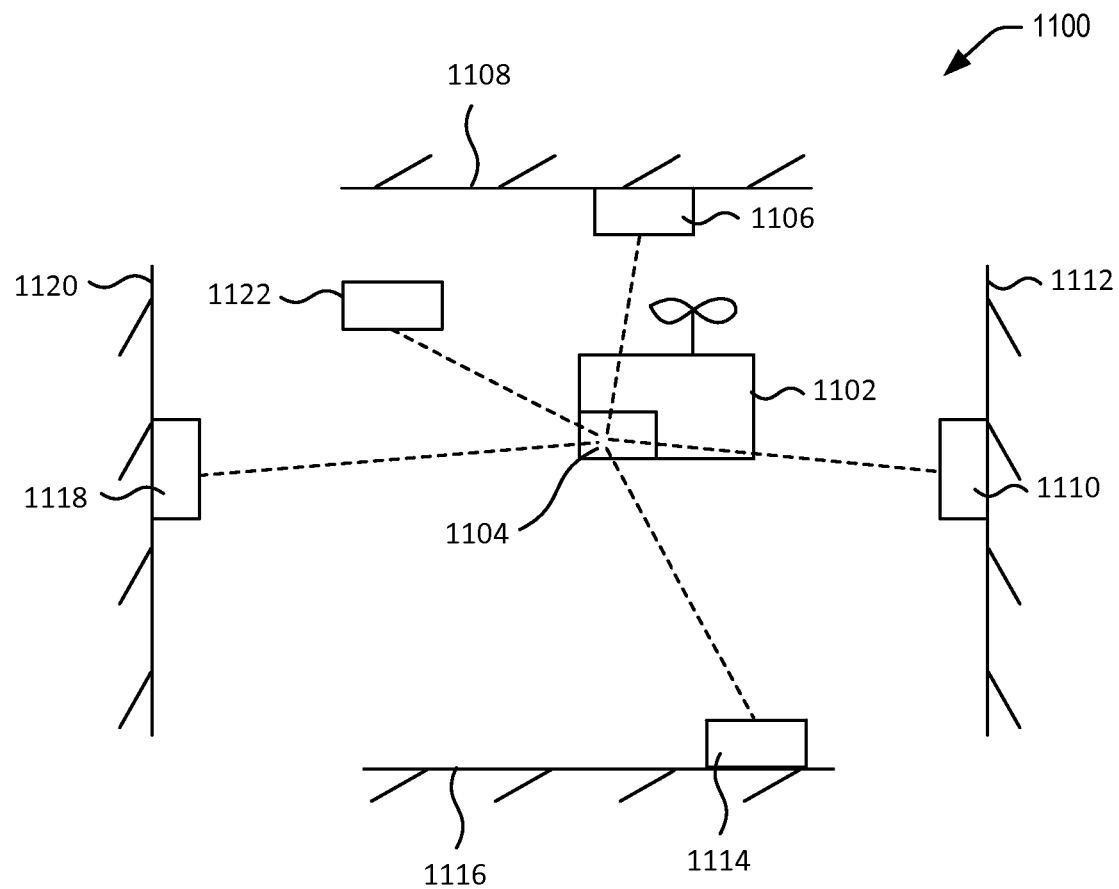
FIG. 11 illustrates example a sensing system of an overhead drive unit, in accordance with embodiments.

According to an aspect of the present invention, overhead drive units are provided that are configured to locate and identify transportable objects in an inventory system. The overhead drive units may utilize a sensing system comprising one or more sensors for this purpose. FIGS. 10-11 illustrate example sensing systems for overhead drive units, in accordance with embodiments. In particular, FIG. 10 illustrates example sensors for overhead drive units that may be used to locate and identify transportable objects, in accordance with embodiments. As illustrated, an overhead drive unit 1002 may be equipped with a position sensor 1004 and an object sensor 1006 that are disposed on opposing sides of an overhead drive unit. The position sensor 1004 may be disposed at or near a top portion of the overhead drive unit so as to detect position markers, patterns, or other identifiers 1008 attached to a ceiling 1010 or to receive any position-related signals. Examples of a position sensor can include a GPS sensor, magnetometer, proximity sensor, light sensor (e.g., camera), and the like. Sensing data obtained from the position sensor 1004 may be used to determine a position of the overhead drive unit relative to any suitable frame of reference. For instance, the sensing data (e.g., latitude and longitude) may be used to determine a coordinate of the overhead drive unit in a global positioning system. As another example, the sensing data may be used to determine a position of the overhead drive unit relative to a local positioning system. The position of the overhead drive unit, as determined based the sensing data from the position sensor 1004, may be updated as the overhead drive unit moves in an environment so as to aid the navigate the overhead drive unit. For instance, the overhead drive unit may be configured to navigate to a transportable object 1020 based on the position information provided by the position sensor 1004.

The object sensor 1006 may be disposed at or near a bottom portion of the overhead drive unit 1002 so as to detect a portion of an object 1012 below the overhead drive unit 1002. For instance, the object sensor 1006 may be configured to detect an object identifier 1014 attached to the object 1012. The object detected by the object sensor 1006 may include any portion of an inventory holder, a component of an inventory holder, an inventory item, and the like. Examples of an object sensor can include a proximity sensor, light sensor (e.g., camera), and the like. Sensing data obtained from the object sensor 1006 may be used to identify an object 1012 (e.g., a transportable object) and/or adjust a spatial disposition of the overhead drive unit 1002 relative to the object 1012. In some embodiments, the detection of the object identifier 1014 may not require a line of sight between the object sensor 1006 and the object identifier 1014. For instance, the object sensor 1006 may include an RF reader capable of reading an RFID label attached to an object. In some embodiments, line of sight may be required. For instance, the object sensor 1006 may include a camera that can be used to capture images of one or more objects below the overhead drive unit. The image data associated with the captured images may be processed using any suitable image processing techniques such as feature extraction, image matching, and the like in order to identify the objects. In various embodiments, such image processing may be implemented by one or more processors onboard the overhead drive unit, off-board the overhead drive unit (e.g., in a remote device), or by a combination thereof.

In some embodiments, such as illustrated at 1000B, the position sensor 1004 and/or object sensor 1006 of an overhead drive unit be configured to move with respect to up to six degrees of freedom 1020 (e.g., three degrees of freedom in translation and three degrees of freedom in rotation). Such movement may be actuated by one or more extension members 1016, 1018 operably connected to the sensors. For instance, an extension member 1018 associated with an object sensor 1006 may be configured to allow the object sensor 1006 to move along a vertical axis of the overhead drive unit 1002 such that the object sensor 1006 can be lowered and/or retracted relative to the overhead drive unit 1002 so as to align the object sensor 1006 with an object sensor 1014. Additionally or alternatively, the extension member 1018 may be configured to allow the object sensor 1006 to move around one or more rotational axes relative to the overhead drive unit 1002 (e.g., a yaw axis or a pitch axis). Such movements may allow adjustment of the object sensor 1006 relative to a target object, for example, in order to obtain better sensing data.

The extension member used to actuate the object sensor and/or position sensor may be a dedicated component or be part of another component of the overhead drive unit 1002. For instance, as illustrated at 1000C, the object sensor 1006 may be configured to be coupled to a retaining system used to retrieve and/or retain an object. In particular, the object sensor 1006 may be coupled to an interior surface of a coupling member 1020 (e.g., scoop, clasp or opposing arms) of the retaining system 1019 that is configured to couple with, retain, and/or release an object.

In various embodiments, the position sensor 1004 and the object sensor 1006 may be coupled to any suitable portion of the overhead drive unit 1002. For instance, instead of being disposed on opposing sides of the overhead drive unit 1002, the position sensor 1004 and the object sensor 1006 may be disposed on the same side of the overhead drive unit 1002 or on different sides that do not oppose each other. For instance, the position sensor 1004 and the object sensor 1006 may be both disposed at or near the top portion, the bottom portion, or a side portion of the overhead drive unit 1002. Alternatively, the position sensor 1004 may be disposed on at or near the top portion, while the object sensor 1006 may be disposed at or near the top portion or a side portion. Or, the position sensor 1004 may be disposed on at or near a side portion, while the object sensor 1006 may be disposed at or near the top portion or the bottom portion. Or, the position sensor 1004 may be disposed on at or near the bottom portion, while the object sensor 1006 may be disposed at or near the top portion or a side portion.

Although FIG. 10 depicts a single position sensor and a single object sensor for each overhead drive unit, one of skill in the art would appreciate that this is not intended to be limiting, and an overhead drive unit can include a plurality of position sensors and object sensors that collectively provide the functionalities discussed herein. The plurality of position sensors may be of the same or different types. Likewise, the plurality of object sensors may be of the same or different types. In some embodiment, one single sensor may be configured to provide aspects of the functionalities of both a position sensor and an object sensor. In some embodiments, sensing data from multiple sensors may be combined or "fused" to derive information regarding a position or spatial disposition of the overhead drive unit, objects in an environment for the overhead drive unit, or any type of information. Various sensor fusion techniques may be used including Central Limit Theorem, Kalman filter, extended Kalman filter, Bayesian networks, Dempster-Shafer, and the like.

FIG. 11 illustrates example a sensing system 1104 of an overhead drive unit 1102, in accordance with embodiments. In some embodiments, the sensing system 1104 may be capable of detecting or receiving signals from one or more detectable objects 1106, 1110, 1114, 1118, and 1122 so as to aid the positioning of the overhead drive unit 1102.

In an embodiment, the detectable objects 1106, 1110, 1114, 1118, 1122 may represent fiducial marks that mark points in a two-dimensional or three-dimensional grid that covers all or a portion of workspace associated with an inventory system. In such embodiments, the sensing system 1104 may include a camera and suitable image- and/or video-processing components, such as an appropriately-programmed digital signal processor, to allow the sensing system to detect fiducial marks within the camera's field of view. Location information may be stored by the overhead drive unit 1102 and updated as the sensing system 1104 detects fiducial marks. As a result, the sensing system 1104 (e.g., a position sensor) may utilize the fiducial marks to maintain an accurate indication of the location of the overhead drive unit 1102 and to guide the navigation of the overhead drive unit when moving within the workspace.

In another embodiment, the detectable objects 1106, 1110, 1114, 1118, 1122 may include sensors in a sensor grid or sensor network. The sensors may be capable of collecting, processing, and processing information in the surrounding environment such as a workspace. For instance, the sensors may be configured to transmit their own location information. Such location information may be received by the sensing system 1104 of the overhead drive unit 1102 via the sensor network in order to obtain and/or update a location of the overhead drive unit 1102.

In various embodiments, the detectable objects 1106, 1110, 1114, 1118, 1122 (e.g., fiducial marks or sensors) may be attached to any objects inside or outside of a workspace. For instance, the detectable objects may be attached to a static surface of a work space (e.g., a ceiling 1106, a wall 1112 or 1120, and/or a floor 1116 of a workspace), attached to a mobile object capable of moving with the workspace such as a mobile drive unit 1122 (e.g., a ground drive unit or an overhead drive unit), or attached to an object moving outside the workspace (e.g., satellites).

Figure 12:
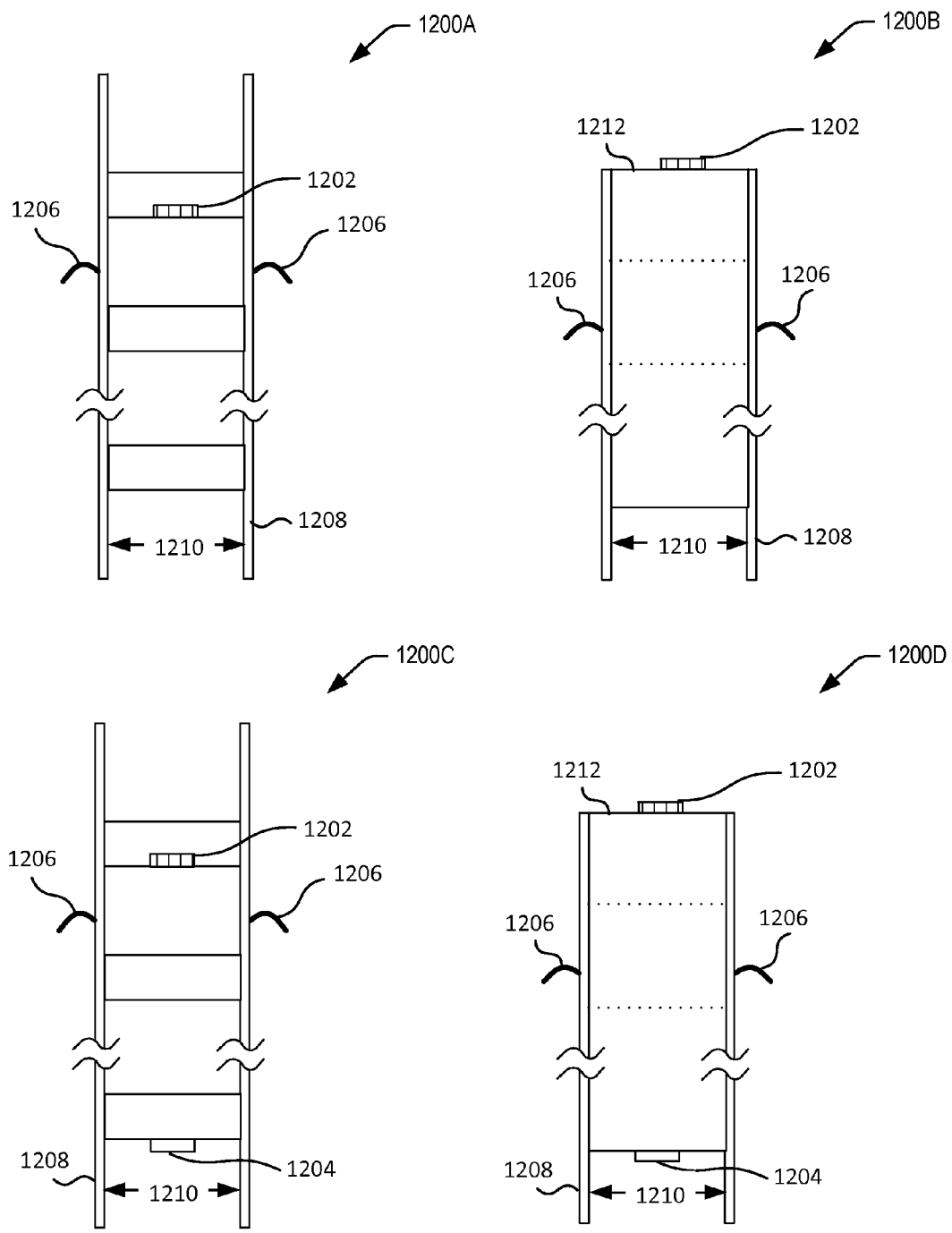
FIG. 12 illustrates example inventory holders that can be transported by overhead drive units, in accordance with embodiments.

According to an aspect of the present invention, inventory holders are provided that are configured to be transportable by overhead drive units as a whole. FIG. 12 illustrates example inventory holders 1200A-D that can be transported by overhead drive units, in accordance with embodiments. The illustrated inventory holders may be similar to the inventory holder discussed in FIG. 6 but with additional features to enable transport by overhead drive units described below. Each inventory holder may be divided into one or more shelves, trays, compartments, totes that are configured to store inventory items. In some cases, an inventory holder may have an open top portion (such as illustrated by inventory holders 1200A and 1200C) or a closed top portion (such as illustrated by inventory holders 1200B and 1200D).

As illustrated, the inventory holders can each include an overhead holder identifier 1202 and one or more coupling members 1206. The overhead holder identifier 1202 may be configured to be detectable by an object sensor of an overhead drive unit from above the overhead drive unit or from a lateral side of the overhead drive unit. In some embodiments, the overhead holder identifier 1202 can include an optical barcode, an RFID tag, a sensor, or any detectable object that identifies the inventory holder or a portion thereof. To detect the overhead holder identifier, a line of sight may be required between a detecting sensor (e.g., camera) and the overhead holder identifier (e.g., an optical barcode). Alternatively, a line of sight may not be required for the detection of the overhead holder identifier (e.g., an RFID tag).

Figure 15:
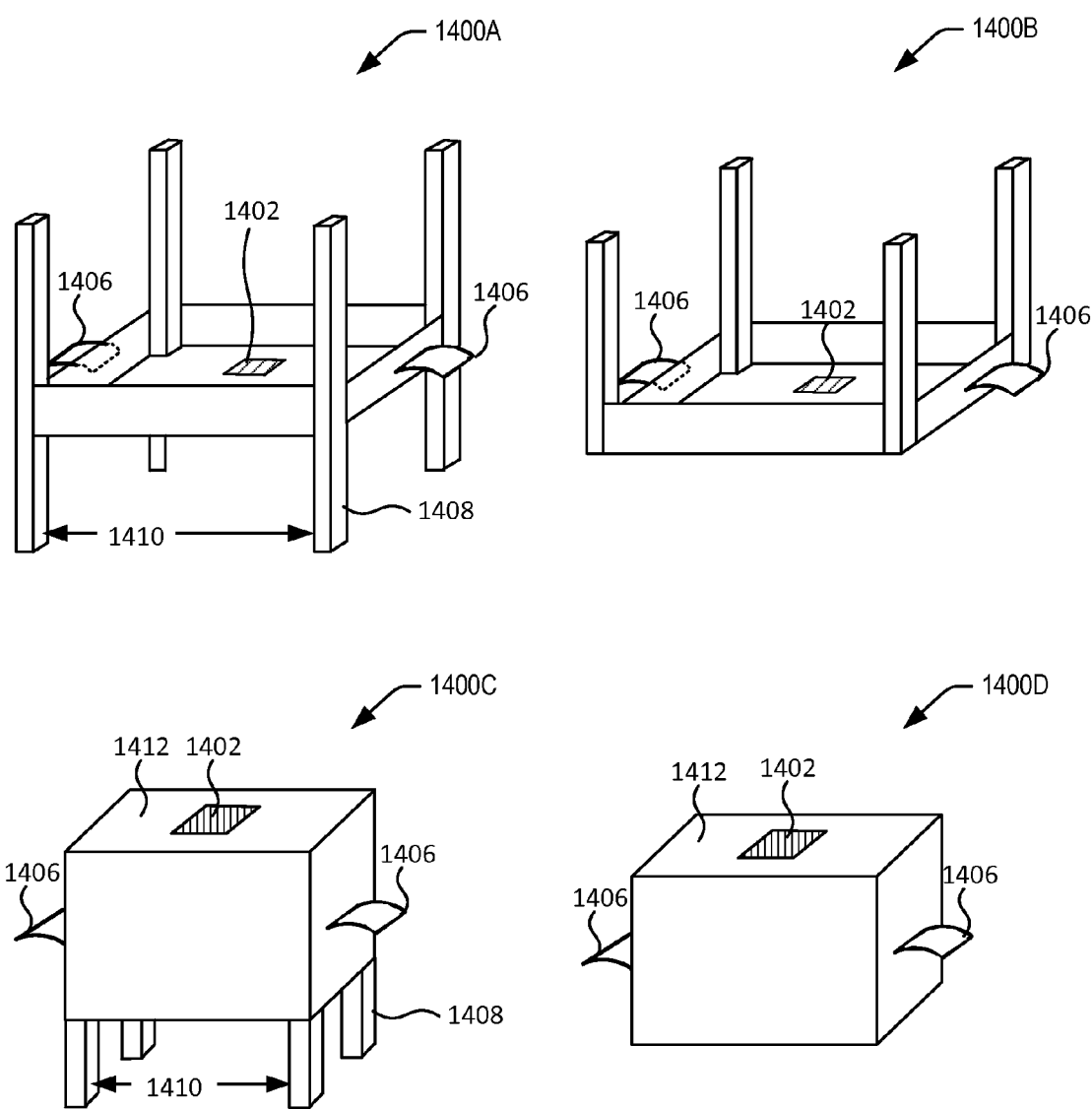
FIG. 15 illustrates example detachable components in an isometric view, in accordance with embodiments.

In various embodiments, an overhead holder identifier can be placed on an inventory holder to facilitate detection and identification of the overhead holder identifier by a sensing system of an overhead drive unit. The overhead holder identifier can also be used to position the overhead drive unit relative to the inventory holder. The placement of the overhead holder identifier 1202 may be dependent on the configuration of the inventory holder and/or the overhead drive unit. For instance, in an open-top configuration, such as illustrated by inventory holders 1200A and 1200C, the overhead holder identifier 1202 can be attached to a bottom portion of a top tray of an inventory holder. Alternatively, the overhead holder identifier 1202 can be attached to a side portion of an inventory or any other suitable locations such as illustrated in FIG. 15. In a closed-top configuration, such as illustrated by inventory holders 1200B and 1200D, the overhead holder identifier 1202 can be attached to a top surface of a top portion of the closed-top inventory holder.

The inventory holder 1200 can also include one or more coupling members 1206 configured to enable coupling between the inventory holder and an overhead drive unit. The coupling member 1206 can include a loop, a hole, a handle, a bump, an extension, a magnet, or any other suitable structure that may be used to couple with a corresponding coupling member associated with the overhead drive unit such that the inventory holder can be lifted from the ground. In various embodiments, the coupling member 1206 may be an integral part of the inventory holder or an attachment structure that is attached to the inventory holder. The attachment structure may or may not be detachable from the inventory holder. A more detailed discussion of the coupling members is provided in FIGS. 17-19.

In some embodiments, such as illustrated by the inventory holders 1200C and 1200D, an inventory holders may optionally include a ground holder identifier 1204 in addition to the overhead holder identifier 1202 discussed above. The ground holder identifier 1204 may be configured to be detectable by a ground drive unit such as discussed in FIGS. 4 and 5. The ground holder identifier 1204 may be similar to the holder identifier 360 discussed in FIG. 6. The detection of the ground object identifier may allow the mobile drive unit to adjust its position relative to the transportable object. Such inventory holders 1200C and 1200D may be configured to be transportable by both overhead drive units and ground drive units. As an example, an overhead drive unit may couple with an inventory holder at a first location and delivers it to a second location. Next, a ground drive unit may dock with the inventory holder at the second location and delivers it to a third location.

Although FIG. 12 depict a single overhead holder identifier 1202 and a single ground holder identifier 1204 for each inventory holder, one of skill in the art would appreciate that this is not intended to be limiting, and that the inventory holder can include a plurality of overhead holder identifiers and ground holder identifiers that may be placed at any suitable portions of the inventory holder. In some embodiments, one single holder identifier may be used instead of an overhead holder identifier and a ground holder identifier. The holder identifier may be configured to be detectable by both an overhead drive unit and a ground drive unit. In some cases, such a holder identifier may be placed on a portion of the inventory holder that is visible to or otherwise detectable by both an overhead drive unit and a ground drive unit. An example of an object identifier that requires a line of sight may include a two-dimensional optical code (e.g., a QR code). In some other cases, the object identifier may not require a line of sight to be detected and can be placed at a location that is not visible to an overhead drive unit and/or a ground drive unit. An example of an object identifier that does not require a line of sight may include an RFID tag.

Additionally, an inventory holder may optionally provide a plurality of device openings 1210 or surfaces 1212 that allow docking, parking, or positioning of a mobile drive unit adjacent to the detachable component. For instance, the inventory holder may be configured to be detachably couplable to a ground drive unit, an overhead drive unit, or both. The size, shape, and placement of device openings 1210 or surfaces 1212 may be determined based on the size, the shape, and other characteristics of the particular embodiment of mobile drive unit, and/or the inventory holder utilized by inventory system. For example, the inventory holder 1200A, B, C, or D can includes a plurality of legs 1208 that form device openings 1210 and allow a ground drive unit to position itself underneath the inventory holder. The length of legs may be determined based on a height of the ground drive unit. In some embodiments, the device openings provided by the inventory holder may be similar to the device openings 326 such as described in FIG. 6. As another example, the top surface 1212 of the inventory holder 1200B or 1200D can be used as a landing surface for an overhead drive unit such as a UAV. The size and shape of the landing surface 1212 may be determined based on a size of the overhead drive unit or a configuration of the inventory holder. In some other embodiments, the inventory holder may not provide such device openings and/or landing surface. For instance, the inventory holders 1200A and 1200C do not provide landing surfaces for the overhead drive units.

According to an aspect of the present invention, one or more portions of an inventory holder can be detached from the inventory holder and transported by overhead drive units. Transporting detachable components of inventory holders can be less cumbersome than transporting entire inventory holders. The lighter payloads may allow the overhead drive units to move more quickly. Additionally, the lighter payloads can lower the lifting capacity requirement for the overhead drive units, allowing smaller and cheaper overhead drive units to be used.

In various embodiments, the detachable components may be stacked on top of each other (as illustrated), arranged side by side on the same level (not shown), or otherwise arranged in any suitable fashion. In some embodiments, a detachable component may optionally include one or more attachment members configured to enable coupling between the detachable component and a portion of an inventory holder. In order to retrieve an inventory item stored in a detachable component of an inventory holder, one, two, three, or more detachable components may need to be retrieved at a time. For instance, if the inventory item to being sought is located in a detachable component that is located at the top of an inventory holder, then that particular detachable component can be detached from the rest of the inventory holder and transported by an overhead drive unit such as a UAV or a crane. However, if the inventory item being sought is located in a detachable component that is located below the top portion of the inventory holder (e.g., the second or third component from the top), then that particular detachable component along with all the other components on top of it may need to be detached and transported. In an extreme case, when the inventory item being sought is located at the bottom of the inventory holder, the entire inventory holder may need to be transported. Likewise, when multiple items located at different levels or components are sought, more than one detachable component may need to be transported at once.

Figure 13:
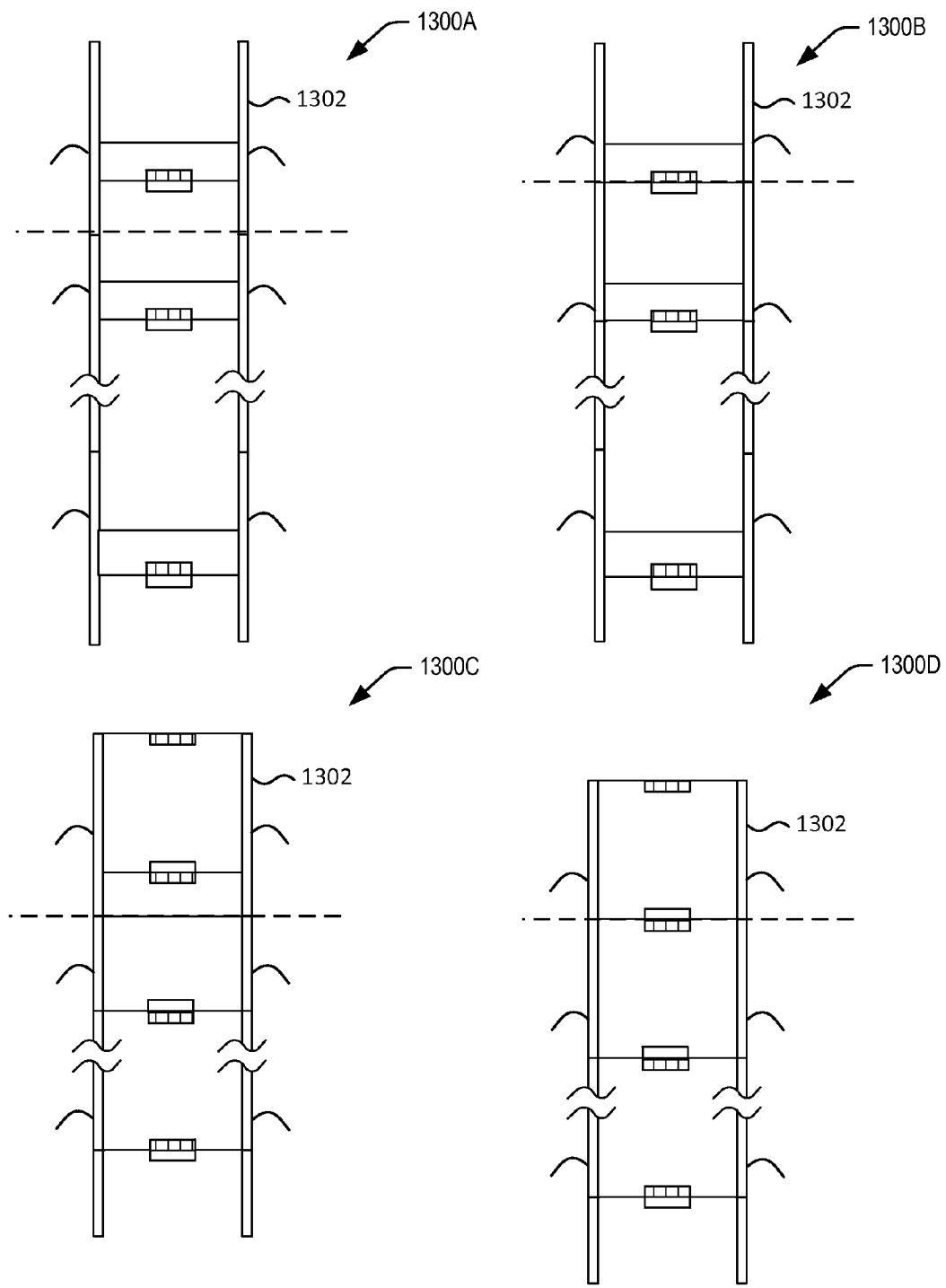
FIG. 13 illustrates example inventory holders with detachable components that are transportable by overhead drive units, in accordance with embodiments.

FIG. 13 illustrates example inventory holders 1300A-D with detachable components that are transportable by overhead drive units, in accordance with embodiments. In some embodiments, the detachable components may also be transportable by other types of mobile drive units such as ground drive units. As illustrated, the inventory holders 1300A-D each comprises a detachable component 1302 that is configured to be detachable from the rest of the inventory holder (as indicated by the dashed line) and transportable by an overhead unit. In some embodiments, an inventory holder may comprise one, two, three, or more detachable components. The detachable components may be of the same type or of different types such as discussed below.

Figure 14:
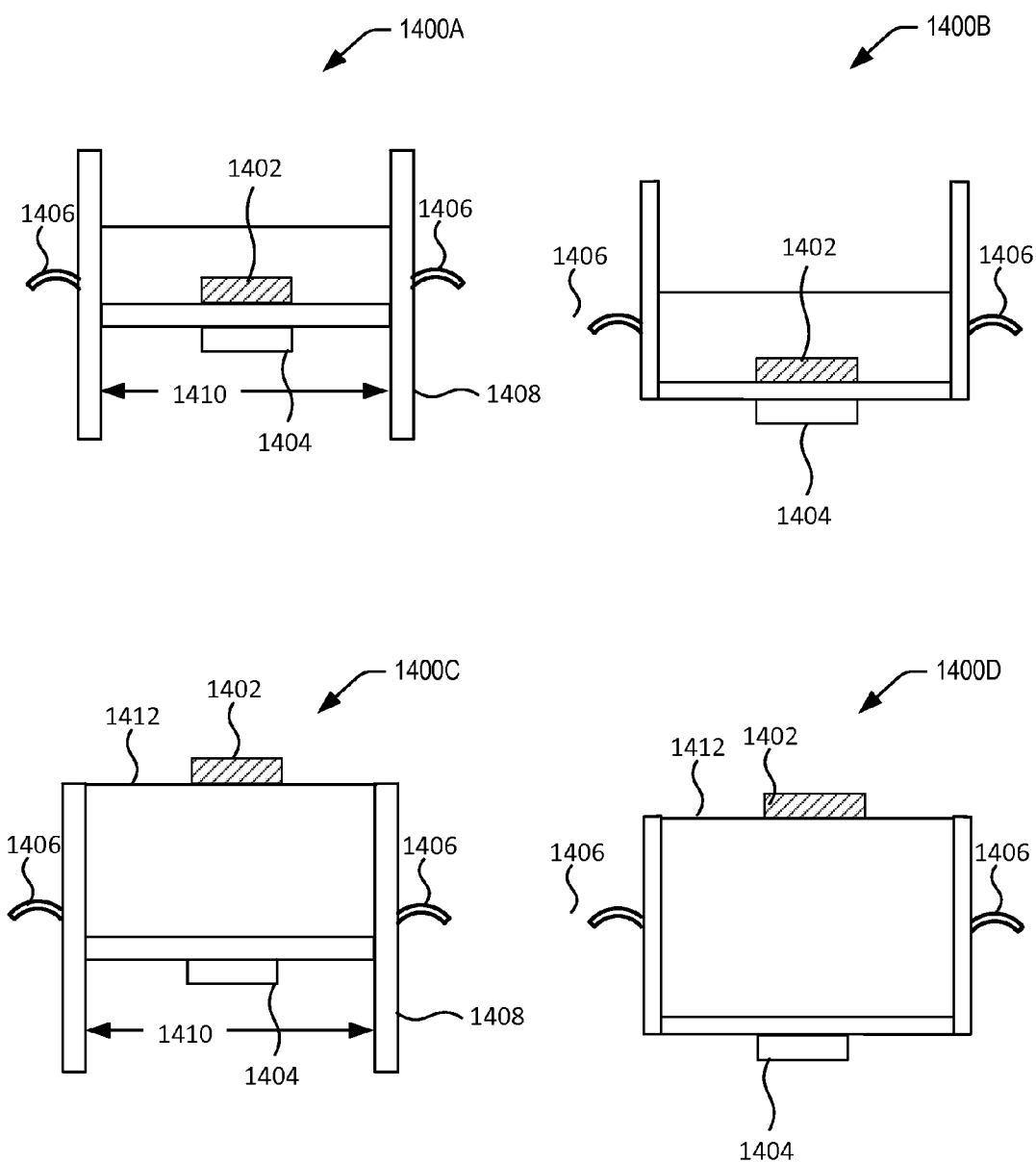
FIG. 14 illustrates example detachable components in a side view, in accordance with embodiments.

FIGS. 14 and 15 illustrate side and isometric views of example detachable components 1400A-D, in accordance with embodiments. In some embodiments, the illustrated detachable components may be stacked or otherwise arranged to form inventory holders such as illustrated in FIG. 13. Each detachable component may have an overhead object identifier 1402 configured to be detected by an overhead drive unit. The overhead object identifier 1402 may be similar to the overhead holder identifier discussed above in FIG. 12. In some embodiments, the overhead object identifier 1402 may be used to identify the detachable component to which the overhead object identifier 1402 is attached, the inventory holder that holds the detachable component, or both. The overhead object identifier 1402 may be attached to any suitable portion of the detachable component so as to facilitate detection by an overhead drive unit. For instance, the overhead object identifier 1402 may be attached to a top-facing surface of the detachable component such as on a bottom interior surface of an open-top detachable component 1400A or 1400B, or on a top exterior surface of a closed-top detachable component 1400C or 1400D.

The detachable component may also optionally include one or more coupling members 1406 configured to be releasably coupled to one or more corresponding coupling members of an overhead drive unit. The coupling members 1406 may be similar to the coupling members for inventory holders such as discussed in FIG. 12. Example coupling members for transportable objects are provided in FIGS. 17-19.

The detachable component may also optionally include a ground object identifier 1404 configured to be detectable by a ground drive unit. The ground object identifier 1404 may be similar to the holder identifier 360 discussed in FIG. 3 or the ground holder identifier discussed above in FIG. 12. In some embodiments, the ground object identifier 1404 may be used to identify an inventory holder, a portion of an inventory holder such as a detachable component, or both. The ground object identifier 1404 may be attached to any suitable portion of the detachable component so as to facilitate detection by a ground drive unit. For instance, the ground object identifier 1404 may be attached to a ground-facing surface of the detachable component 1400A, 1400B, 1400C, or 1400D.

Although FIGS. 14-15 depict a single overhead object identifier 1402 and a single ground object identifier 1404 for each detachable component, one of skill in the art would appreciate that this is not intended to be limiting, and that the detachable component can include a plurality of overhead object identifiers and ground object identifiers that may be placed at any suitable portions of the detachable component. In some embodiments, one single object identifier may be used instead of an overhead object identifier and a ground object identifier. The object identifier may be configured to be detectable by both an overhead drive unit and a ground drive unit. In some cases, such an object identifier may be placed on a portion of the detachable component that is visible to or otherwise detectable by both an overhead drive unit and a ground drive unit. An example of an object identifier that requires a line of sight may include a two-dimensional optical code (e.g., a QR code). In some other cases, the object identifier may not require a line of sight to be detected and can be placed at a location that is not visible to an overhead drive unit and/or a ground drive unit. An example of an object identifier that does not require a line of sight may include an RFID tag. The detection of the object identifier may allow the mobile drive unit to adjust its position relative to the object to enable coupling between the mobile drive unit and the object.

Additionally, a detachable component may optionally provide a plurality of device openings 1410 or surfaces 1412 that allow docking, parking, or positioning of a mobile drive unit adjacent to the detachable component. For instance, the detachable component may be configured to be detachably couplable to a ground drive unit, an overhead drive unit, or both. The size, shape, and placement of device openings 1410 or surfaces 1412 may be determined based on the size, the shape, and other characteristics of the particular embodiment of mobile drive unit, the detachable component, and/or the inventory holder utilized by inventory system. For example, the detachable component 1400A or 1400C can includes a plurality of legs 1408 that form device openings 1410 and allow a ground drive unit to position itself underneath the detachable component. The length of legs may be determined based on a height of the ground drive unit. In some embodiments, the device openings provided by the detachable component may be similar to the device openings provided by an inventory holder such as described in FIG. 6. As another example, the top surface 1412 of the detachable component 1400C or 1400D can be used as a landing surface for an overhead drive unit such as a UAV. The size and shape of the top surface 1412 may be determined based on a size of the overhead drive unit. In some other embodiments, the detachable component 1400B or 1400D may not provide such device openings and/or landing surface.

Variations of the illustrated embodiments are also contemplated. In an embodiment, the transportable object (e.g., an inventory holder or a detachable component) may have one or more coupling members configured to couple with an overhead drive unit and one or more overhead holder identifiers without having a ground holder identifier. In another embodiment, the transportable object may have one or more coupling members and one or more ground holder identifiers without having an overhead holder identifier. In yet another embodiment, the transportable object may have one or more overhead holder identifiers and one or more ground holder identifiers without having any coupling members. In yet other embodiments, the transportable object may have one or more overhead holder identifiers without having any ground holder identifier or coupling members. Alternatively, the transportable object may have one or more coupling members without having any overhead holder identifier or ground holder identifier.

Figure 16:
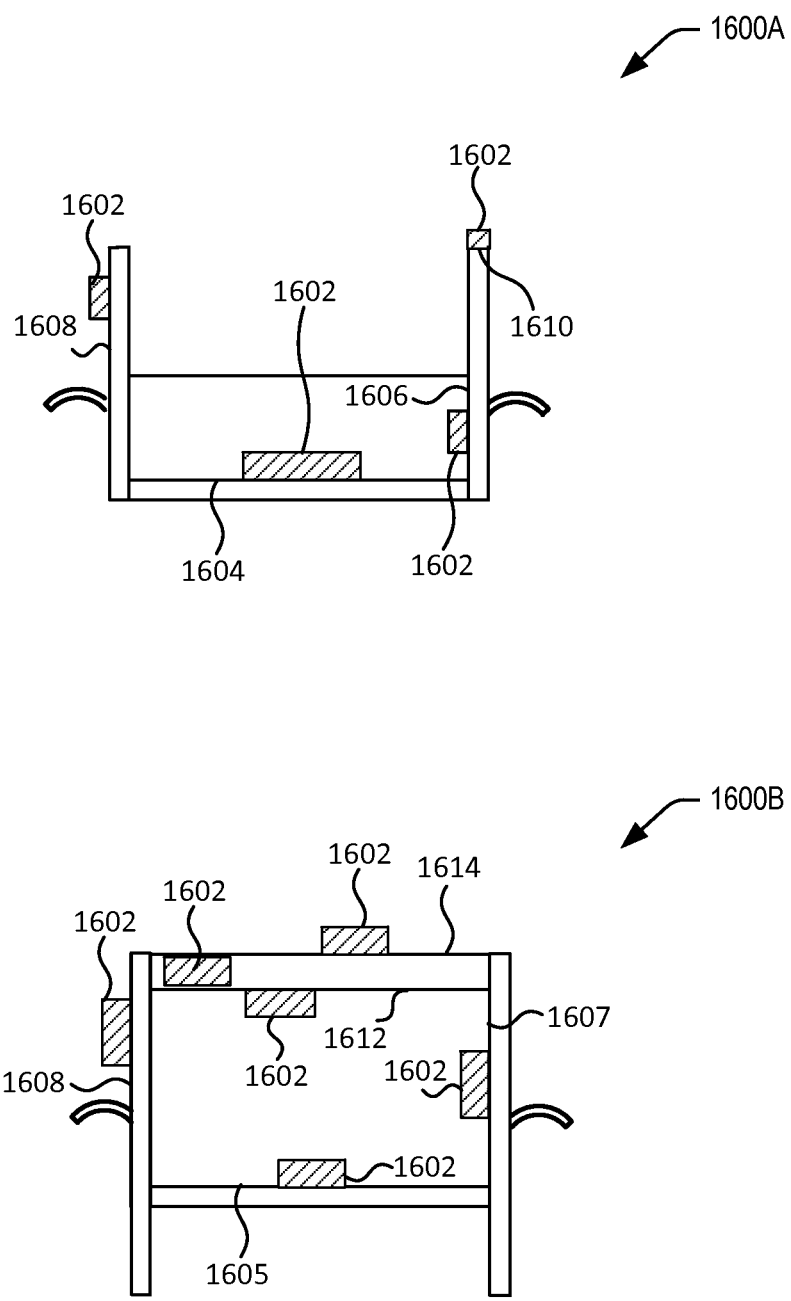
FIG. 16 illustrates example placement of an overhead object identifier on a portion of a transportable object, in accordance with embodiments.

As discussed above, an overhead object identifier, configured to identify an associated transportable object such as an inventory holder or a detachable component thereof, may be attached to any suitable portion of a transportable object (e.g., inventory holder or a detachable component thereof) so as to facilitate detection of the overhead object identifier. The placement of the overhead object identifier may be determined based on characteristics of the overhead object identifier (e.g., whether a line-of-sight detection is required) and/or characteristics of the transportable object to which the overhead object identifier is attached (e.g., whether the transportable object provides any openings). FIG. 16 illustrates example placement of an overhead object identifier 1602 on a portion of a transportable object 1600A and 1600B, in accordance with embodiments. In some embodiments, such as when the object identifier 1602 requires a line of sight to be detected (e.g., a QR code), the object identifier may be positioned on a surface that can be made visible to an overhead drive unit. In some embodiments, the object identifier 1602 may be attached to a surface of the transportable object that is visible to a sensor from a top or side view of the transportable object. For instance, in an open-top configuration, the overhead object identifier 1602 may be attached to a top-facing surface 1604 or 1610 of a transportable object 1600A. In a closed-top configuration, the overhead object identifier 1602 may be attached to a top exterior surface 1614 of a transportable object 1600B. In some embodiments, the overhead object identifier 1602 may be attached to a surface of the transportable object that is visible from a side view of the transportable object. For instance, the overhead object identifier 1602 may be attached to a side exterior surface 1608 of a transportable object 1600A or 1600B. As another example, the overhead object identifier 1602 may be attached to an interior side surface 1606 of an open-top transportable object 1600A such that the identifier is visible by a sensor that is positioned through the top opening of the transportable object 1600A, for instance, via an extension member 1018 discussed in FIG. 10.

In other embodiments, such as when the object identifier 1602 does not require a line of sight to be detected (e.g., an RFID tag), the object identifier may be positioned on a surface that is not directly visible to a sensor of an overhead drive unit or embedded within a structure of the transportable object. For instance, the overhead object identifier 1602 may be positioned in an interior surface 1605, 1607, or 1612 of a closed-top transportable object 1600B. As another example, As another example, the overhead object identifier 1602 may be positioned on a top-facing surface 1604 of an open-top transportable object 1600A with the possibility that the top-facing interior surface 1604 may potentially be blocked by inventory items or other objects placed on the surface 1604. As yet another example, the overhead object identifier 1602 may be embedded between an interior surface 1612 and an exterior surface 1614 of the transportable object.

Figure 17:
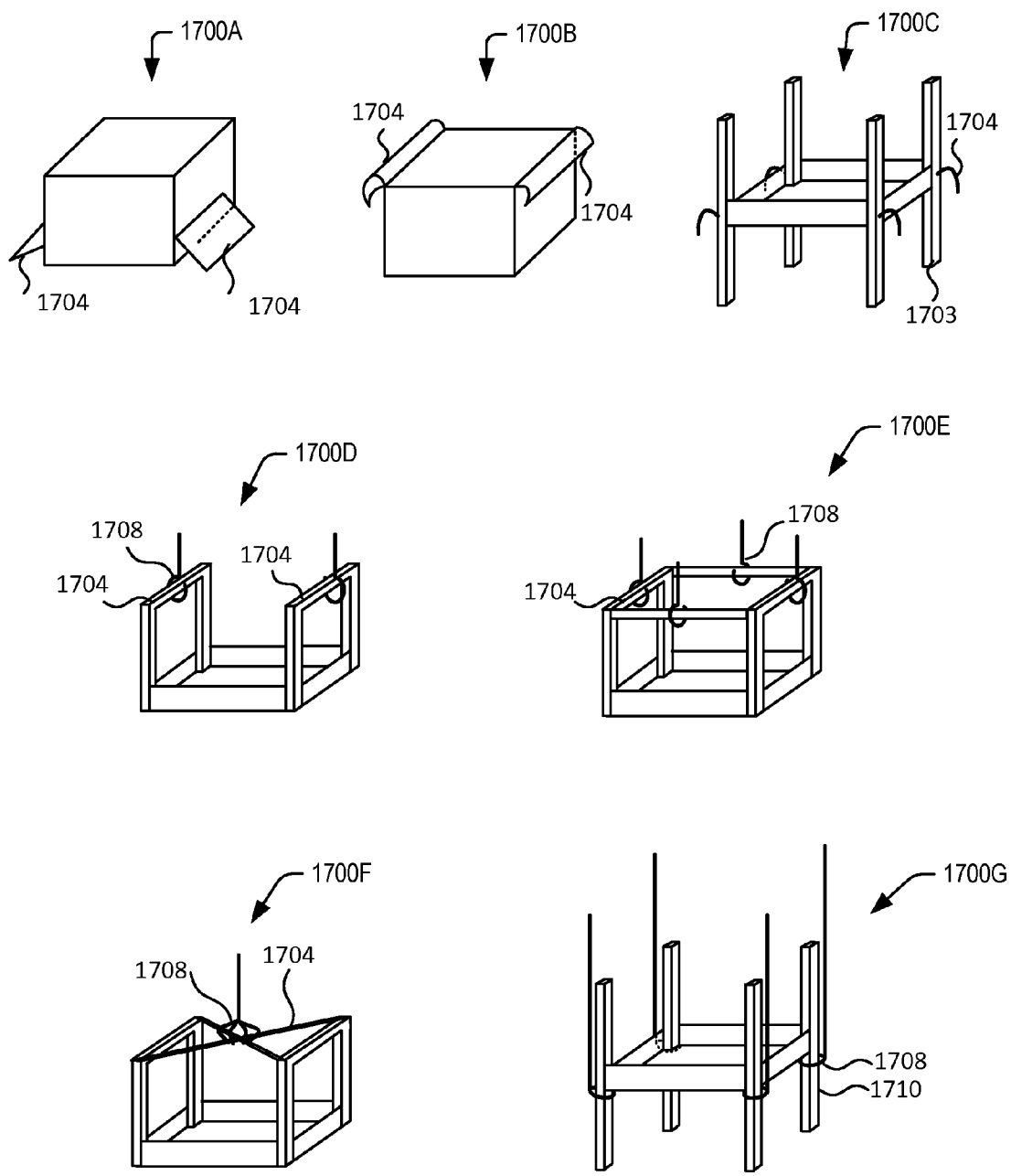
FIG. 17 illustrates example transportable objects with coupling members, in accordance with embodiments.
Figure 18:
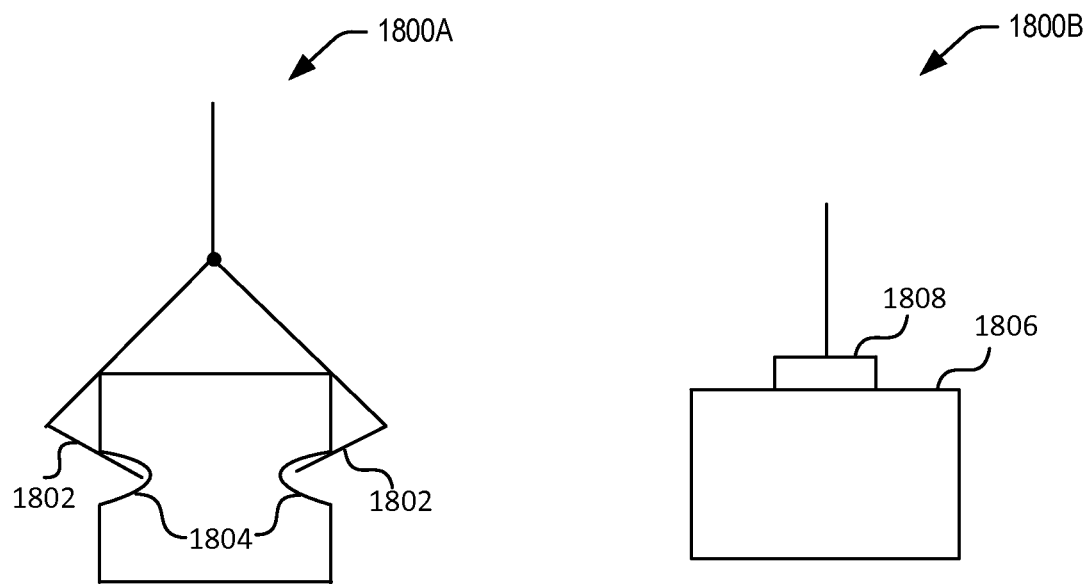
FIG. 18 illustrates example transportable objects that can be coupled with overhead drive units, in accordance with embodiments.
Figure 19:
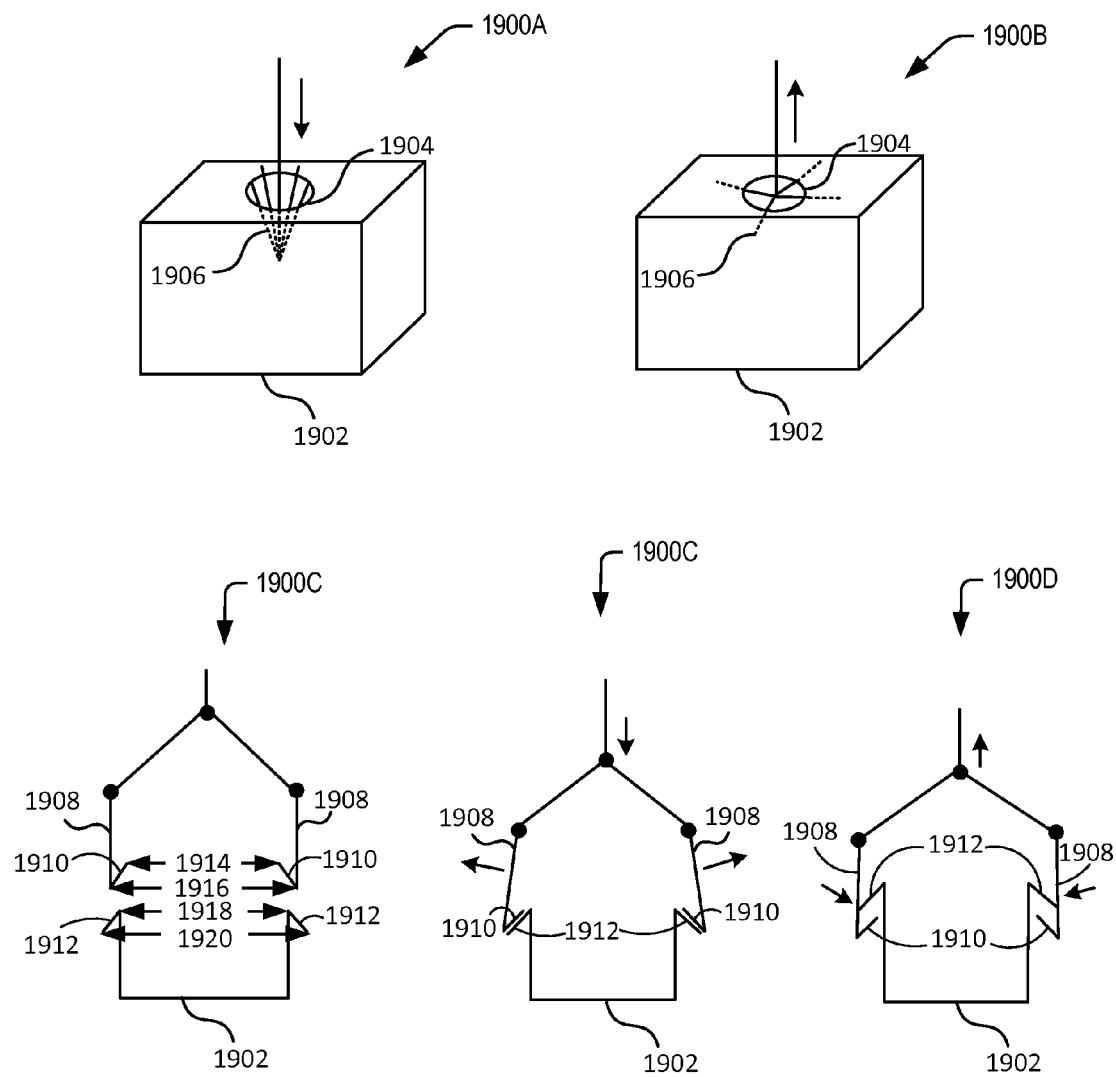
FIG. 19 illustrates in further detail example coupling mechanisms between the transportable objects and overhead drive units, in accordance with embodiments.

The transportable objects may be coupled to an overhead drive unit using one of a variety of mechanisms. FIGS. 17-19 illustrate example coupling mechanisms that may be utilized to couple a transportable object 1700 with a portion of an overhead drive unit. FIG. 17 illustrates example transportable objects 1700A-G with coupling members, in accordance with embodiments. In various embodiments, the coupling members of a transportable object can be configured to couple with a corresponding coupling member or a portion of an overhead drive unit so as to cause the transportable object to be lifted and/or lowered. The transportable objects can include an inventory holder or a detachable component of an inventory holder such as discussed above in FIGS. 12-16.

In some embodiments, such as shown by transportable objects 1700A-F, a transportable object can include one, two, or more handles 1704 that may be lifted by an overhead drive unit. The number, position, shape, size, and other characteristics of such handles may vary in various embodiments depending on the shape, size, structure, weight, and other characteristics of the transportable object. For instance, each transportable object may have one (such as shown for transportable object 1700F), two (such as shown for transportable objects 1700A, B, and D), three, four (such as shown for transportable objects 1700C and E), or more handles. The handles 1704 may be disposed on opposing sides or surfaces of the transportable object (such as shown for transportable objects 1700A-E), or non-opposing sides or surfaces of the transportable object. The handles may be disposed at or near a top portion of the transportable object (such as shown for transportable object 1700A, and D-F), at or near a bottom portion of the transportable object (such as shown for transportable object 1700B), or at or near a middle portion of the transportable object (such as shown for transportable object 1700C). The shape of the handles may also vary in different embodiments. For instance, the handles 1704 can have downward-directed structure such as a straight fin-like structure for transportable object 1700A, a curved bar structure for the transportable object 1700B, or a downward hook structure such as illustrated for the transportable object 1700C. Alternatively, the handles 1704 can comprise one or more horizontal bars such as illustrated for transportable objects 1700D-F. For instance, the transportable object 1700D can have two substantially parallel horizontal bars 1704 disposed at or near the top of the transportable object. The transportable object 1700E can have four horizontal bars 1704 that form a rectangle disposed at or near the top of the transportable object. Or, the transportable object 1700F can have intersecting bars 1704 disposed at or near the top of the transportable object wherein the intersection can be grasped by a clasp 1708 from an overhead drive unit. In some examples, the handles 1704 may comprise one or more loops, semi-loops, or similar structures attached to one or more portions of the transportable objects (e.g., on a top surface or opposing sides of the transportable objects). In general, the handles 1704 may be configured to be lifted, held, or grasped by, or otherwise coupled with one or more corresponding coupling members 1708 of an overhead drive unit. Examples of the coupling members 1708 of the overhead drive unit can include hooks, grasps, grapples, and the like.

In various embodiments, the coupling members of a transportable object (e.g., handles) may be part of the integral structure of the transportable object or an attachment structure that is attached to an external surface of the transportable object. As an example, coupling members can include one or more legs 1710 of a transportable object 1700G as part of the transportable object 1700G. The legs 1710 may be directly grasped or otherwise coupled with an overhead drive unit via a clasp ring 1708 or any other suitable coupling member of the overhead drive unit. As another example, the horizontal bars 1704 illustrated for transportable objects 1700D-F may be part of the overall frames of the transportable objects. In other embodiments, such as illustrated for transportable objects 1700A-C, the coupling members 1704 may be an attachment structure attached to an external surface of the transportable objects. Such attachment structures may be permanently or detachably attached to the transportable objects. In various embodiments, the coupling members may include any suitable protrusions, depressions, or flat surfaces of the transportable objects.

FIG. 18 illustrates additional example transportable objects 1800A-B that can be coupled with overhead drive units, in accordance with embodiments. For instance, a transportable object 1800A can include one, two, three, or more depressions or cavities 1804 on one or more side portions of the transportable object. The cavities 1804 may be configured to interface with one or more grasping members 1802 of an overhead drive unit such as illustrated. As another example, a transportable object 1800B can include one or more exterior surfaces 1806 that are configured to couple directly or indirectly with a coupling member 1808 of an overhead drive unit. For instance, the coupling member 1808 of the overhead drive unit may comprise a suction cup configured to be attachable to the surface 1806 thereby enabling lifting of the transportable object 1800B via vacuum suction. As another example, the coupling member 1808 of the overhead drive unit and the transportable object 1800B may be configured to be attracted to each other by forces produced by magnetic or electromagnetic fields. In some embodiments, the coupling member 1808 may directly contact the top surface 1806 of the transportable object 1800B when they are coupled. In some other embodiments, the coupling member 1808 may not directly contact the top surface 1806 of the transportable object 1800B. Rather, the coupling member 1808 may be suspended at a distance from a top surface 1806 of the transportable object 1800B when they are coupled.

FIG. 19 illustrates in further detail example coupling mechanisms between the transportable objects and overhead drive units, in accordance with embodiments. In some embodiments, such as illustrated at 1900A and 1900B, a transportable object 1902 may comprise an opening 1906 on a top surface of the transportable object 1902. To couple the transportable object to an overhead drive unit, a coupling member 1906 of an overhead drive unit may be configured to be inserted into the opening 1904 from above the transportable object 1902 in an undeployed state (e.g., like a closed umbrella) such as illustrated at 1900A. Subsequently, as illustrated at 1900B, the coupling member 1906 may be deployed or expand (e.g., like opening an umbrella or blowing up a balloon) once inside the opening 1906 such that the deployed coupling member 1906 no longer fit through the opening 1904 of the transportable object. Lifting the deployed coupling member 1906 can therefore cause the transportable object 1902 to be lifted as well. To release the transportable object, the coupling member 1906 may be undeployed or otherwise reduced in volume while inside the transportable object. In some instances, the position of the coupling member 1906 may first need to be lowered or otherwise adjusted relative to the opening 1904. Once undeployed, the coupling member 1904 may be pulled outside the transportable object from the opening 1904, thereby releasing the transportable object from the overhead drive unit.

In some other embodiments, such as illustrated at 1900C-E, a transportable object 1902 may have one or more handles 1912 such as discussed in FIG. 17. The handles 1912 may be configured to couple with a coupling member of an overhead drive unit. The coupling member may comprise one or more rotatable arms 1908 with upward and upward facing hooks 1910 at the distal portions of the arms. In some embodiments, when the coupling member is not coupled with the transportable object such as illustrated at 1900C, the width 1916 between proximal ends of opposing hooks 1910 may be wider than the width 1918 between proximal ends of opposing handles 1912 while the width 1914 between distal ends of opposing hooks 1910 may be less than the width 1920 between distal ends of opposing handles 1912. To couple with the transportable object 1902, the coupling member can be lowered toward the transportable object 1902 from above. As illustrated at 1900C, the hooks 1910 may be pushed outward by the handles 1912 as the coupling member pushes down on the transportable object until the hooks 1910 fall beneath the handles 1912 as illustrated at 1900D, such that when the coupling member is lifted up, the hooks 1910 engage with the handles 1912 from underneath the handles to lift up the transportable object 1902. In some embodiments, the rotatable arms 1908 may be configured to open up and/or close down by a force from gravity, spring, or any other suitable source. For instance, the arms 1908 may be controlled to open up and/or close down by an actuator (e.g., motor) controlled by a control module such as a control module 908 of an overhead drive unit as discussed in FIG. 9. The reverse process may be implemented to allow the transportable object to be released from the coupling member of the overhead drive unit.

Figure 20:
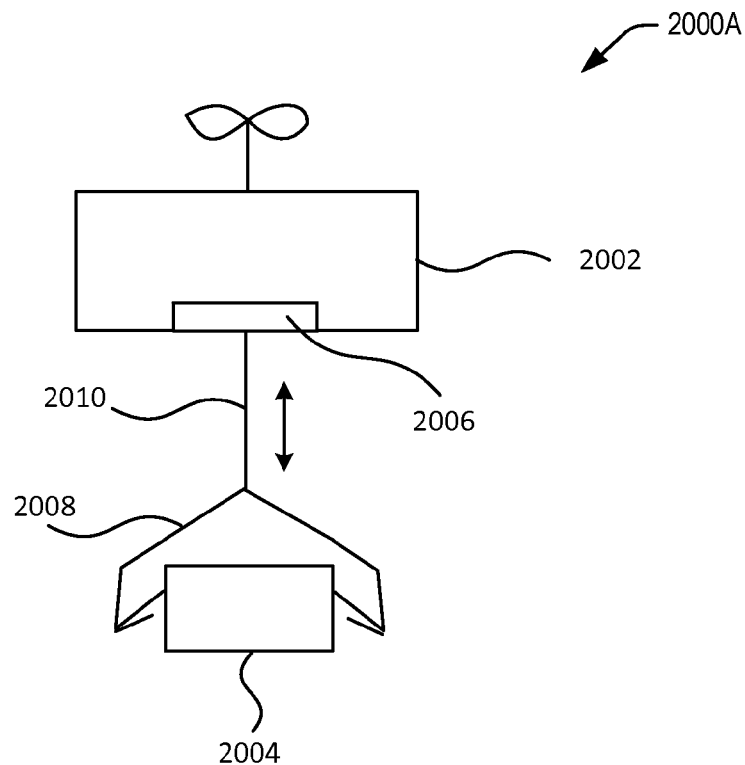
FIG. 20 illustrates example retaining systems associated with overhead transportable units that may be used to retrieve, transport and/or release transportable objects, in accordance with embodiments.
Figure 20:
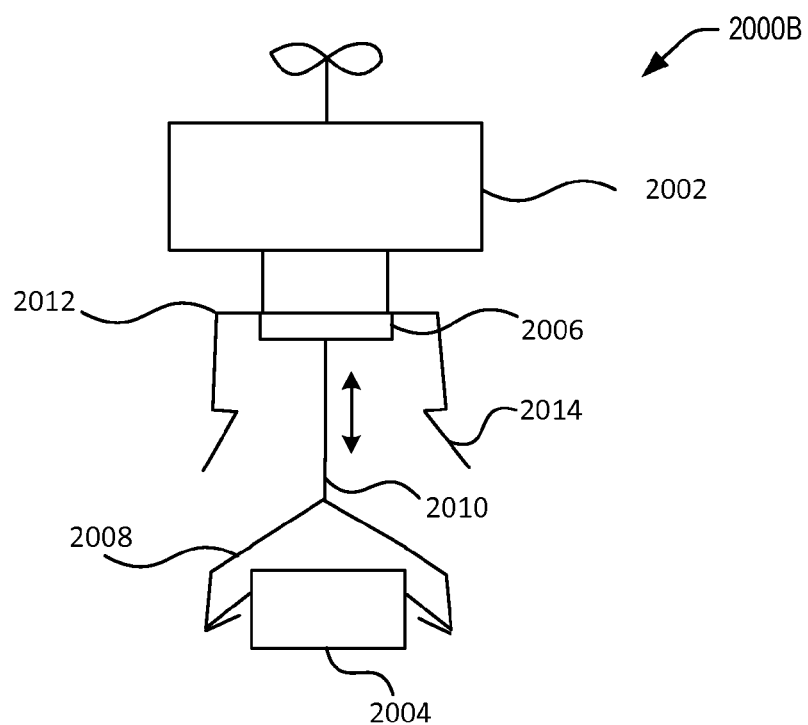

FIG. 20 illustrates example retaining systems 2000A and B associated with overhead transportable units 2002 (e.g., UAVs) that may be used to retrieve, transport and release transportable objects 2004, in accordance with embodiments. The retaining system 2000A or B may include an extension member 2010 attached at one end to the overhead drive unit 2002 and at the other end to a coupling member 2008 configured to couple with a transportable object 2004.

The extension member 2010 can be configured to extend or retract in length in order to lower or lift the coupling member 2008. In some embodiments, a retaining system 2000A may not include any additional holding members for securing the transportable object 2004 during transport. In some other embodiments, a retaining system 2000B may include an additional holding member 2012 for securing for securing the transportable object 2004 during transport. As illustrated, the holder member 2012 may include a housing configured to hold the transportable object during transport. The housing 2012 may include one or more trapdoors 2014 to allow the transportable object in and out of the housing.

In various embodiments, aspects of the retaining system 2000A or B may be controlled by a control module 2006 similar to the control module 908 discussed in FIG. 9. The control module may be operatively connected to an actuation system (not shown) configured to actuate various components of the retaining system such as the extension member 2010, the coupling member 2008, the holding member 2012 (e.g., the trapdoors 2014), or the like. The control module 2006 may be disposed inside or outside the body of the UAV (such as illustrated by the retaining system 2000A), inside or outside a holding member 2012 carried by the UAV (such as illustrated by the retaining system 2000B), or at any other suitable portion of the UAV.

Figure 21:
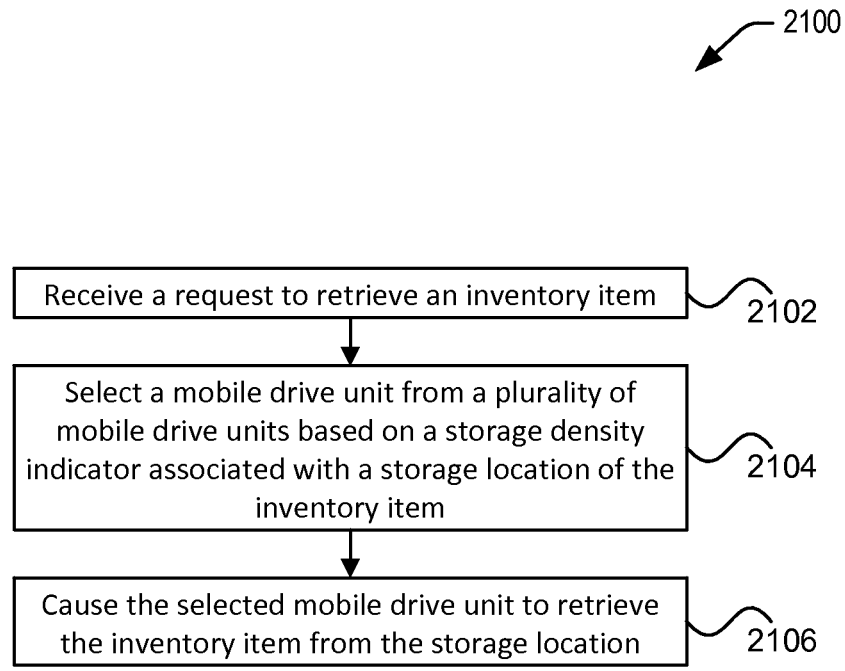
FIG. 21 illustrates an example process for implementing retrieval of inventory items, in accordance with embodiments.

According to an aspect of the present invention, systems and methods are provided for selecting mobile drive units to retrieve or store inventory items based a storage density associated with a storage location of the inventory item. FIG. 21 illustrates an example process 2100 for implementing retrieval of inventory items, in accordance with embodiments. Aspects of the process 2100 may be performed, in some embodiments, by a management module 15 discussed in connection with FIG. 3, a control system 900 for a mobile drive unit such as discussed in FIG. 9, or a combination of both. Some or all aspects of the process 2100 (or any other processes described herein, or variations and/or combinations thereof) may be performed under the control of one or more computer/control systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The order in which the operations are described is not intended to be construed as a limitation, and any number of the described operations may be combined in any order and/or in parallel to implement the processes.

The process 2100 can include receiving 2102 a request to retrieve an inventory item stored in an inventory system. The retrieval request may include information identifying the inventory item to be retrieved such as an item identifier, classification code, description, and the like. Based on the information, a storage location of the inventory item may be determined. The determination may be based on a map between inventory items and storage locations that may be stored and/or maintained at a data store. The storage location may indicate a location of a transportable object such as an inventory holder or a storage component (e.g., a bin, tray, or tote of an inventory holder) that is used to store the inventory item. In some cases, the transportable object can be the inventory item itself. In some embodiments, the location of the transportable object may be represented as coordinates in a global or local positioning system. When multiple copies of the inventory item are stored at multiple locations, one copy of the inventory items may be determined to be the copy to be retrieved based on at least in part on the storage location of transportable object, availability and condition of system resources (e.g., mobile drive units or human or automated operators) near the storage location, frequency of access to the storage location, storage density at or near the storage location, and/or any other relevant factors.

In some embodiments, the retrieval request may also include information identifying a location to which the retrieved inventory item is to be delivered such as a location associated with an inventory station, a mobile drive unit, an inventory holder, or the like. In some other embodiments, the retrieval request may not include such any information identifying any particular delivery location. Rather, such destination information may be determined dynamically after receiving the request based at least in part on the storage location of the inventory item, availability and condition of system resources (e.g., mobile drive units, human or automated operators, inventory stations), workload (e.g., a length of queue or wait time) or processing speed at inventory stations, and/or any other relevant factors. In some embodiments, the destination information may include a final location for the inventory item and/or one or more intermediate locations on a path toward the final location.

In some embodiments, the request may also include other information such as a priority information (e.g., high priority or low priority), timing constraint (e.g., a deadline by which the request need to be handled and/or completed), cost constraint (e.g., a maximum cost or minimum cost in terms of resource usage), handling instructions (e.g., whether an inventory item is fragile and should be handled with care), size or weight information of inventory items, and the like.

In some embodiments, the process 2100 can include selecting 2104 a mobile drive unit from a plurality of mobile drive units based at least in part on a storage density indicator associated the storage location of the inventory item. In some examples, selecting of a mobile drive unit includes selecting a type of mobile drive unit from a plurality of types of mobile drive units based at least in part on a storage density indicator associated the storage location of the inventory item and then selecting a mobile drive unit of the selected type. In various embodiments, the mobile drive units in an inventory system can be categorized into different types based on one or more characteristics associated with the mobile drive units. Such characteristics may include a mode of transportation (ground or overhead), width, height, footprint, weight, capacity, speed (e.g., maximum speed, minimum speed, or average speed), battery life, cost to purchase or cost of maintenance, and the like.

In various embodiments, a storage density indicator associated with a storage location represents how closely the inventory holders are stored relative to each other at or near the storage location. The storage density indicator may be used to indicate storage density in one or more lateral directions (e.g., how many inventory holders there are in a given unit area). Alternatively or additionally, the storage density indicator may be used to indicate how closely storage units are placed in a vertical direction (e.g., how closely the storage bins are stacked on a given inventory holder). In an example, a storage density indicator associated with a particular storage location can be represented by a storage density indicator for a storage area at or near the storage location such as an area covering the storage location and within certain distance (e.g., radius) from the storage location. In some cases, the storage density of a storage area may be predefined or predetermined. For instance, a first predefined storage area used to store lower-frequency inventory items may have a higher storage density compared a second predefined storage area used to store higher-frequency inventory items. In such cases, a storage density associated with a storage location may be determined by comparing the storage location with predefined storage areas having known storage densities. If the storage location falls within a storage area with a known storage density, then the storage location is determined to have that know storage density. In some embodiments, the storage density indicator may be determined based on a frequency of access associated with an inventory holder containing the inventory item. A higher frequency of access may indicate a lower storage density and vice versa. In some instances, an inventory holder located in a high-frequency storage area may be determined to have a high storage density whereas an inventory holder located in a low-frequency storage area may be determined to have a low storage density. In some embodiments, the storage density associated with a storage location may also vary depending on the position of the particular storage location within a storage area. For instance, the storage density of a storage area may be the highest at or near a center of the storage area and may decrease toward a periphery of the storage area. In some embodiments, storage density indicator can indicate a level of difficulty of access to an inventory holder or a component thereof by a particular type of mobile drive unit such as a ground drive unit. For instance, determining the storage density indicator can include determining how difficult it is to access a storage location by a ground drive unit. The values of the storage density indicator may indicate the level of difficulty (e.g., "5" for the most difficult and "1" for the easiest).

In some cases, the storage density of a storage area may be dynamically determined and/or updated. For instance, storage densities of various storage areas may be monitored in real-time or nearly real-time based on sensing data from various sensors (e.g., cameras, proximity sensors) distributed at various locations of a storage space such as on a ceiling or wall, on an inventory holder, or on a mobile drive unit. Such real-time or nearly real-time storage density information may be collected and/or updated by a management system such as the management module 15 discussed in FIG. 3 and used for selecting a suitable mobile drive unit as discussed herein.

A storage density indicator may represent storage density in a variety of ways. For instance, a storage density indicator can include a numeric value (e.g., 25), an alphabetical string (e.g., "high" or "low"), an alphanumeric value, or the like. In an embodiment, the values for storage density indicators may fall within a predetermined range (e.g., a number between 0 and 100). In some other embodiments, the values for storage density indicators may be have an arbitrary range. For instance, a storage density indicator may indicate a number of storage units (e.g., inventory holders, components of inventory holders, or inventory items) per unit area. Examples of such unit areas may include one square foot (sqft), 10 sqft, 20 sqft, 50 sqft, 100 sqft, 200 sqft, 500 sqft, 1000 sqft, and the like. As another example, a storage density indicator may indicate a distance between adjacent storage units within a storage area. The distance may be an average distance, a maximum distance, or a distance between predetermined or randomly selected storage units. Typically, higher numeric values represent higher storage density. For instance, a storage density indicator of ten inventory holders per 100 sqft represents a higher storage density than a storage density indicator of five inventory holders per 100 sqft. Alternatively, in some other embodiments, lower numeric values may represent higher storage density. For instance, a storage density indicator of two feet between adjacent inventory holders represents a lower storage density than a storage density indicator of one foot between adjacent inventory holders.

In an embodiment, a type of the mobile drive unit may be selected from a plurality of types of mobile drive units based at least in part on the storage density indicator associated with the storage location of the inventory item to be retrieved and then a mobile drive unit of the selected type may be selected. In another embodiment, the mobile drive unit may be directly selected based on the storage density indicator without first selecting the mobile drive unit type. In various embodiments, a type of a mobile drive unit can be determined based on a mode of transportation (ground or overhead), width, height, footprint, weight, capacity, speed (e.g., maximum speed, minimum speed, or average speed), battery life, cost to purchase or cost of maintenance, and the like. In particular, the mode of transportation can indicate an environment in which the transportation takes place, for example, on the ground versus in the air. In various embodiments, the selected mobile drive unit type may be configured to optimize the time, cost, collision avoidance, resource allocation, and/or other suitable aspects associated with the retrieval process. For instance, if it is determined that an object (e.g. inventory holder, a detachable component of the inventory holder, or an inventory item) is stored in a laterally packed area, it may save time to use an overhead drive unit rather than a ground drive unit to retrieve the object from above in a primarily vertical direction rather than retrieving the object from a lateral direction via a ground drive unit. As another example, drive units with a smaller size or footprint (e.g., width, height, or volume) may be selected for a high density storage area to reduce the likelihood of collision with storage units and/or other drive units.

In addition to storage density, the storage density indicator may incorporate considerations of a variety of other factors related to mobile drive units, the particular inventory request, aspects of the inventory system, and the like. Examples of drive unit related factors can include a current position, load capacity, power or batter charge status, and the like of a mobile drive unit. Examples of factors related to a particular inventory request may include priority information (e.g., high priority or low priority), timing constraint (e.g., a deadline by which the request need to be handled and/or completed), cost constraint (e.g., a maximum cost or minimum cost in terms of resource usage), handling instructions (e.g., whether an inventory item is fragile or a direction at which the item should be handled), size or weight information of inventory items (e.g., oversized or overweight items), location of the inventory item (e.g., storage location of an inventory holder that stores the inventory item and/or the location of the inventory item within the inventory holder), and the like. For instance, a faster drive unit (e.g., a UAV) may be selected to fulfil a request with a high priority or an urgent timing constraint. A slow but more stable type of drive unit may be selected to retrieve an item that is fragile. An overhead drive unit may be used to retrieve an inventory item if it is stored at a detachable top portion of an inventory holder whereas a ground drive unit may be used to retrieve the entire inventory holder if it is stored at a lower portion of the inventory holder. Examples of system considerations can include the capacity, allocation of workload, and performance of system resources (e.g., drive units, inventory stations, human or automated operators), and the like.

In some embodiments, some or all of the factors discussed above may be combined with the storage density information discussed above to derive the storage density indicator used for selecting a suitable mobile drive unit. For instance, each of the relevant factors may be assigned a weighted value depending on the relative importance among the factors and/or the importance of the given factor for a particular request. The storage density indicator may be generated based on a combination (e.g., linear combination or non-linear combination) of the weighted values of the various factors. A particular mobile drive unit may be selected based on the storage density indicator. In some embodiments, the storage density indicator may be compared with a threshold value. Different mobile drive units may be selected based on whether the storage density indicator exceeds the threshold value. For instance, an overhead drive unit may be selected if the storage density indicator exceeds the threshold value. Otherwise, a ground drive unit may be selected.

Once the mobile drive unit has been selected, the process 2100 includes causing or instructing 2106 the selected mobile drive unit to retrieve the inventory item from the storage location. In some embodiments, a transportable object needs to be identified that may include an entire inventory holder that contains the inventory item, a detachable component of an inventory holder that contains the inventory item, or the inventory item itself. Determining the transportable object to be retrieved by the selected mobile drive unit can be based on a variety of factors including a relative position of the inventory item within its inventory holder, characteristics of the inventory holder, characteristics of the selected mobile drive unit, characteristics of the inventory item, and the like. For instance, if the inventory item is located in a detachable component at or near the top of an inventory holder, the detachable component may be retrieved instead of the entire inventory holder. On the other hand, an entire inventory holder may be the transportable object if the inventory item is located at a bottom portion of the inventory holder, the inventory holder does not have any detachable component, the inventory holder is lightweight, the inventory holder contains other inventory items that need to be retrieved, or due to other reasons. In some cases, the type of the selected mobile drive unit may determine the transportable object to be retrieved. For instance, the transportable object may be an entire inventory holder if the selected drive unit is a ground drive unit. On the other hand, the transportable object may be a top detachable portion of an inventory holder or even the inventory item itself if the selected drive unit is an overhead drive unit. Other factors that contribute to the identification of the transportable object may include a capacity of the selected mobile drive unit, weight and/or size of the inventory item or a storage unit thereof, frequency of access or relevancy of other inventory items to be retrieved together, and the like.

In some embodiments, causing or instructing 2106 retrieval of the inventory item can also include transmitting information identifying the storage location of the transportable object to the selected mobile drive unit. Such information may include, for example, the coordinates of the storage location. In some embodiments, information useful for verifying authenticity of the transportable object may also be optionally provided. Such identification information may be used by the selected mobile drive unit to verify the identity of an object before or after it has been retrieved. For instance, barcode data (e.g., QR code data) associated with the object may be stored by the selected drive unit and used to verify the identity of the object upon scanning of the object's barcode. In some embodiments, the detection of the object identifier may allow the mobile drive unit to adjust its position relative to the object in order to enable coupling between the mobile drive unit and the object.

In some embodiments, causing or instructing 2106 retrieval of the inventory item can also include providing a delivery location of transportable object. The delivery location can include a location of an inventory station such as discussed above, a location near a mobile drive unit, a location near a human or automated operator, a location of a storage unit (e.g., inventory holder or detachable component of an inventory holder), or any other suitable location. In some embodiments, the delivery location may represent a final location for an inventory item and/or one or more intermediate locations on a path toward the final location. In some other embodiments, the delivery location may not be provided to the selected mobile drive unit. Rather, the mobile drive unit may be configured to automatically determine a delivery location. For instance, the mobile drive unit may be configured to fetch the transportable object back to an original departing location, deliver the transportable object to a nearest inventory station, to a location just outside a peripheral of a densely packed storage area, or any other location.

In some embodiments, the selected mobile drive unit may be configured to autonomously retrieve the transportable object based on the above provided information. For example, the mobile drive unit may be configured to autonomously navigate to the storage location of the transportable object based on the provide location information, optionally verify the transportable object, retrieve the transportable object, carry the transportable object to the designated location, and/or release the transport object at the designated location.

In other embodiments, some or all operations of the selected mobile drive unit may be controlled by a remote control system such as the management module 15 discussed in FIG. 3, a remote controller operated by a human or automated operator, or the like. For instance, the remote control system may be configured to control the direction, speed, spatial disposition (e.g., orientation), mode of operation, and aspects of the mobile drive unit or a component thereof (e.g., a propulsion system, a sensing system or a retaining system).

Figure 22:
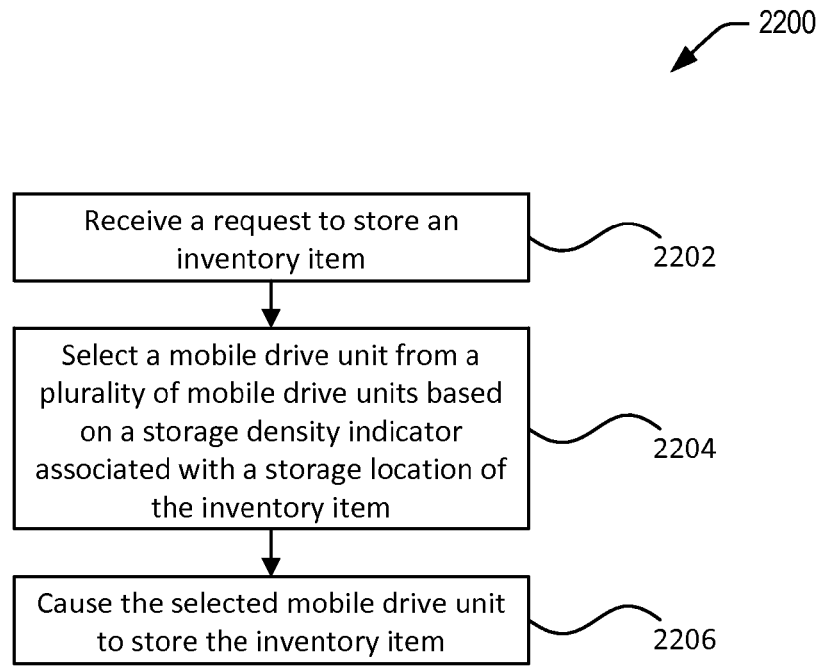
FIG. 22 illustrates an example process for implementing storage of inventory items, in accordance with embodiments.

FIG. 22 illustrates an example process 2200 for implementing storage of inventory items, in accordance with embodiments. Aspects of the process 2200 may be performed, in some embodiments, by a management module 15 discussed in connection with FIG. 3, a control system for a mobile drive unit such as discussed in FIG. 9, or a combination of both.

The process 2200 can include receiving 2202 a request to store an inventory item. Such a storage request may be used to move an inventory item from outside a storage area to a storage area. For instance, the inventory item may be at or near an inventory station and need to be moved to the storage area. In some other cases, the inventory item may be already in a storage area but need to be moved to another storage area. For instance, the inventory item may need to be moved from low-frequency storage to a high-frequency storage area, or vice versa.

The storage request may include information identifying the inventory item to be retrieved. Based on such information, a retrieval location of the inventory item may be determined using techniques similar to those discussed above in FIG. 21. For instance, the inventory system may be configured to track the whereabouts of various inventory objects such as inventory items, inventory holders, mobile transport units, inventory stations, human or automated operators, and the like.

A storage location of inventory item may be determined. The storage location may be specified by the storage request. Alternatively, the storage location may be determined based on various factors such as the current location of the inventory item, frequency of access or other characteristics of the inventory item, availability and condition of system resources (e.g., storage space, mobile drive units, human or automated operators, inventory stations), type and/or classification of the inventory item, and any other relevant factors. For instance, a new inventory item may be stored to a location according to its type (e.g., toys, electronics, and the like). An inventory item that was previously removed from a storage location may be restored to the same storage location or moved to a new storage location.

In various embodiments, the storage location may be selected to optimize time, cost, use of space, resource usage, and other aspects of the inventory system. In some cases, an inventory item may be stored with other inventory items that share similar characteristics. For example, a frequently accessed inventory item may be assigned to a storage location in a high-frequency storage area to facilitate quick future access whereas a less frequently accessed inventory item may be assigned to a storage location in a low-frequency storage area. The high-frequency storage area may be configured to be more accessible than the low-frequency storage area.

In some embodiments, the request may also include other information such as a priority information (e.g., high priority or low priority), timing constraint (e.g., a deadline by which the request need to be handled and/or completed), cost constraint (e.g., a maximum cost or minimum cost in terms of resource usage), handling instructions (e.g., whether an inventory item is fragile and should be handled with care), size or weight information of inventory items, and the like.

In some embodiments, the process 2200 can include selecting 2204 a mobile drive unit from a plurality of mobile drive units based at least in part on a storage density indicator associated the storage location of the inventory item. In some embodiments, the selection of the mobile drive unit may be similar to the selection of mobile drive unit described in FIG. 22 above. Specifically, in some examples, selecting of a mobile drive unit includes selecting a type of mobile drive unit from a plurality of types of mobile drive units based at least in part on a storage density indicator associated the storage location of the inventory item and then selecting a mobile drive unit of the selected type. The types of the mobile drive units can include mode of transportation (ground or overhead), width, height, footprint, weight, capacity, speed (e.g., maximum speed, minimum speed, or average speed), battery life, cost to purchase or cost of maintenance, and the like.

In some embodiments, a type of a mobile drive unit can be determined based on a mode of transportation (ground or overhead), width, height, footprint, weight, capacity, speed (e.g., maximum speed, minimum speed, or average speed), battery life, cost to purchase or cost of maintenance, and the like. In particular, the mode of transportation can indicate an environment in which the transportation takes place, for example, on the ground versus in the air. In various embodiments, the selected type may optimize the time, cost, collision avoidance, resource allocation, and/or other suitable aspects associated with the inventory storage process. For instance, if it is determined that an object (e.g. inventory holder, a detachable component of the inventory holder, or an inventory item) is to be stored in a laterally packed area, it may save time to use an overhead drive unit rather than a ground drive unit to deliver the object from above in a primarily vertical direction rather than storing the object from a lateral direction via a ground drive unit. As another example, drive units with a smaller size or footprint (e.g., width, height, or volume) may be selected for navigation in a high-density storage area to reduce the likelihood of collision with storage units and/or other drive units.

In addition to storage density, the selection of a mobile drive unit can also be based on a variety of other factors related to mobile drive units, the particular inventory request, aspects of the inventory system, and the like. Examples of drive unit related factors can include a current position, load capacity, power or batter charge status, and the like of a mobile drive unit. Examples of factors related to a particular inventory request may include priority information (e.g., high priority or low priority), timing constraint (e.g., a deadline by which the request need to be handled and/or completed), cost constraint (e.g., a maximum cost or minimum cost in terms of resource usage), handling instructions (e.g., whether an inventory item is fragile or a direction at which the item should be handled), size or weight information of inventory items or storage unit (e.g., oversized or overweight items), and the like. For instance, a faster drive unit (e.g., a UAV) may be selected to fulfil a request with a high priority or an urgent timing constraint. A slow but more stable type of drive unit may be selected to retrieve an item that is fragile. An overhead drive unit may be used if the inventory item is located in a detachable component such that the detachable component may be stored on top of an existing inventory holder. On the other hand, a ground drive unit may be used to store an entire inventory holder. Examples of system considerations can include the capacity, allocation of workload, and performance of system resources (e.g., drive units, inventory stations, management module, inventory holders, human or automated operators), and the like.

In some embodiments, some or all of the factors discussed above may be combined with the storage density information discussed above to select a suitable mobile drive unit. For instance, each of the relevant factors may be assigned a weighted value depending on the relative importance among the factors and/or the importance of the given factor for a particular request. Based on the weighted values of the various factors, a particular mobile drive unit may be selected according to a predetermined selection matrix, formula, or algorithm.

While FIGS. 21 and 22 illustrate example processes for selecting of mobile drive units based on the storage densities respectively associated with a retrieval storage location and a delivery storage location, it is understood that the density-based selection techniques described herein can be applied in general to select a mobile drive unit to move an object from a start location to a finish location. Examples of such start and finish locations can include storage locations, inventory stations, mobile drive locations, or any other suitable location. Furthermore, the selection of a mobile drive unit may be based on a density of objects near the start location, a density of objects near the finish location, or both.

Still referring to FIG. 22, once the mobile drive unit has been selected, the process 2200 includes causing or instructing 2206 the selected mobile drive unit to store the inventory item to the storage location. In some embodiments, a transportable object needs to be identified that may include an entire inventory holder that contains the inventory item, a detachable component of an inventory holder that contains the inventory item, or the inventory item itself. Determining the transportable object to be retrieved by the selected mobile drive unit can be based on a variety of factors including a relative position of the inventory item within its inventory holder, characteristics of the inventory holder, characteristics of the selected mobile drive unit, characteristics of the inventory item, and the like. For instance, if the inventory item is located in a detachable component at or near the top of an inventory holder, the detachable component may be retrieved instead of the entire inventory holder. On the other hand, an entire inventory holder may be the transportable object if the inventory item is located at a bottom portion of the inventory holder, the inventory holder does not have any detachable component, the inventory holder is lightweight, the inventory holder contains other inventory items that need to be stored, or due to other reasons. In some cases, the type of the selected mobile drive unit may determine the transportable object to be retrieved. For instance, the transportable object may be an entire inventory holder if the selected drive unit is a ground drive unit. On the other hand, the transportable object may be a top detachable portion of an inventory holder or even the inventory item itself if the selected drive unit is an overhead drive unit. Other factors that contribute to the identification of the transportable object may include a capacity of the selected mobile drive unit, weight and/or size of the inventory item or a storage unit thereof, characteristics of inventory items that are stored with the inventory item, and the like.

In some embodiments, causing or instructing 2206 storage of the inventory item can also include transmitting information identifying a current location of the transportable object to the selected mobile drive unit. In some embodiments, information useful for verifying authenticity of the transportable object may also be optionally provided. Such identification information may be used by the selected mobile drive unit to verify the identity of an object before or after it has been retrieved. For instance, barcode data (e.g., QR code data) associated with the object may be stored by the selected drive unit and used to verify the identity of the object upon scanning of the object's barcode.

In some embodiments, causing or instructing 2206 storage of the inventory item can also include providing a delivery location of transportable object. The delivery location can include a storage location for the inventory item, a location of an inventory station such as discussed above, a location near a mobile drive unit, a location near a human or automated operator, a location of a storage unit (e.g., inventory holder or detachable component of an inventory holder), or any other suitable location. In some embodiments, the delivery location may represent a final location for an inventory item and/or one or more intermediate locations on a path toward the final location.

For retrieval or storage of an inventory item, in some embodiments, the current location and/or delivery location of the inventory item may not be provided to the selected mobile drive unit. Rather, the mobile drive unit may be configured to automatically determine the current location and/or delivery location. For instance, the mobile drive unit may be configured to autonomously locate the inventory item based on an object identifier and a map mapping object identifiers to map locations. As another example, the mobile drive unit may be configured to deliver the transportable object to a nearest inventory station, to a location just outside a peripheral of a densely packed storage area, or any other suitable delivery location based on one or more predetermined rules.

In some other embodiments, the mobile drive units may be configured to obtain location information of the inventory item (e.g., retrieval location and/or delivery location) from a device other than a central management module such as the management module 15 of FIG. 3. In some embodiment, transportable objects, inventory stations, mobile drive units, and/or other components of the inventory system may be configured to transmit and/or receive location information via a communication network. In such embodiments, a mobile drive unit may be configured receive location information from a transportable object (e.g., inventory holder, detachable component, or inventory item). The transportable object may be equipped with a location sensor configured to detect its own location as well as a communication interface for transmitting and/or receiving sensing data or other types of data.

In some embodiments, the selected mobile drive unit may be configured to autonomously retrieve the transportable object based on the current location of the transportable object. For example, the mobile drive unit may be configured to autonomously navigate to the storage location of the transportable object based on the provide location information, optionally verify the transportable object, retrieve the transportable object, carry the transportable object to the designated location, and/or release the transport object at the designated location.

In other embodiments, some or all operations of the selected mobile drive unit may be controlled by a remote control system such as the management module 15 discussed in FIG. 3, a remote controller operated by a human or automated operator, or the like. For instance, the remote control system may be configured to control the direction, speed, spatial disposition (e.g., orientation), mode of operation, and aspects of the mobile drive unit or a component thereof (e.g., a propulsion system, a sensing system or a retaining system).

According to an aspect of the present invention, systems and methods are provided for selecting mobile drive units to move an inventory object based an indicator of estimated cost associated with moving the inventory object. The cost may be estimated using a first type of mobile drive unit selected from a plurality of types of mobile drive units. Based on the estimated cost indicator, a first or second type of mobile drive unit may be selected for moving the object. A mobile drive unit of the selected type may then be instructed to move the object.

Figure 23:
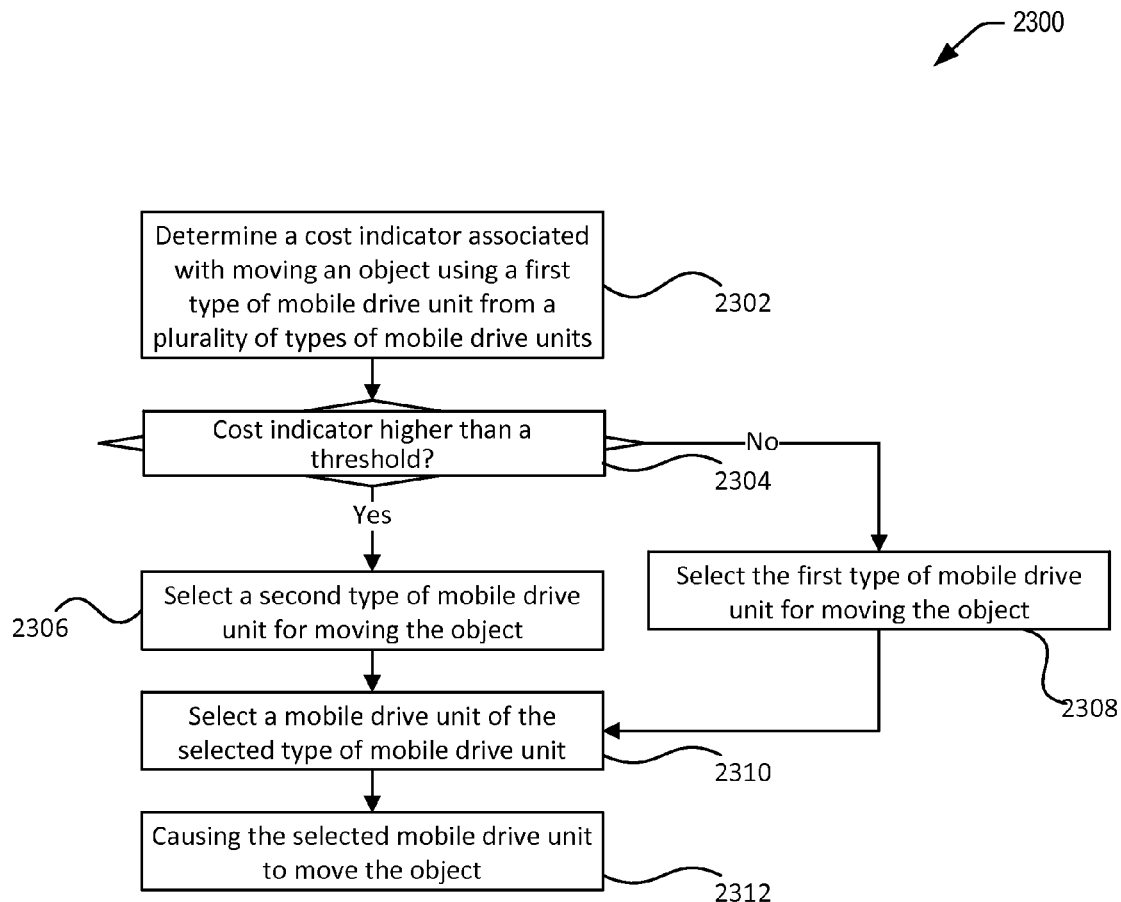
FIG. 23 illustrates an example process for implementing cost-based selection of mobile drive units, in accordance with embodiments. In some embodiments, the process 2300

FIG. 23 illustrates an example process 2300 for implementing cost-based selection of mobile drive units, in accordance with embodiments. In some embodiments, the process 2300 may be executed in response to a request to move the object such as a request to retrieve an inventory item from storage or a request to store an inventory item to a storage area. In some embodiments, aspects of the process 2300 may be performed, in some embodiments, by a management module 15 discussed in connection with FIG. 3, a control system for a mobile drive unit such as discussed in FIG. 9, or a combination of both.

The process 2300 can include determining 2302 an indicator of cost (i.e., cost indicator) associated with moving an object using a first type of mobile drive unit from a plurality of mobile drive units. In various embodiments, the object may include any movable object in an inventory system such as an inventory holder, a detachable component of an inventory holder, an inventory item, a mobile drive unit, a mobile inventory station, a human or automated operator, and the like. The object may be moved from a start location to a finish location. The start location and finish location can include any suitable location including a storage location, at or near an inventory station location, at or near a mobile drive unit location, or the like. For instance, the start location for the object may be a storage location and the finish location of the object may be another storage location or at or near an inventory station. As another example, the start location for the object may be at or near an inventory station and the finish location of the object may be a storage location.

In order to select a suitable mobile drive unit to move object, a cost indicator associated with moving the object may be determined using a first type of mobile drive unit. In various embodiments, an inventory system may have a plurality of types of mobile drive units to choose from. A type of the mobile drive units can be related to a mode of transportation (ground or overhead), width, height, footprint, weight, capacity, speed (e.g., maximum speed, minimum speed, or average speed), battery life, cost to purchase or cost of maintenance, or any other suitable characteristics of the mobile drive units.

In some embodiments, the first type of mobile drive unit that is used to determine the cost may be selected based on one or more predetermined rules. The rules may be based on a number, percentage, frequency of use, or other characteristics associated with the first type of mobile drive unit or other types of mobile drive unit. For instance, the first type of mobile drive unit may be determined to be the type of mobile drive unit with the largest total number or percentage, most frequently used in the past, and/or most likely to be used in the future. In an embodiment, the first type of mobile drive unit may be selected to be a ground drive unit in an inventory system with more ground drive unit (e.g., 100) and less overhead drive units (e.g., 5). In an example, the first type of mobile drive unit may be predetermined. In another example, the first type of mobile drive unit may be dynamically determined (e.g., after receiving a request to move the object).

A cost indicator may be determined that indicates an estimated cost associated with one or more aspects or phases of moving the object. Example aspects of moving the object may include getting to the object at the start location, retrieving the object, transporting the object to the finish location, and releasing the object at the finish location. In particular, when the object is to be retrieved from or put into a congested or high-density area, the estimated cost may cover the process it takes to move other objects out of the way in order to move the object out of or into the congested area. In some embodiments, the cost indicator can be measured based on a storage density at or near a storage location and/or a difficulty of access by a particular type of mobile drive unit (e.g., ground drive unit) to the storage location. The higher the storage density is, the more it may cost to access the storage location. Likewise, the more difficult it is to access a location, the higher the cost may be. In various embodiments, the cost may be measured using any suitable cost metrics including time, money, distance of movement, resources usage (e.g., space, energy, communication bandwidth, memory, CPU), number of objects moved, a number of times an object is moved, and/or the like. In some embodiment, the cost indicator may be represented by a numeric value, an alphanumeric value, or any other suitable representation. For instance, the cost indicator can be represented by values in a predefined range (e.g., positive numbers or a number between "0" and "5" where "0" indicates the lowest cost and "5" indicates the highest cost). The specific set of cost metrics used for the estimation may be determined based on the start location and/or finish location of the object, the first type of mobile drive unit, importance or relevancy of the cost metrics, and the like. For instance, in a congested case discussed above, the cost metrics that are measured may include the time it would take to move other objects out of the way, wear and tear to inventory equipment, a number of inventory holders or other objects that would need to be moved, a number of mobile drive units that need be used, a distance to be traveled by the mobile drive units, a number of messages that need to be transmitted and/or received, and the like. A cost value for the each of the cost metrics may be estimated and the cost indicator may be derived based on the combination of the cost values associated with the cost metrics. In some cases, the cost indicator may be based on one cost value of a single cost metric (e.g., time). In some other cases, the cost indicator may be calculated based on cost values of two, three, four, or more cost metrics. For instance, in an embodiment, the cost values may be weighted (e.g., based on importance and/or relevancy) then combined (e.g., linearly or non-linearly) to derive the cost indicator.

In some embodiments, the cost indicator and/or the cost values may be estimated based on previously-measured cost data associated with actual movements of objects. The actual cost data may be associated with a particular context of the inventory system at a time when the cost data was measured or collected. The context may include a layout, workload, capacity, and/or status of the inventory holders, mobile drive units, inventory stations, and other components of the inventory system such as a type and/or configuration of a mobile drive unit that is used to execute the movement. In some embodiments, previously-measured cost data and the associated context information may be analyzed to identify patterns and/or correlations that may be used to estimate a cost associated with a current context. For instance, a previous context that is similar to the current context may be identified and the measured cost associated with the previous context may be used to approximate or estimate a cost associated with the current context. In various embodiments, statistical analysis, pattern recognition, machine learning, or any other suitable data mining techniques may be used to analyze previously stored cost data. In some embodiments, cost estimation may be calculated based on a cost model constructed based on previous cost data.

The cost indicator may be compared 2304 with a threshold value. If it is determined that the cost indicator exceeds the threshold value, then a second type of mobile drive unit may be selected 2306 for moving the object. Otherwise, if it is determined that the cost indicator does not exceed the threshold value, then the first type of mobile drive unit may be selected 2308 for moving the object. In various embodiments, the threshold value may be determined based on one or more constraints associated with an inventory request or components of the inventory system. Some constraints may be imposed by external entities of the system such as consumers placing orders, trade organization, governments, and the like. Example constraints may include timing constraints (e.g., a deadline for handling and/or completing a request), monetary constraints (e.g., equipment wear and tear or maintenance cost), resource constrains (e.g., workload capacity, battery charge capacity, processing speed, memory limit, network bandwidth), space constraint, and the like.

In an alternative embodiment, rather than comparing with a threshold value, the first cost indicator calculated using a first type of mobile drive unit may be compared with a second cost indicator calculated using the second type of mobile drive unit. The type of mobile drive unit with the lower cost indicator may be selected. In some embodiments, the type of mobile drive unit for moving the object may be selected from three, four, or more cost indicators associated with three, four, or more types of mobile drive units. For instance, the type of mobile drive unit with the lowest cost indicator may be selected.

In the illustrative embodiment, a higher cost indicator indicates a higher cost. In an alternative embodiment, a higher cost indicator may indicate a lower cost. In such an embodiment, a second type of mobile drive unit may be selected if the cost indicator is lower than the threshold value; otherwise, the first type of mobile drive unit may be selected. Likewise, in some embodiments where multiple cost indicators are calculated, the type of mobile drive unit with the highest cost indicator may be selected, indicating a lowest cost.

Once the type of mobile drive unit is selected, a mobile drive unit of the selected type may be selected 2310. The selection may be based on any suitable factors discussed herein such as storage density of the start location and/or finish location, factors related to mobile drive units of the selected type (e.g., an availability, current position, load capacity, power or batter charge status, size or dimension, weight, and the like); factors related to a particular inventory request (e.g., priority information, timing constraint, handling instructions, size or weight information of the object, and the like); and/or system considerations can include the capacity, allocation of workload, and performance of system resources (e.g., drive units, inventory stations, management module, inventory holders, human or automated operators), and the like. In an embodiment, the position of the inventory item within the inventory holder may also affect the selection of the mobile drive unit. For instance, if an item is located in a detachable top portion of an inventory holder, an overhead drive unit may be selected to retrieve it. On the other hand, if the item is located at a bottom portion of the inventory holder, a ground drive unit may be selected.

The process 2300 can include causing or instructing 2312 the selected mobile drive unit to move the object in a manner similar to that discussed for steps 2106 and 2206 of the processes 2100 and 2200 of FIGS. 21 and 22.

In some embodiment, rather than first selecting a mobile drive unit type and then selecting a mobile drive unit of the selected type, a mobile drive unit may be directly selected from a plurality of mobile drive units. In such embodiments, a cost indicator associated with moving the object using a particular mobile drive unit (e.g., a ground drive unit) may be estimated. Based on a comparison of the cost indicator with a predetermined threshold or with other cost indicators respectively associated with other mobile drive units, the particular mobile drive unit or some other mobile drive unit (e.g., an overhead drive unit) may be selected.

According to an aspect of the present invention, overhead drive units are provided that are configured to be controlled to move objects in an inventory system. Such overhead drive units can be configured to receive information identifying a first location and a second location for moving an object, navigate to above the first location, retrieve the object from the first location, navigate to a position above the second location, and releasing the object at or near the second location. Aspects of the above process may be performed autonomously or semi-autonomously by the overhead drive unit. In some embodiment, the overhead drive unit may be selected based on a storage density and/or a cost such as discussed in FIGS. 22 and 23.

Figure 24:
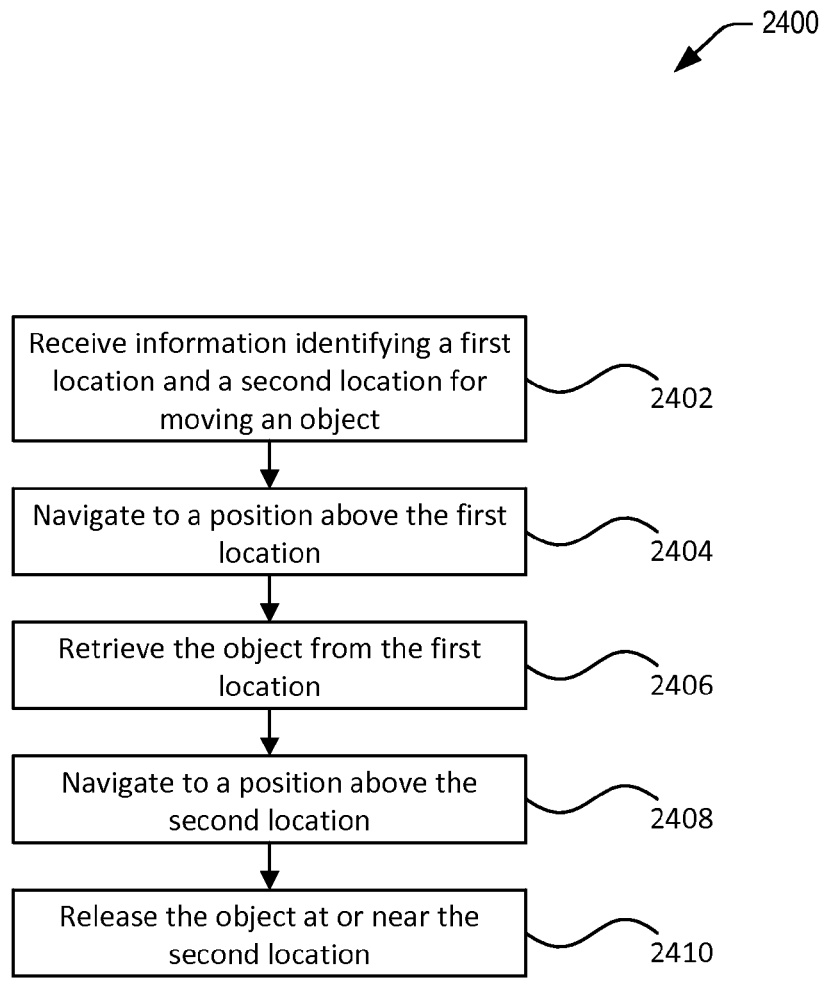
FIG. 24 illustrates an example process for controlling an overhead drive unit, in accordance with embodiments.

FIG. 24 illustrates an example process 2400 for controlling an overhead drive unit, in accordance with embodiments. Aspects of the process 2400 may be performed, in some embodiments, by a system similar to the system 900 discussed in FIG. 9. The control system may be implemented by an overhead drive unit such as a UAV, a crane assembly, or the like such as discussed in FIG. 7.

In an embodiment, the process 2400 includes receive 2402 information identifying a first location and a second location for moving an object. The first location may be a current location of the object whereas the second location may be a location where the object is to be moved to. In various embodiments, the first location and the second location can be a storage location, a location at or near an inventory station, a location at or near a mobile drive unit, a location at or near a human or automated operator, or any other suitable location in an inventory system. In various embodiments, the object to be moved can include any object that can be moved by a mobile drive unit such as an inventory holder, a detachable component of an inventory holder, or an inventory item. In some embodiments, the object may also include a mobile drive unit, a mobile inventory station, or even a human or automated operator.

In some embodiments, the information identifying the first location and/or the second location may be received from a management module such as the management module 15 of FIG. 3. In some embodiments, the information may not include a first location or the second location. In such embodiments, the process 2400 can include automatically determining the missing information from other sources such as sensors on a sensor network. In some cases, the overhead drive unit may be configured to store a current departure location or any other location as the second location so as to enable navigation back to the stored location after retrieval of the object. In some embodiments, additional information may be received by the overhead drive unit such as verification information associated with the object. Such verification information may be used to identify and/or verify the object, for example, upon detection of an object identifier of the associated with the object. The object identifier may include an optical barcode (e.g., one dimensional barcode, two-dimensional barcode, or three-dimensional barcode), a RFID tag, or the like.

In response to the received information, the process 2400 can include navigating 2404 to a position above the first location. The navigation may be entirely autonomous or semi-autonomous. In some embodiments, a propulsion system of an overhead drive unit may be controlled to depart from a current location of the overhead drive unit and navigate toward the first location. A sensing system associated with the overhead drive unit may be used to collect positioning information and other sensing data related to the overhead drive unit and an environment surrounding the overhead drive unit. For instance, the sensing system may be configured to collect image data (e.g., fiducial marks used to identify positions within a grid system) via image sensors, proximity data (e.g., distance to surrounding objects) via proximity sensors, GPS signals via GPS sensors, and any other sensing data via any other suitable sensors. Such sensing data may be processed (e.g., using sensor fusion technologies) so as to guide the navigation of an overhead drive unit. For instance, the image data may be combined with proximity data to derive a relatively accurate estimate of an extrinsic state (e.g., positional relationship with surrounding objects) and/or intrinsic state (e.g., acceleration or orientation) of the overhead drive unit. In some embodiments, autonomous path planning, map construction, obstacle avoidance, and other navigation-related features may also be implemented. Once it is determined that the overhead drive unit has reached a position above the first location, the overhead drive unit may be controlled to hover, park, or otherwise substantially maintain its position above the first location.

Next, the process 2400 can include retrieving 2406 the object from the first location. In some embodiments, a retaining system may be controlled to couple with a portion of the object using friction, vacuum suction, opposing arms, magnets, and any other suitable methods. Examples of some of such methods are discussed above in FIGS. 17-20. For instance, one or more coupling members (e.g., hook, opposing arms, or clasps) may be lowered from the overhead drive unit via an extension member (e.g., rope, cable, pole, or robotic arm). The coupling members may be configured be coupled with a portion of the object such as a surface, a handle, a protrusion, a depression, or the like. Once coupled with the object, the one or more coupling members of the overhead drive unit may be lifted thereby lifting the object. In some embodiments, additional holding members may be provided to prevent movement of the object relative to the overhead drive unit or otherwise secure the object during transit.

In an embodiment, the process 2400 may optionally include identifying and/or verifying the object to be retrieved before or after the object has been retrieved. For instance, the overhead drive unit may be equipped with an object sensor configured to detect an object identifier attached to the object such as a QR code, an RFID tag, and the like. In some embodiments, the detection of the object identifier may allow the mobile drive unit to adjust its position relative to the object in order to enable coupling between the mobile drive unit and the object. In some embodiments, the overhead drive unit may be configured to verify the identity of the object based on the detected the object identifier. If the identity of the object is confirmed, the object may be retrieved as intended. Otherwise, if the object has not been retrieve, the overhead drive unit may be configured to continue looking for the intended object. If the object has already been retrieved, the overhead drive unit may be configured to release the retrieved object and continue looking for the intended object. In some embodiments, the overhead drive unit may be configured to return to a specific area if it fails to locate the object to be retrieved (e.g., after a given amount of time has lapsed).

In an embodiment, the process 2400 includes can include navigating 2408 to a position above the second location, for example, using navigational techniques similar to those discussed above. Subsequently, the overhead drive unit may be configured to lower the object to the second location or to a location near the second location via an extension member. In some embodiments, the object may be directly dropped to a surface below the overhead drive unit. The overhead drive unit may be configured to hover, park, or otherwise maintain a predetermined spatial disposition when the object is released. Once the object is released, the overhead drive unit may be configured to return to a departing location or a different location. In some embodiments, the step 2410 of releasing the object may be optional and the overhead drive unit may be configured to land at or near a designated location with the object. In some embodiments, the overhead drive unit may be configured to transmit one or more messages to a management module such as the management module 15 of FIG. 3 indicating whether the assigned task has been completed successfully.

Figure 25:
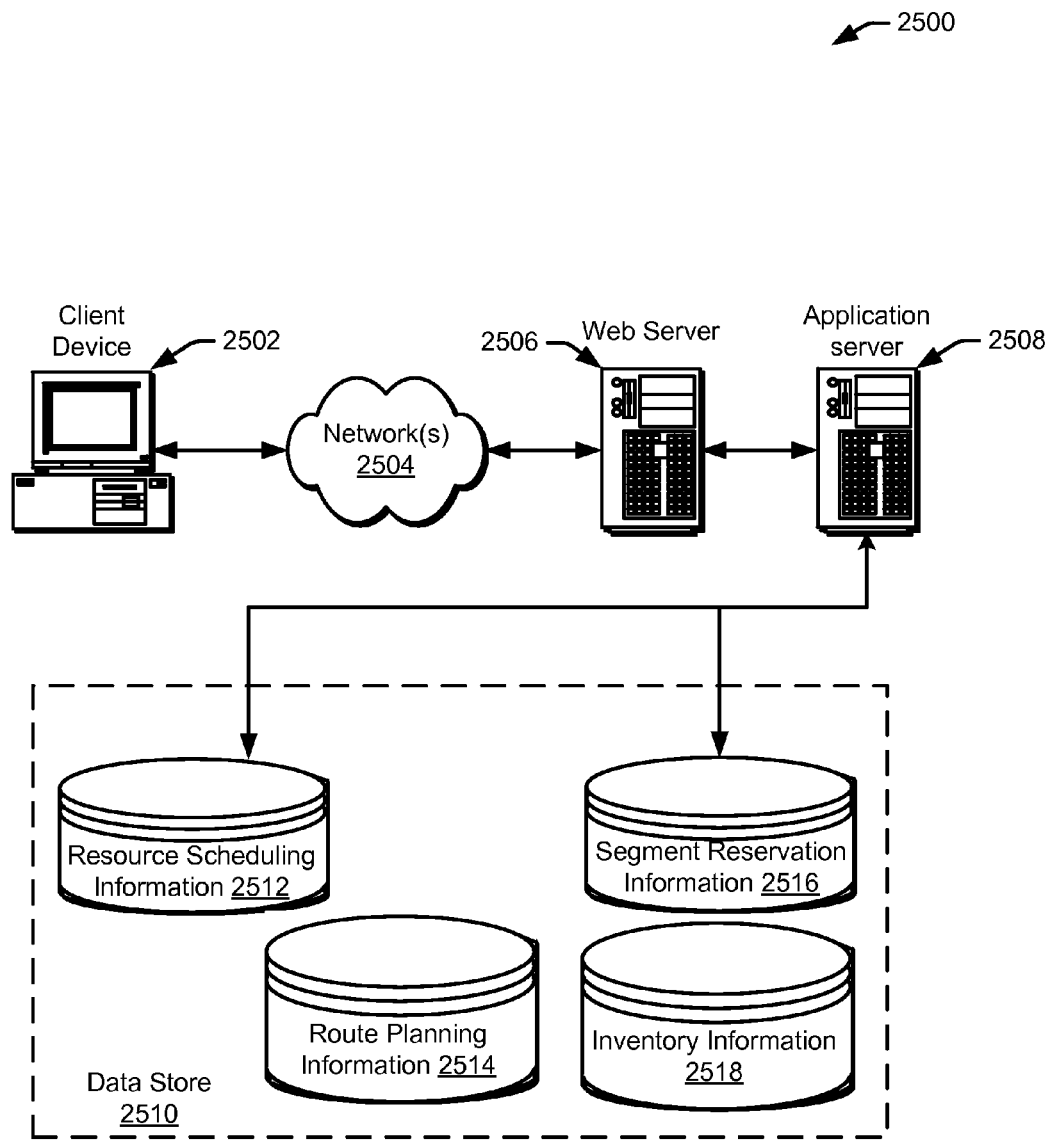
FIG. 25 illustrates aspects of an example environment for implementing aspects in accordance with various embodiments.

FIG. 25 illustrates aspects of an example environment 2500 for implementing aspects in accordance with various embodiments. As will be appreciated, although a Web-based environment is used for purposes of explanation, different environments may be used, as appropriate, to implement various embodiments. The environment includes an electronic client device 2502, which can include any appropriate device operable to send and receive requests, messages, or information over an appropriate network 2504 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 2506 for receiving requests and serving content in response thereto, although for other networks an alternative device serving a similar purpose could be used as would be apparent to one of ordinary skill in the art.

The illustrative environment includes at least one application server 2508 and a data store 2510. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of Hypertext Markup Language ("HTML"), Extensible Markup Language ("XML") or another appropriate structured language in this example. The handling of all requests and responses, as well as the delivery of content between the client device 2502 and the application server 2508, can be handled by the Web server. It should be understood that the Web and application servers are not required and are merely example components, as structured code discussed herein can be executed on any appropriate device or host machine as discussed elsewhere herein.

The data store 2510 can include several separate data tables, databases or other data storage mechanisms and media for storing data relating to a particular aspect. For example, the data store illustrated includes mechanisms for storing information which can be used by modules described herein, such as resource scheduling information 2512, route planning information 2514, segment reservation information 2516, and/or inventory information 2518. It should be understood that there can be many other aspects that may need to be stored in the data store, such as for page image information and to access right information, which can be stored in any of the above listed mechanisms as appropriate or in additional mechanisms in the data store 2510. The data store 2510 is operable, through logic associated therewith, to receive instructions from the application server 2508 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 25. Thus, the depiction of the system 2500 in FIG. 25 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An inventory management system to manage a plurality of inventory items, comprising:
 a plurality of inventory holders, each of the plurality of inventory holders configured to receive a subset of the plurality of inventory items;
 a plurality of mobile drive units to move the inventory holders, the plurality of mobile drive units comprising a ground drive unit and an overhead drive unit;
 a management module, comprising:
  a memory that stores computer-executable instructions; and
  a processor configured to access the memory and execute the computer-executable instructions to at least:
   receive a retrieval request to retrieve an inventory item of the plurality of inventory items;
   access information about a storage location of an inventory holder containing the inventory item based at least in part on the retrieval request, the inventory holder comprising a top portion and a bottom portion, and the inventory item being located in the top portion;
   access a storage density indicator associated with the storage location, the storage density indicator including information about the density of inventory holders at the storage location; and
   instruct a mobile drive unit from the plurality of mobile drive units to retrieve at least the top portion of the inventory holder containing the inventory item based at least in part on the storage density indicator.

2. The inventory management system of claim 1, wherein accessing the storage density indicator comprises determining a value associated with a difficulty of access to the inventory holder by the ground drive unit.

3. The inventory management system of claim 1, wherein the overhead drive unit comprises an unmanned aerial vehicle (UAV).

4. The inventory management system of claim 1, wherein the overhead drive unit comprises an overhead crane.

5. The inventory management system of claim 1, wherein instructing the mobile drive unit comprises selecting the mobile drive unit from the plurality of mobile drive units based at least in part on the storage density indicator.

6. The inventory management system of claim 5, wherein selecting the mobile drive unit comprises selecting the overhead drive unit if the storage density indicator indicates a high storage density around the storage location and selecting the ground drive unit if the storage density indicator indicates a low storage density around the storage location.

7. The inventory management system of claim 5, wherein selecting the mobile drive unit comprises determining whether the storage density indicator exceeds a threshold value.

8. A computer-implemented method for retrieving an inventory item, comprising:
 receiving information identifying an inventory item to be retrieved;
 identifying an inventory holder containing the inventory item based at least in part on the information identifying the inventory item;
 selecting, via a computer system, a mobile drive unit from a plurality of mobile drive units to retrieve at least one portion of the inventory holder, the plurality of mobile drive units comprising ground drive units and overhead drive units, the one portion including the inventory item, wherein selecting the mobile drive unit comprises selecting an overhead drive unit or selecting a ground based drive unit based at least in part on an estimated cost of retrieving the inventory holder; and
 instructing the selected mobile drive unit to retrieve the at least one portion of the inventory holder.

9. The computer-implemented method of claim 8, wherein the estimated cost is determined based at least in part on a storage density near a storage location for the inventory holder.

10. The computer-implemented method of claim 8, wherein selecting the mobile drive unit is based at least in part on a position of the inventory item within the inventory holder.

11. The computer-implemented method of claim 10, wherein the one portion is a top of the inventory holder, and the selection comprises selecting an overhead drive unit based at least in part on the one portion being the top.

12. The computer-implemented method of claim 8, wherein the estimated cost includes an estimated time for retrieving the inventory holder or a portion thereof.

13. The computer-implemented method of claim 8, wherein selecting the mobile drive unit comprises comparing the estimated cost to a predetermined threshold.

14. An inventory holder configured to store one or more inventory items, comprising:
 a bottom portion configured to be releasably couplable to a ground drive unit for movement of the inventory holder by the ground drive unit;
 a top portion detachably coupled to the bottom portion; and
 a first coupling member configured to be releasably coupled to a corresponding second coupling member of an overhead drive unit so as to allow the overhead drive unit to lift the top portion of the inventory holder off of the bottom portion.

15. The inventory holder of claim 14, wherein the top portion is configured to be detachably couplable to a ground drive unit for moving the top portion.

16. The inventory holder of claim 14, wherein the first coupling member includes a handle.

17. The inventory holder of claim 14, further comprising a ground holder identifier configured to be detectable by a ground drive unit from beneath the inventory holder and usable for positioning the ground drive unit relative to inventory holder to enable coupling between the ground drive unit and the inventory holder.

18. The inventory holder of claim 14, further comprising an overhead holder identifier configured to be detectable by an overhead drive unit from above the overhead drive unit and usable for positioning the overhead drive unit relative to inventory holder to enable coupling between the overhead drive unit and the inventory holder.

19. The inventory holder of claim 18, wherein the overhead holder identifier identifies the top portion.

20. The inventory holder of claim 18, wherein the overhead holder identifier is configured such that detection of the overhead holder identifier requires a line of sight.

* * * * *